US012650847B2

(12) United States Patent
Peterson et al.

(10) Patent No.: US 12,650,847 B2
(45) Date of Patent: Jun. 9, 2026

(54) TECHNIQUES FOR BUILDING A DATA CENTER USING A SKILLS SERVICE

(71) Applicant: Oracle International Corporation, Redwood Shores, CA (US)

(72) Inventors: Eric Raymond Peterson, Vashon, WA (US); William Nickolas Moran, Austin, TX (US); Kenneth Richard Fox, Redwood City, CA (US); Benjamin Todd Willey, Lexington, KY (US); William Thomas Price, Weston-Super-Mare (GB)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 18/498,964

(22) Filed: Oct. 31, 2023

(65) Prior Publication Data

US 2024/0385817 A1 Nov. 21, 2024

Related U.S. Application Data

(60) Provisional application No. 63/503,143, filed on May 18, 2023.

(51) Int. Cl.
*G06F 9/4401* (2018.01)
*G06F 8/41* (2018.01)
(Continued)

(52) U.S. Cl.
CPC ............ *G06F 9/4401* (2013.01); *G06F 8/433* (2013.01); *G06F 9/45558* (2013.01);
(Continued)

(58) Field of Classification Search
CPC ........................................................ G06F 8/43
See application file for complete search history.

(56) References Cited

U.S. PATENT DOCUMENTS 9,092,502 B1    7/2015  Cannaliato et al.
9,164,864 B1    10/2015 Novick et al.
(Continued)

FOREIGN PATENT DOCUMENTS

CN    114091725 A  *  2/2022  ............. G06N 3/044
CN    118312629 A  *  7/2024  ............. G06Q 50/04
(Continued)

OTHER PUBLICATIONS

International Application No. PCT/US2024/028744, International Search Report and Written Opinion mailed on Jul. 23, 2024, 16 pages.
(Continued)

*Primary Examiner* — Jae U Jeon
(74) *Attorney, Agent, or Firm* — Kilpatrick Townsend & Stockton LLP

(57) ABSTRACT

A cloud-computing service (e.g., a "Puffin Service") is described. The service may maintain service and skill catalogs corresponding to various services to be deployed to a region (e.g., during a region build). The service may host numerous user interfaces with which various service and skill metadata may be provided. In some embodiments, such data may include one or more dependencies between skills. The data managed by the cloud-computing service may be utilized to build a dependency graph. Navigation of the dependency graph may be performed via one or more user interfaces hosted by the cloud-computing service. An orchestration service (e.g., a Multi-Flock Orchestrator) may manage bootstrapping efforts for any suitable number of services during a region build based at least in part on dependencies between skills.

20 Claims, 22 Drawing Sheets

(51) Int. Cl.

| | |
|---|---|
| *G06F 9/455* | (2018.01) |
| *G06F 9/48* | (2006.01) |
| *G06F 9/50* | (2006.01) |
| *G06F 9/52* | (2006.01) |

(52) U.S. Cl.
CPC .......... *G06F 9/4881* (2013.01); *G06F 9/5072* (2013.01); *G06F 9/5077* (2013.01); *G06F 9/52* (2013.01); *G06F 9/4411* (2013.01)

(56) References Cited

U.S. PATENT DOCUMENTS

| | | |
|---|---|---|
| 9,306,814 B1 | 4/2016 | Roth et al. |
| 9,438,599 B1 | 9/2016 | Yuhan et al. |
| 9,722,895 B1 | 8/2017 | Sarukkai et al. |
| 9,876,703 B1 | 1/2018 | Arllen et al. |
| 9,985,947 B1 | 5/2018 | Elhard |
| 10,394,638 B1 | 8/2019 | Lay et al. |
| 10,511,675 B1 | 12/2019 | Chud |
| 10,757,574 B1 | 8/2020 | Rule et al. |
| 10,819,594 B2 | 10/2020 | Margalit et al. |
| 10,878,483 B1 | 12/2020 | Felbinger et al. |
| 11,010,191 B1 | 5/2021 | Hornbeck |
| 11,321,137 B2 | 5/2022 | Barsalou et al. |
| 11,379,353 B1 | 7/2022 | Marchetti et al. |
| 11,552,953 B1 | 1/2023 | Avadhanam |
| 11,593,251 B2 | 2/2023 | Chirkin et al. |
| 11,604,672 B2 | 3/2023 | Subramanian et al. |
| 11,720,536 B1 | 8/2023 | Kisser et al. |
| 12,475,015 B2 | 11/2025 | Peterson et al. |
| 2002/0198973 A1 | 12/2002 | Besaw |
| 2003/0154407 A1 | 8/2003 | Kato et al. |
| 2005/0198331 A1* | 9/2005 | Okajima ............... H04L 63/102 |
| | | 709/229 |
| 2008/0295095 A1 | 11/2008 | Watanabe et al. |
| 2010/0106678 A1 | 4/2010 | Pietrek et al. |
| 2010/0212004 A1 | 8/2010 | Fu |
| 2013/0054426 A1 | 2/2013 | Rowland et al. |
| 2013/0297711 A1 | 11/2013 | Nhu |
| 2013/0297802 A1 | 11/2013 | Laribi et al. |
| 2013/0304925 A1 | 11/2013 | Ferris et al. |
| 2013/0339515 A1 | 12/2013 | Radhakrishnan |
| 2014/0075032 A1 | 3/2014 | Vasudevan et al. |
| 2014/0089393 A1 | 3/2014 | Druet et al. |
| 2014/0280595 A1 | 9/2014 | Mani et al. |
| 2015/0033086 A1 | 1/2015 | Sasturkar et al. |
| 2015/0106430 A1 | 4/2015 | y Arcas et al. |
| 2015/0200824 A1 | 7/2015 | Sadovsky et al. |
| 2015/0363852 A1 | 12/2015 | Vautour |
| 2015/0372938 A1 | 12/2015 | Patel et al. |
| 2016/0043909 A1 | 2/2016 | Pogrebinsky et al. |
| 2016/0142211 A1 | 5/2016 | Metke et al. |
| 2016/0203533 A1 | 7/2016 | Cheng et al. |
| 2016/0277411 A1 | 9/2016 | Dani et al. |
| 2017/0230229 A1 | 8/2017 | Sasturkar et al. |
| 2018/0052861 A1 | 2/2018 | Seetharaman et al. |
| 2018/0077031 A1 | 3/2018 | Chen et al. |
| 2018/0123890 A1 | 5/2018 | Merk et al. |
| 2018/0219784 A1 | 8/2018 | Jiang et al. |
| 2018/0234256 A1 | 8/2018 | Bowen |
| 2018/0330300 A1 | 11/2018 | Runkana et al. |
| 2019/0036797 A1 | 1/2019 | Margalit et al. |
| 2019/0087835 A1 | 3/2019 | Schwed et al. |
| 2019/0114335 A1* | 4/2019 | Koenig ............. G06F 16/24532 |
| 2019/0156000 A1 | 5/2019 | Hoffmann et al. |
| 2019/0166007 A1 | 5/2019 | Sundaram et al. |
| 2019/0166208 A1 | 5/2019 | Shi et al. |
| 2019/0205045 A1 | 7/2019 | Hugot et al. |
| 2020/0004569 A1 | 1/2020 | Gupta et al. |
| 2020/0014659 A1 | 1/2020 | Chasman et al. |
| 2020/0059420 A1 | 2/2020 | Abraham |
| 2020/0112497 A1 | 4/2020 | Yenumulapalli et al. |
| 2020/0117757 A1 | 4/2020 | Yanamandra et al. |
| 2020/0128047 A1 | 4/2020 | Biswas et al. |
| 2020/0244527 A1 | 7/2020 | Sharma et al. |
| 2020/0358756 A1 | 11/2020 | Rose et al. |
| 2021/0103991 A1 | 4/2021 | Kern et al. |
| 2021/0216190 A1 | 7/2021 | Vakil et al. |
| 2021/0224076 A1* | 7/2021 | Dockter ............... G06F 9/4881 |
| 2021/0224122 A1 | 7/2021 | Glass et al. |
| 2021/0224132 A1 | 7/2021 | Barsalou |
| 2021/0234864 A1 | 7/2021 | Dube et al. |
| 2021/0273914 A1 | 9/2021 | Cobb |
| 2021/0279109 A1 | 9/2021 | Ji et al. |
| 2021/0334345 A1 | 10/2021 | Sim et al. |
| 2021/0334375 A1 | 10/2021 | Hu et al. |
| 2021/0377272 A1 | 12/2021 | Dasari et al. |
| 2021/0382725 A1 | 12/2021 | Vemula et al. |
| 2021/0392142 A1 | 12/2021 | Stephens et al. |
| 2022/0050699 A1 | 2/2022 | Momchilov et al. |
| 2022/0091947 A1 | 3/2022 | Kothari et al. |
| 2022/0100573 A1 | 3/2022 | Allen |
| 2022/0103618 A1 | 3/2022 | Pinheiro et al. |
| 2022/0150124 A1 | 5/2022 | Cooley et al. |
| 2022/0255902 A1 | 8/2022 | Woodson |
| 2022/0294818 A1 | 9/2022 | Parekh et al. |
| 2022/0335340 A1 | 10/2022 | Moustafa et al. |
| 2022/0353133 A1 | 11/2022 | Shrestha et al. |
| 2022/0365835 A1* | 11/2022 | Kandasamy ........ G06F 11/0793 |
| 2022/0374271 A1 | 11/2022 | Pogrebinsky et al. |
| 2022/0382598 A1 | 12/2022 | Szabo et al. |
| 2022/0398078 A1 | 12/2022 | Segler |
| 2022/0413956 A1 | 12/2022 | Mathew et al. |
| 2023/0011628 A1 | 1/2023 | Hurley et al. |
| 2023/0020974 A1 | 1/2023 | Liu |
| 2023/0060675 A1 | 3/2023 | Szabo et al. |
| 2023/0105901 A1 | 4/2023 | Adogla et al. |
| 2023/0108661 A1 | 4/2023 | Adogla et al. |
| 2023/0109926 A1 | 4/2023 | Nair et al. |
| 2023/0126757 A1 | 4/2023 | Roy et al. |
| 2023/0132478 A1 | 5/2023 | Robinson et al. |
| 2023/0316348 A1 | 10/2023 | Dageville et al. |
| 2023/0342179 A1 | 10/2023 | Suttle et al. |
| 2023/0362161 A1 | 11/2023 | Spector et al. |
| 2023/0367654 A1 | 11/2023 | Kurian et al. |
| 2023/0385286 A1 | 11/2023 | Glickman et al. |
| 2023/0386655 A1 | 11/2023 | Kouvaras et al. |
| 2024/0054063 A1 | 2/2024 | Wichelman et al. |
| 2024/0095739 A1 | 3/2024 | Adogla et al. |
| 2024/0160517 A1 | 5/2024 | Fischer et al. |
| 2024/0320240 A1 | 9/2024 | Podder |
| 2024/0330069 A1 | 10/2024 | Atur et al. |
| 2024/0362130 A1 | 10/2024 | Berg et al. |
| 2024/0362142 A1 | 10/2024 | Berg et al. |
| 2024/0364579 A1 | 10/2024 | Peterson et al. |
| 2024/0427658 A1 | 12/2024 | Pinahs et al. |
| 2025/0126028 A1 | 4/2025 | Mohan et al. |
| 2025/0199866 A1 | 6/2025 | Rushton et al. |

FOREIGN PATENT DOCUMENTS

| | | |
|---|---|---|
| EP | 2893685 B1 | 7/2017 |
| EP | 3429156 A1 | 1/2019 |
| EP | 3271857 B1 | 4/2020 |
| WO | 2014039921 A1 | 3/2014 |
| WO | 2018010791 A1 | 1/2018 |
| WO | 2021145894 A1 | 7/2021 |
| WO | 2021150306 A1 | 7/2021 |
| WO | 2021150307 A1 | 7/2021 |
| WO | 2021150366 A1 | 7/2021 |
| WO | 2021150435 A1 | 7/2021 |
| WO | 2021174104 A1 | 9/2021 |
| WO | 2022104395 A1 | 5/2022 |

OTHER PUBLICATIONS

International Application No. PCT/US2024/028788, International Search Report and Written Opinion mailed on Jul. 23, 2024, 16 pages.

U.S. Appl. No. 18/537,902, Non-Final Office Action, mailed on May 20, 2025, 10 pages.

(56) References Cited

OTHER PUBLICATIONS

"Developing System Services in Oracle Solaris 11.3", Oracle, Available Online at: https://docs.oracle.com/cd/E53394_01/pdf/E60814.pdf, Sep. 1, 2018, 76 pages.

Girola et al., "IBM Data Center Networking; Planning for Virtualization and Cloud Computing", Redbooks, May 9, 2011, 258 pages.

International Application No. PCT/US2024/028767, "International Search Report and Written Opinion", mailed Sep. 10, 2024, 13 pages.

International Application No. PCT/US2024/029210, "International Search Report and Written Opinion", mailed Sep. 16, 2024, 12 pages.

International Application No. PCT/US2024/029417, "International Search Report and Written Opinion", mailed Sep. 16, 2024, 12 pages.

International Application No. PCT/US2024/030201, "International Search Report and Written Opinion", mailed Sep. 16, 2024, 12 pages.

International Application No. PCT/US2024/030208, "International Search Report and Written Opinion", mailed Sep. 16, 2024, 13 pages.

International Application No. PCT/US2024/030212, "International Search Report and Written Opinion", mailed Sep. 16, 2024, 12 pages.

Admin Access Management in Azure Cloud Solution Provider (CSP) Subscriptions, Available online at: https://techcommunity.microsoft.com/t5/security-compliance-and-identity/admin-access-management-in-azure-cloud-solutionprovider-csp/ba-p/3947126, Nov. 21, 2023. 6 pages.

General Variables for All Requests, Oracle Cloud Infrastructure Documentation, Available online at: https://docs.oracle.com/en-us/iaas/Content/Identity/policyreference/policyreference_topic-General_Variables_ for_All_Requests.htm Jun. 28, 2023. 6 pages.

Billing and Cost Management Overview, XP093183514, Oracle Cloud Infrastructure Documentation, Available online at: https://docs.oracle.com/en-us/iaas/Content/Billing/Concepts/billingoverview.htm, Dec. 20, 2022, 4 pages.

Cloud Guard Concepts, XP093183028, Oracle Cloud Infrastructure Documentation, Available online at: https://docs.oracle.com/en-us/iaas/Content/cloud-guard/using/cg-concepts.htm, Jan. 18, 2022, 5 pages.

Getting Started with Policies, XP093184099, Oracle Cloud Infrastructure Documentation, Available online at: https://docs.oracle.com/en-us/iaas/Content/Identity/Concepts/policygetstarted.htm, Jan. 4, 2023, 3 pages.

Getting Summary Information on the Overview Page, XP093183031, Oracle Cloud Infrastructure Documentation, Available online at: https://docs.oracle.com/en-us/iaas/mysql-database/doc/summary-information-overview-page.html, Aug. 16, 2022, 3 pages.

Learn Best Practices for Setting Up Your Tenancy, XP093184095, Oracle Cloud Infrastructure Documentation, Available online at: https://docs.oracle.com/en-us/iaas/Content/ GSG/Concepts/ settinguptenancy.htm, Feb. 8, 2023, 6 pages.

Managing Compartments, XP093184098, Oracle Cloud Infrastructure Documentation, Available online at: https://docs.oracle.com/en-us/iaas/Content/Identity/Tasks/managing compartments.htm, Feb. 8, 2023, 14 pages.

Monitoring Threats, XP093183035, Oracle Cloud Infrastructure Documentation, Available online at: https://docs.oracle.com/en-us/iaas/Content/cloud-guard/using/threats.htm, Sep. 28, 2022, 2 pages.

Overview of IAM, XP093184083, Oracle Cloud Infrastructure Documentation, Available online at: https://docs.aws.amazon.com/IAM/latest/UserGuide/introduction.html, Feb. 8, 2023, 5 pages.

Overview of the Console Dashboards Service, XP093184740, Oracle Cloud Infrastructure Documentation, Available online at: https://docs.oracle.com/en-us/iaas/Content/Dashboards/Concepts/dashboardsoverview.htm, Mar. 14, 2023, 4 pages.

Prerequisites for Oracle Platform Services on Oracle Cloud Infrastructure, XP093185058, Oracle Cloud Infrastructure Documenta-tion, Available online at: https://docs.oracle.com/en-us/iaas/Content/General/Reference/PaaSprereqs.htm, Mar. 23, 2023, 5 pages.

Renaming a Cloud Account, XP093185071, Oracle Cloud Infrastructure Documentation, Available online at: https://docs.oracle.com/en-us/iaas/Content/General/Concepts/renamecloud account.htm, May 14, 2021, 5 pages.

Security Guide for Exadata Database Service on Cloud@Customer Systems, XP093181902, Oracle Cloud Infrastructure Documentation, Available online at: https://docs.oracle.com/en/engineered-systems/exadata-cloud-at-customer/ ecccm/ecc-secguide.html, Apr. 1, 2023, 24 pages.

Site-to-Site VPN Overview, XP093184733, Oracle Cloud Infrastructure Documentation, Available online at: https://docs.oracle.com/en-us/iaas/Content/Network/Tasks/overviewIPsec.htm, Feb. 8, 2023, 9 pages.

Welcome to Oracle Cloud Infrastructure, XP093182493, Oracle Cloud Infrastructure Documentation, Available online at: http://docs.oracle.com/en-us/iaas/Content/GSG/Concepts/baremetalintro.htm, Mar. 23, 2023, 2 pages.

Oracle Gen 2 Exadata Cloud@Customer Security Controls, XP093181973, Available online at: https://www.oracle.com/a/ocom/docs/ engineered-systems/exadata/exadata-cloud-at-customer-security-controls.pdf, Jan. 11, 2023, 43 pages.

Oracle Operator Access Control Configuration and Administration Guide, XP093181896, Available online at: https://docs.oracle.com/en/cloud/paas/ operator-access-control/exops/oracle-operator-access-control-oracle-operator-access-control-configuration-and-administration-guide.pdf, Nov. 18, 2022, 104 pages.

Oracle Public Sector Licensing and Permitting, XP093184298, Available online at: https://docs.oracle.com/en/cloud/saas/public-sector-compliance-regulation-common/22a/psagi/implementing-your-agency.pdf, 2022, 196 pages.

Oracle Sovereign Cloud, XP093184649, Available online at: https://www.oracle.com/in/cloud/sovereign-cloud/, Feb. 15, 2023, 7 pages.

Overview of Access Approval, Available online at: https://cloud.google.com/assured-workloads/access-approval/docs/overview, Jun. 6, 2024, 5 pages.

Policy Syntax, Oracle Cloud Infrastructure Documentation, Available online at: https://docs.oracle.com/en-us/iaas/Content/Identity/Concepts/policysyntax.htm, Jan. 4, 2023. 7 pages.

Reinstate Admin Privileges for a Customer's Azure CSP Subscriptions, Available online at: https:Mearn.microsoft.com/enus/partner-center/reinstate-csp, Aug. 1, 2023. 7 pages.

Security Roles in Oracle Fusion Cloud Sla, XP093184293, Available online at: https://www.youtube.com/watch?v=sp7OvpQIY2U, Nov. 30, 2018, 12 pages.

Tenant Administrator Settings, Available online at: https://backstage.forgerock.com/docs/idcloud/latest/tenants/tenant-administrator-settings.html, Jun. 7, 2023. 12 pages.

Tokenization-(Data Security), Wikipedia, Feb. 1-2, 2023. pp. 1-12.

U.S. Appl. No. 18/647,735, Non-Final Office Action mailed on Jul. 21, 2025, 25 pages.

U.S. Appl. No. 18/647,741, Non-Final Office Action mailed on Nov. 4, 2025, 17 pages.

U.S. Appl. No. 18/647,893, Notice of Allowance mailed on Sep. 15, 2025, 9 pages.

U.S. Appl. No. 18/647,971, Non-Final Office Action mailed on Oct. 10, 2025, 16 pages.

George et al., Data Anonymization and Integrity Checking in Cloud Computing, 2013 Fourth International Conference on Computing, Communications and Networking Technologies, Jul. 2013, 5 pages.

Ma et al., ServiceRank: Root Cause Identification of Anomaly in Large-Scale Microservice Architectures, Institute of Electrical and Electronics Engineers Transactions on Dependable and Secure Computing, vol. 19, No. 5, Sep.-Oct. 2022. pp. 3087-3100.

Magouyrk, Announcing Oracle Alloy: The Power of the Cloud in Your Hands, Oracle Cloud Infrastructure Blog, Oct. 18, 2022. 6 pages.

McIntyre, IBM SmartCloud: Becoming a Cloud Service Provider, Available online at: https://www.redbooks.ibm.com/abstracts/redp4912.html, Dec. 13, 2012, 52 pages.

(56) References Cited

OTHER PUBLICATIONS

Singh et al., A Cloud Service Architecture for Analyzing Big Monitoring Data, Tsinghua Science and Technology, vol. 21, No. 1, Feb. 2016, pp. 55-70.

Soldani et al., Anomaly Detection and Failure Root Cause Analysis in (Micro) Service-Based Cloud Applications: A Survey, Association for Computing Machinery Computing Surveys, vol. 55, No. 3, May 26, 2021. pp. 1-36.

"Create a Reseller and Reseller Administrator User", Available online at: https://abiquo.atlassian.net/wiki/spaces/ABI54/pages/310740667/Create+a+Reseller+and+Reseller+Administrator+User, May 3, 2022, 6 pages.

U.S. Appl. No. 18/520,103, Non-Final Office Action, mailed on Apr. 17, 2026, 34 pages.

* cited by examiner

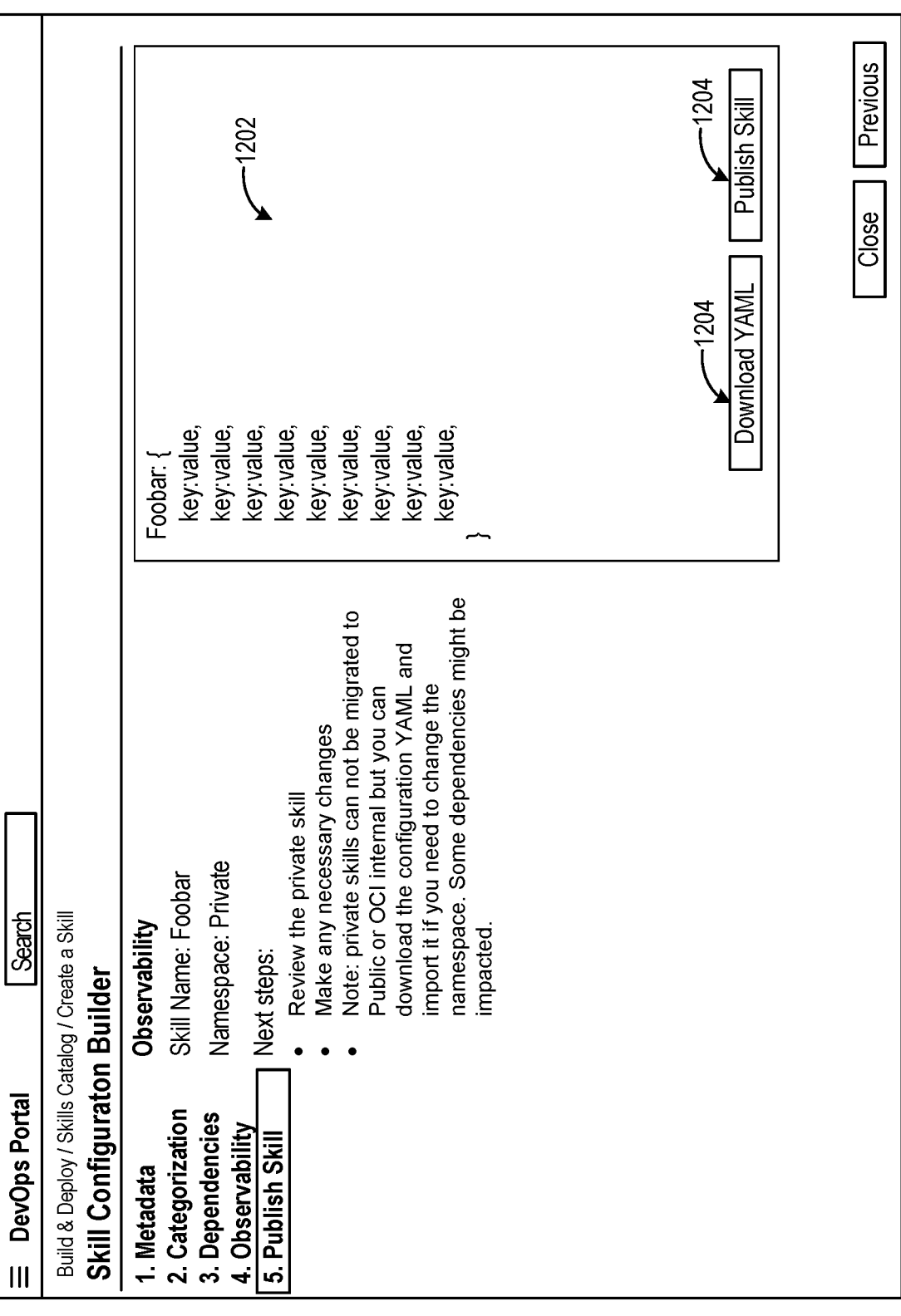

FIG. 12

≡ DevOps Portal    | Search |

Build & Deploy / Skills Catalog / Create a Skill

Skill Configuraton Builder

1. Metadata
2. Categorization
3. Dependencies
4. Observability
5. Publish Skill

Observability

Skill Name: Foobar

Namespace: Private

Next steps:
- Review the private skill
- Make any necessary changes
- Note: private skills can not be migrated to Public or OCI internal but you can download the configuration YAML and import it if you need to change the namespace. Some dependencies might be impacted.

Foobar: {
key:value,
key:value,
key:value,
key:value,
key:value,
key:value,
key:value,
key:value,
key:value,
}

1202

1204   Download YAML

1204   Publish Skill

| Close |

| Previous |

1200

Figure 17:
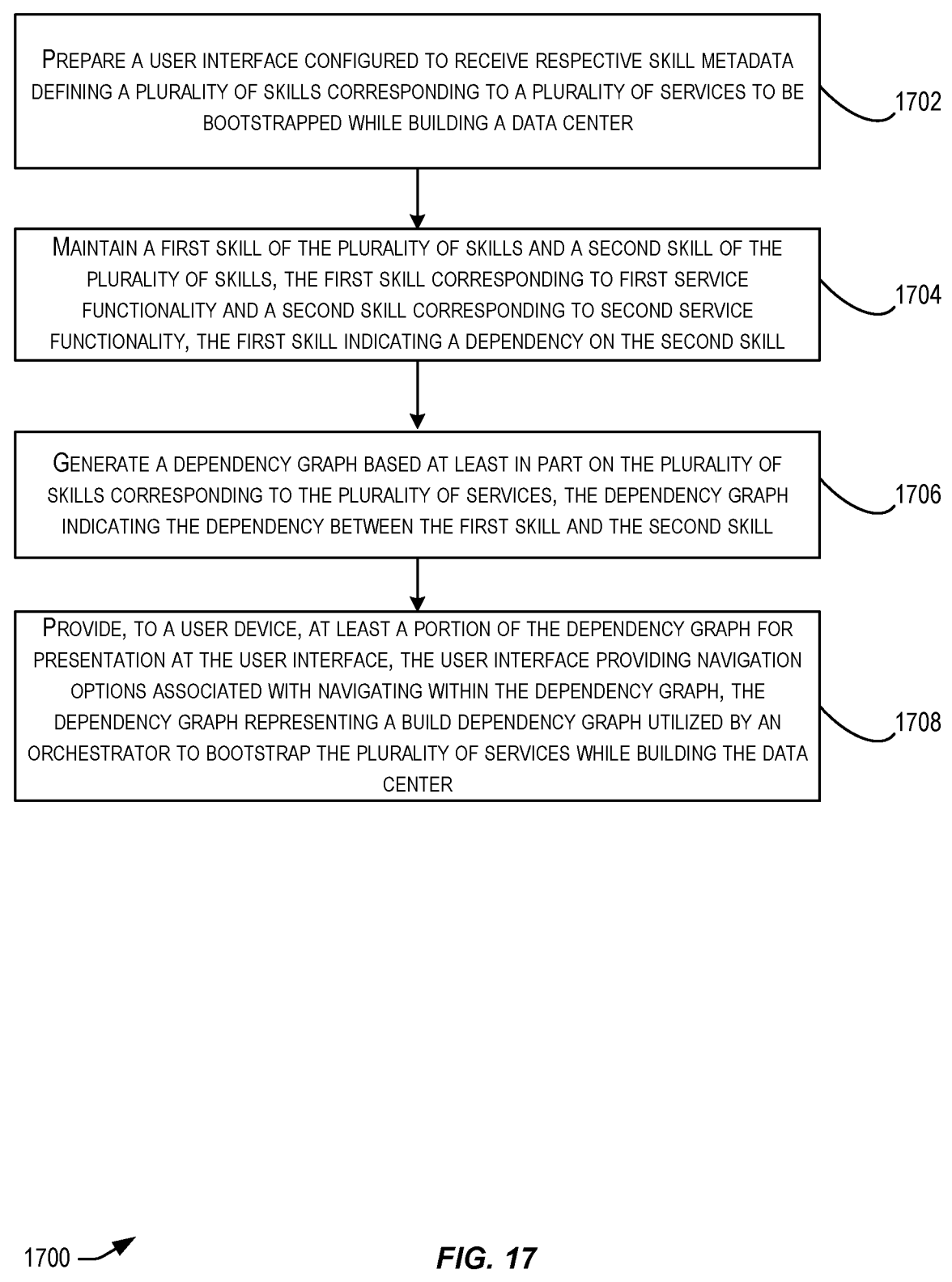

PREPARE A USER INTERFACE CONFIGURED TO RECEIVE RESPECTIVE SKILL METADATA DEFINING A PLURALITY OF SKILLS CORRESPONDING TO A PLURALITY OF SERVICES TO BE BOOTSTRAPPED WHILE BUILDING A DATA CENTER ⟍1702

MAINTAIN A FIRST SKILL OF THE PLURALITY OF SKILLS AND A SECOND SKILL OF THE PLURALITY OF SKILLS, THE FIRST SKILL CORRESPONDING TO FIRST SERVICE FUNCTIONALITY AND A SECOND SKILL CORRESPONDING TO SECOND SERVICE FUNCTIONALITY, THE FIRST SKILL INDICATING A DEPENDENCY ON THE SECOND SKILL ⟍1704

GENERATE A DEPENDENCY GRAPH BASED AT LEAST IN PART ON THE PLURALITY OF SKILLS CORRESPONDING TO THE PLURALITY OF SERVICES, THE DEPENDENCY GRAPH INDICATING THE DEPENDENCY BETWEEN THE FIRST SKILL AND THE SECOND SKILL ⟍1706

PROVIDE, TO A USER DEVICE, AT LEAST A PORTION OF THE DEPENDENCY GRAPH FOR PRESENTATION AT THE USER INTERFACE, THE USER INTERFACE PROVIDING NAVIGATION OPTIONS ASSOCIATED WITH NAVIGATING WITHIN THE DEPENDENCY GRAPH, THE DEPENDENCY GRAPH REPRESENTING A BUILD DEPENDENCY GRAPH UTILIZED BY AN ORCHESTRATOR TO BOOTSTRAP THE PLURALITY OF SERVICES WHILE BUILDING THE DATA CENTER ⟍1708

TECHNIQUES FOR BUILDING A DATA CENTER USING A SKILLS SERVICE

CROSS-REFERENCE TO RELATED APPLICATIONS

This non-provisional application claims priority to U.S. Provisional Patent Application No. 63/503,143, filed on May 18, 2023, entitled "Techniques for Validating and Tracking Region Build Skills," the disclosure of which is herein incorporated by reference in its entirety for all purposes.

BACKGROUND

Today, cloud infrastructure services utilize many individual services to build a data center (e.g., to bootstrap various resources in a data center of a particular geographic region). In some examples, a region is a logical abstraction corresponding to a localized geographical area in which one or more data centers are (or are to be) located. Building a data center may include provisioning and configuring infrastructure resources and deploying code to those resources (e.g., for a variety of services). The operations for building a data center may be collectively referred to as performing a "region build." Any suitable number of data centers may be included in a region and therefore a region build may include operations for building multiple data centers. Bootstrapping operations for one service may depend on other functionality and/or services of the region which may not yet be available. As the number of service teams and regions grows, the tasks performed for orchestrating provisioning and deployment drastically increase. Conventional tools for building a region require significant manual effort or automated techniques present drawbacks with respect to overhead, accuracy, and ease of use. Improvements can be made.

BRIEF SUMMARY

Embodiments of the present disclosure relate to techniques for performing an automated region build (e.g., bootstrapping (e.g., provisioning and/or deploying) resources (e.g., infrastructure component, artifacts, etc.) for any suitable number of services within a region (e.g., a geographical location associated with one or more data centers)).

At least one embodiment is directed to a computer-implemented method. The method may include preparing, by a cloud-computing service (e.g., a cloud-computing service of a cloud computing environment), a user interface configured to receive respective skill metadata defining a plurality of skills corresponding to a plurality of services to be bootstrapped during a region build corresponding to building a data center. The method may further include maintaining (e.g., by the cloud-computing service), a first skill of the plurality of skills and a second skill of the plurality of skills. In some embodiments, the first skill corresponds to first service functionality and the second skill corresponds to a second service functionality. The first skill may indicate a dependency on the second skill. The method may further include generating, by the cloud-computing service, a dependency graph based at least in part on the plurality of skills corresponding to the plurality of services. In some embodiments, the dependency graph indicates the dependency between the first skill and the second skill. The method may further include providing, by the cloud-computing service to a user device, at least a portion of the dependency graph for presentation at the user interface. In some embodiments, the user interface provides navigation options associated with navigating within the dependency graph. In some embodiments, the dependency graph represents a build dependency graph utilized by an orchestrator to bootstrap the plurality of services while building the data center.

In some embodiments, each skill of the plurality of skills is associated with a lifecycle state selected from a plurality of lifecycle states. In some embodiments, at least one lifecycle state is associated with one or more lifecycle substates and each lifecycle substate indicates a health status corresponding to the skill.

In some embodiments, the computer-implemented method may further include validating, by the cloud-computing service, a build dependency graph generated by the orchestrator based at least in part on the dependency graph generated by the cloud-computing service.

In some embodiments, the cloud-computing service manages a service catalog that is presentable at one or more user interfaces hosted by the cloud-computing service. In some embodiments, the cloud-computing service manages a skills catalog that is presentable at one or more user interfaces hosted by the cloud-computing service.

In some embodiments, the computer-implemented method further includes identifying, by the cloud-computing service, a blockage while building the data center. The method may further include identifying, based at least in part on the dependency graph, that the second skill is a probable contributor to the blockage. The method may further include presenting an indication that the second skill is the probable contributor to the blockage.

In some embodiments, the computer-implemented method further includes monitoring for one or more indications that a status corresponding to an individual skill of the plurality of skills has changed. The method may further include updating, by the cloud-computing service, one or more attributes associated with the individual skill to reflect a change in the status. In some embodiments, the orchestrator initiates, based at least in part on changes in the status corresponding to the individual skill, bootstrapping operations associated with bootstrapping the plurality of services while building the data center.

Another embodiment is directed to a cloud-computing service comprising one or more processors and memory storing instructions that, when executed by the one or more processors, cause the cloud-computing service to perform the method(s) disclosed herein.

Still another embodiment is directed to a non-transitory computer-readable medium storing computer-executable instructions that, when executed by one or more processors of a cloud-computing service, cause the cloud-computing service to perform the method(s) disclosed herein.

BRIEF DESCRIPTION OF THE DRAWINGS

To easily identify the discussion of any particular element or act, the most significant digit or digits in a reference number refer to the figure number in which that element is first introduced.

FIGS. 8-12 include respective block diagrams depicting a number of example user interfaces related to creating a skill, in accordance with at least one embodiment.

FIG. 17 is a flow diagram illustrating an example method of performing a region build utilizing the components of a skills service (e.g., Puffin Central and Puffin Regional), in accordance with at least one embodiment.

DETAILED DESCRIPTION

Figure 1:
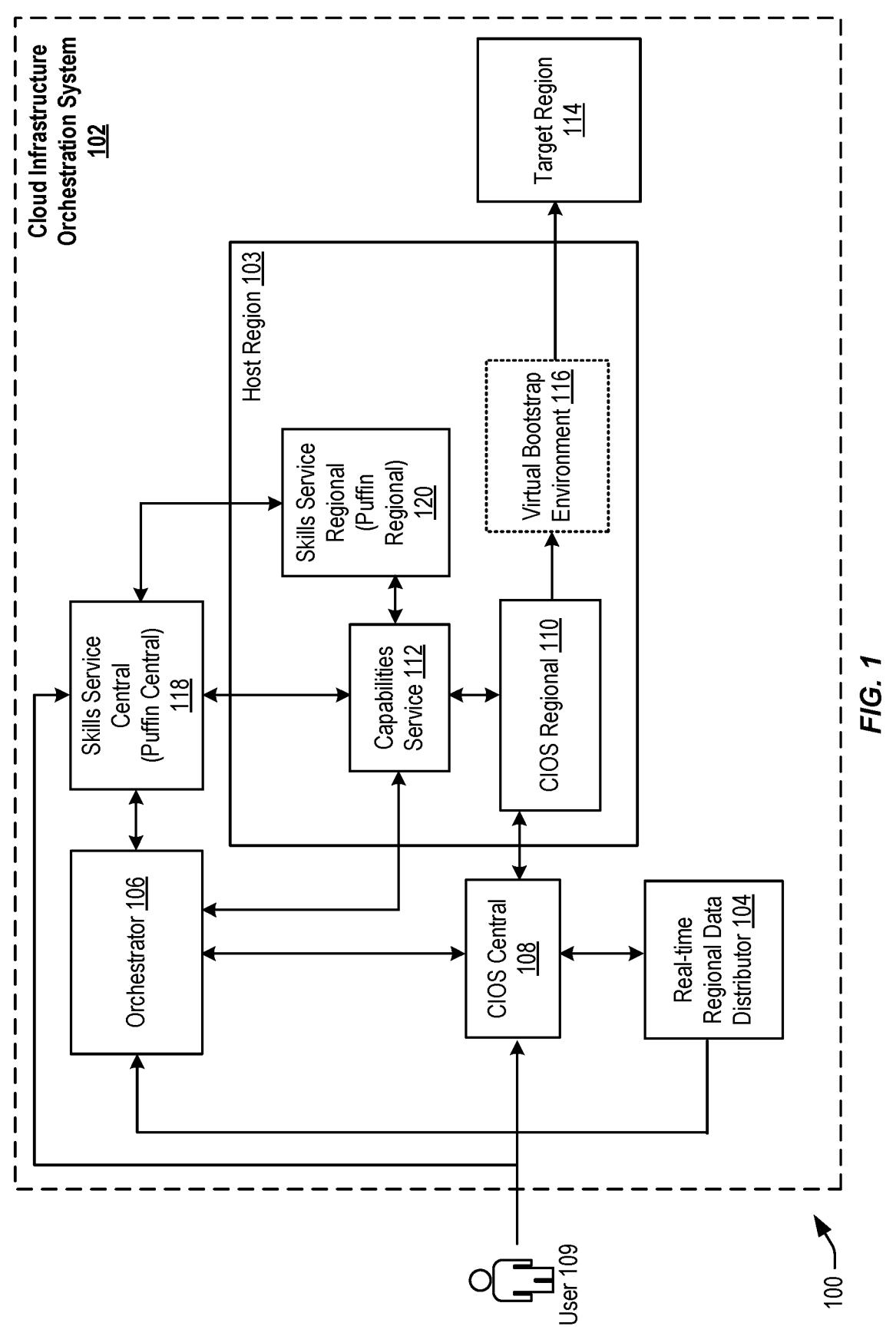
FIG. 1 is a block diagram of an environment in which a Cloud Infrastructure Orchestration System (CIOS), including multiple components of a Skills Service (e.g., Puffin Central and Puffin Regional), may operate to dynamically provide bootstrap services in a region, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premise servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data enter and includes a set of resources that are used to provide the set of services.

Building a new data center in a region is a very complex activity requiring coordination between various teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually initiated or manually controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

Embodiments of the present disclosure relate to techniques for performing an automated region build (e.g., bootstrapping (e.g., provisioning and/or deploying) resources (e.g., infrastructure component, artifacts, etc.) for any suitable number of services within a region (e.g., a geographical location associated with one or more data centers)). Bootstrapping operations can be coordinated and orchestrated by an orchestrator (e.g., a Multi-Flock Orchestrator, an orchestration service, etc.). In previous implementations, the orchestrator attempted to automatically detect dependencies between operations. The orchestrator maintained various versions of configuration files and/or software artifacts and attempted to intelligently and automatically identify a particular version set with which a region build is to be performed. As a region was built, the orchestrator utilized capabilities (e.g., tags that could be toggled on or off to indicate availability of a resource or functionality) to drive these operations. However, both the automatic detection techniques and the use of capabilities included drawbacks. Embodiments of the present disclosure provide improvements over the previous implementations.

Today, during Large Scale Events (LSEs) (e.g., events in which a substantial error or delay is experienced in a region build), incident management and region build operators frequently incur wide-spread overhead and sometimes delays, e.g., in collecting status, attribution of the issue, assessment of impacts, and the recovery of services, due to the heavily human-based and non-systemic approach of conventional approaches. Due to the complexity of the various dependencies between services, it can be extremely difficult and time intensive for operators to identify the contributing cause of the event. This causes delays in remediation as well as the ability to assess when an event has concluded. Similarly, building a region includes challenges in which human involvement may be utilized to troubleshoot and/or detect of failures or blocking situations. Conventionally, it is difficult for service teams to determine what dependencies exist for their service. Both the dependencies the service may have on other services, and vice versa. Additionally, service teams have incomplete indicators ahead of an actual region build as to whether their region build design will have critical issues (such as cyclic dependencies) that prevent or delay the build of their service.

The techniques discussed herein include utilizing a new construct (e.g., "skills") which extends the previous concept of capabilities and enables improvements over the previous capabilities-based implementations. By way of example, skills may be scoped (e.g., controllable through access and authorization policies), versioned, and attributed to a particular service or contact. Skills may be associated with a lifecycle and may be monitored for health and are designed to be more highly visible/accessible than capabilities. A skills service (e.g., referred to as "Puffin") may provide authoritative registry for services. Various user interfaces managed by the service may be utilized to define, maintain, and manage skills that each service offers, as well as their dependency relationships with other services. Using this approach, Puffin may be utilized to declare and persist strongly defined metadata of services in a versioned manner. This metadata may be used to generate a blueprint for build-time and run-time dependencies. These blueprints can be used to validate build plans, to drive orchestration decisions during region build, and to improve time-to-engage and time-to-diagnose measures during region build and/or LSE events. Puffin is designed to remove operational overhead, improve information accuracy, surface critical data including the ability to present interconnected service skills dependencies in a visual graph. Puffin provides health information and stores both run-time and build-time dependencies to infer service to service dependencies. These techniques improve error detection and contributing cause analysis process, improve understanding of the service, build, and/or event, reduce risk of error, and reduce recovery time, among other benefits.

Certain Definitions

A "region" is a logical abstraction corresponding to a geographical location. A region can include any suitable number of one or more execution targets. In some embodiments, an execution target could correspond to a data center.

An "execution target" refers to a unit of change for executing a release. A "release" refers to a representation of an intent to orchestrate a specific change to a service (e.g., deploy version 8, "add an internal DNS record," etc.). For most services, an execution target represents an "instance" of a service. A single service can be bootstrapped to each of one or more execution targets. An execution target may be associated with a set of devices (e.g., a data center).

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component (e.g., a physical or virtual host) or a Kubernetes engine cluster, this may include, but is not limited to, software (e.g., an application), configuration information (e.g., a configuration file) for an infrastructure component, or the like.

A "flock config" refers to a configuration file (or a set of configuration files) that describes a set of all resources (e.g., infrastructure components and artifacts, also referred to as a "flock") associated with a single service. A flock config may include declarative statements that specify one or more aspects corresponding to a desired state of the resources of the service.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPsec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A "host region" refers to a region that hosts a virtual bootstrap environment (ViBE). A host region may be used to bootstrap a ViBE.

A "target region" refers to a region under build.

A "capability" identifies is a resource used during region build that signals that another resource, service, or feature is available, or that an event has occurred. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use. A capability may be associated with an alphanumeric identifier and may be used to indicate the capability is available or unavailable.

"Publishing a capability" refers to "publishing" as used in a "publisher-subscriber" computing design or otherwise providing an indication that a particular capability is available (or unavailable). The capabilities are "published" (e.g., collected by a capabilities service, provided to a capabilities service, pushed, pulled, etc.) to provide an indication that functionality of a resource/service is available. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a capabilities service.

A "Capabilities Service" may be a service configured to monitor dependencies between different flocks. A capabilities service may be provided within a Cloud Infrastructure Orchestration Service and may be used to identify what capabilities, services, features have been made available in a region. The described capabilities service may service as a central repository/authority of all capabilities that have been published in the region (e.g., during a region build).

An "Orchestrator" is intended to refer to a service or system that initiates tasks involved in bootstrapping one or more services during a region build.

A Multi-Flock Orchestrator (MFO), an example of an orchestrator, may be a computing component (e.g., a service) configured that coordinates events between components of the CIOS to automatically provision and deploy services to a target region (e.g., a new region). An MFO may track relevant events (e.g., indicated through capabilities) for each service of the region build and takes actions in response to those events (e.g., based on the publishing of a capability or other indication that the capability is available).

A "Real-time Regional Data Distributor" (RRDD) may be a service or system configured to manage region data. This region data can be injected into flock configs to dynamically create execution targets for new regions.

A "Skills Service" (also referred to as "Puffin") may be a service or system that is configured to store planned and/or actual dependency relationships between services, resources, or units of functionality (also referred to as "service functionality"). It should be appreciated that the unit of functionality may relate to functionality provided by a computing component other than a service.

A "Telemetry Service" may be a service or system that manages/monitors various alarms and corresponding alarm states.

A "Service Plan and Manifest" (SPAM) refers to a deterministic specification of the process for building a service. In some embodiments, a SPAM details a combination and order of releases needed to build the service. A manifest of the SPAM may define all resources to be used, while the service plan specifies a plan of execution based on dependencies (expressed via skills).

A "skill" is intended to refer to an improved version of a capability. A skill may represent a functional unit that a service exposes and offers to consumers (e.g., other services). This functional unit (also referred to as "service functionality") can include all or a subset of the total functionality associated with a service. In some embodiments, skills may be scoped where access is controlled based on access and/or authorization policies and/or based on an association with a particular namespace. A skill may be provided in multiple versions in which one or more aspects of the skill differs from other versions, where each skill version represents a specific implementation of the skill. Each skill version may be identifiable using a unique skill identifier. In some embodiments, a skill may correspond to one or more previously defined capabilities in order to provide backward compatibility with previous capabilities-based region build implementations. A skill may be monitored for health and may be configured to maintain health data. A "skill" may collectively refer to any suitable number of data structures (e.g., the skill metadata 404 of FIG. 4) in which data defining the skill may be maintained.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional, both of which will be described in further detail below) that may be configured to manage bootstrapping tasks (provisioning and deployment) for a given service and an Orchestrator (e.g., a multi-flock orchestrator, also described in further detail below) configured to initiate/manage region builds (e.g., bootstrapping operations corresponding to multiple services in a region).

CIOS enables region building and world-wide infrastructure provisioning and code deployment with minimal manual run-time effort from service teams (e.g., beyond an initial approval and/or physical transportation of hardware, in some instances). The high-level responsibilities of CIOS include, but are not limited to, coordinating region builds in an automated fashion with minimal human intervention, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

CIOS can perform plan generation, where differences between the desired and current state of the resources are identified. Part of plan generation can include identifying the operations that would need to be executed to bring the resources from the current state to the desired state. Once the user is satisfied with a plan, the plan can then be marked as approved or rejected. Thus, users can spend less time reasoning about the plan and the plans are more accurate because they are machine generated. Plans are almost too detailed for human consumption; however, CIOS can provide this data via a sophisticated user interface (UI).

In some examples, CIOS can handle execution of change management by automatically executing the approved plan. Once an execution plan has been created and approved, engineers may no longer need to participate in change management unless CIOS initiates roll-back. CIOS can handle rolling back to a previous service version by automatically generating a plan that returns the service to a previous (e.g., pre-release) state (e.g., when CIOS detects service health degradation while executing).

CIOS can measure service health by monitoring alarms and executing integration tests. CIOS can help teams quickly define roll-back behavior in the event of service degradation, which it can later execute automatically. CIOS can automatically generate and display plans and can track approval. CIOS can combine the functionality of provisioning and deployment in a single system that coordinates these tasks across a region build. CIOS also supports automated discovery of flocks (e.g., service resources such as flock config(s) corresponding to any suitable number of services), artifacts, resources, and dependencies. CIOS can discover dependencies between execution tasks at every level (e.g., resource level, execution target level, phase level, service level, etc.) through a static analysis (e.g., including parsing and processing content) of one or more configuration files. Using these dependencies, CIOS can generate various data structures from these dependencies that can be used to drive task execution (e.g., tasks regarding provisioning of infrastructure resources and deployment of artifacts across the region).

FIG. 1 is a block diagram of an environment 100 in which a Cloud Infrastructure Orchestration System (CIOS) 102, including multiple components of a Skills Service (e.g., Skill Service Central (Puffin Central) 118 and Skills Service Regional (Puffin Regional) 120), may operate to dynamically provide bootstrap services in a region, according to at least one embodiment. CIOS 102 can include, but is not limited to, the following components: Real-time Regional Data Distributor (RRDD) 104, Orchestrator 106, CIOS Central 108, CIOS Regional 110, Capabilities Service 112, Puffin Central 118, and Puffin Regional 120. Specific functionality provided by CIOS Central 108 and CIOS Regional 110 is described in more detail in U.S. application Ser. No. 17/016,754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail in U.S. application Ser. No. 17/016,754 and below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 (also referred to as a "provisioning and deployment manager") may be configured to manage region data, either directly or indirectly (e.g., via RRDD 104). CIOS Central 108 may be configured to compile flock configs to inject region data as variables within the flock configs.

Each instance of CIOS Regional 110 may correspond to a module configured to execute bootstrapping tasks that are associated with a single service of a region. CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes are needed to one or more resources. For example, CIOS Regional 110 can determine that one or more infrastructure components need to be provisioned, one or more artifacts deployed, or any suitable change needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to Orchestrator 106, CIOS Regional 110 (e.g., each instance of CIOS Regional 110), Puffin Regional 120, and/or Puffin Central 118. In some embodiments, Capabilities Service 112 may store capabilities data in a data store that is accessible to one or more components of CIOS 102. Orchestrator 106, CIOS Regional 110 (e.g., each instance of CIOS Regional 110), Puffin Regional 120, and/or Puffin Central 118, and/or any suitable component or module of CIOS Regional 110 may be configured to request capabilities data from Capabilities Service 112 or otherwise obtain capabilities data (e.g., from a data store configured to store capabilities data generated by the Capabilities Service 112). Although the Capabilities Service 112 is depicted as being a separate component of CIOS 102, it should be appreciated that, in some embodiments, the functionality provided by Capabilities Service 112 may be provided, in whole or in part, as part of the Skills Service via any suitable combination of Puffin Central 118 and Puffin Regional 120.

In some embodiments, each regional component such as CIOS regional 110, Capabilities Service 112, Puffin Regional 120, and/or Virtual Bootstrap Environment 116 may be one of many regional components. Each regional component may be specific to a given region (e.g., as depicted in FIG. 1, Host Region 103). Therefore, another region may include similar, but separate, components that are specific to that region. In some embodiments, central components (e.g., Orchestrator 106, CIOS Central 108, RRDD 104, and Puffin Central 118) may include one or more components that are configured to manage build operations corresponding to one or more regions. By way of example only, a single orchestrator (orchestrator 106) may be utilized to manage bootstrapping operations for building any suitable number of data centers, or multiple instances of orchestrator 106 may be utilized, each driving the bootstrapping operations for a subset of those data centers or a single data center.

In some embodiments, Orchestrator 106 (an example of which may be a multi-flock orchestrator) may be configured to drive region build efforts. In some embodiments, Orchestrator 106 can manage information that describes what flock/flock config versions and/or artifact versions are to be utilized to bootstrap a given service within a region (or to make a unit of change to a target region). In some embodiments, Orchestrator 106 may be configured to monitor (or be otherwise notified of) changes to the region data managed by Real-time Regional Data Distributor 104. In some embodiments, receiving an indication that region data has been changed may cause a region build to be triggered by Orchestrator 106. In some embodiments, Orchestrator 106 may collect various flock configs and artifacts to be used for a region build. Some, or all, of the flock configs may be configured to be region agnostic. That is, the flock configs may not explicitly identify what regions to which the flock is to be bootstrapped. In some embodiments, Orchestrator 106 may trigger a data injection process through which the collected flock configs are recompiled (e.g., by CIOS Central 108). During recompilation, operations may be executed (e.g., by CIOS Central 108) to cause the region data maintained by Real-time Regional Data Distributor 104 to be injected into the config files. Flock configs can reference region data through variables/parameters without requiring hard-coded identification of region data. The flock configs can be dynamically modified at run time using this data injection rather than having the region data be hardcoded, and therefore, and more difficult to change.

In some embodiments, orchestrator 106 can perform a static flock analysis in which the flock configs are parsed to identify dependencies between resources, execution targets, phases, and flocks, and in particular to identify circular dependencies that need to be removed. In some embodiments, Orchestrator 106 can generate any suitable number of data structures based on the dependencies identified. These data structures (e.g., directed acyclic graph(s), linked lists, etc.) may be utilized by CIOS 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, Orchestrator 106 may be configured to notify any suitable service teams that changes are required to the corresponding flock config to correct these circular dependencies. Orchestrator 106 can be configured to traverse one or more data structures to manage an order by which services are bootstrapped to a region. Orchestrator 106 can identify (e.g., using data obtained from Capabilities Service 112) capabilities available within a given region at any given time. Orchestrator 106 can this data to identify when it can bootstrap a service, when bootstrapping is blocked, and/or when bootstrapping operations associated with a previously blocked service can resume. Based on this traversal, Orchestrator 106 can perform a variety of releases in which instructions are transmitted by Orchestrator 106 to CIOS Central 108 to perform bootstrapping operations corresponding to any suitable number of flock configs. In some examples, Orchestrator 106 may be configured to identify that one or more flock configs may require multiple releases due to circular dependencies found within the graph. As a result, Orchestrator 106 may transmit multiple instruction sets to CIOS Central 108 for a given flock config to break the circular dependencies identified in the graph.

In some embodiments, Puffin Central 118 may provide a number of user interfaces with which one or more skills can be defined. Puffin Central 118 may be configured to serve as a source of truth for services and may maintain metadata including each service's upstream and downstream dependencies and service team contact information and methods for each service across regions and realms (e.g., a set of regions). Each skill may represent a function unit that a service exposes and offers to consumers (e.g., other services). In some embodiments, skills may be scoped where access is controlled based on access and/or authorization policies and/or based on an association with a particular namespace. A skill may be associated with multiple versions in which one or more aspects of the skill differs from previous versions, where each skill version represents a specific implementation of the skill. Each skill version may be identifiable using a unique skill identifier. In some embodiments, Puffin Central 118 may be configured to generate a skill corresponding to a previously defined capability in order to provide backward compatibility with previous capabilities-based region build implementations.

In some embodiments, a skill may be mapped to one or more capabilities. Puffin Regional 120 may be configured to publish skills based on capabilities published by the capabilities service 112 and/or Puffin Regional 120 may publish capabilities to the capabilities service 112 based at least in part on publishing a skill. In some embodiments, some services may utilize flock configurations that express progress using capabilities, while other services may utilize a service plan and manifest that defines a deterministic build process in which progress is expressed with skills. Using the mapping between skills and capabilities, Puffin Regional 120 may enable a region build to be performed using any suitable combination of capabilities and/or skills as an indicator of progress.

In some embodiments, any suitable computing component of the Puffin Service (e.g., Puffin Central 118 and/or Puffin Regional 120) may be configured to monitor the health and/or lifecycle of a skill according to a predefined skill lifecycle. Health monitoring may be performed using one or more alarms that are associated with a given skill. In some embodiments, a telemetry service (not depicted) may utilize an application programming interface provided the Puffin Service (including Puffin Central 118 and Puffin Regional 120) when an alarm is triggered. The Puffin Service may present, via one or more user interfaces, information related to the health of a skill based on these triggered alarms and their corresponding association to a given skill.

In some embodiments, the Puffin Service (e.g., Puffin Central 118 and/or Puffin Regional 120) may expose one or more application programming interfaces (APIs) with which validation operations may be performed. By way of example, a SPAM describing the build process with respect to one or more services may be provided via a given API. The Puffin Service may execute any suitable operations for validating that all services and skills identified in the SPAM have been previously registered with the Puffin Service and that the build process defined in the SPAM does not violate previously defined dependency relationships.

The particular user interfaces, data, and processes for obtaining and managing metadata related to all services and skills is discussed in more detail with respect to FIGS. 4-19.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment 116. Virtual bootstrap environment (ViBE) 116 may be an overlay network that is hosted by host region 103 (a preexisting region that has previously been configured with a core set of services and which is communicatively available and secure). Orchestrator 106 can leverage resources of the host region 103 to bootstrap resources to the VIBE 116 (generally referred to as "building the ViBE"). By way of example, Orchestrator 106 can provide instructions through CIOS Central 108 that cause an instance of CIOS Regional 110 within a host region (e.g., host region 103) to bootstrap another instance of CIOS Regional within the VIBE 116. Once the CIOS Regional within the ViBE is available for processing, bootstrapping the services for the target region 114 can continue within the VIBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided.

Figure 2:
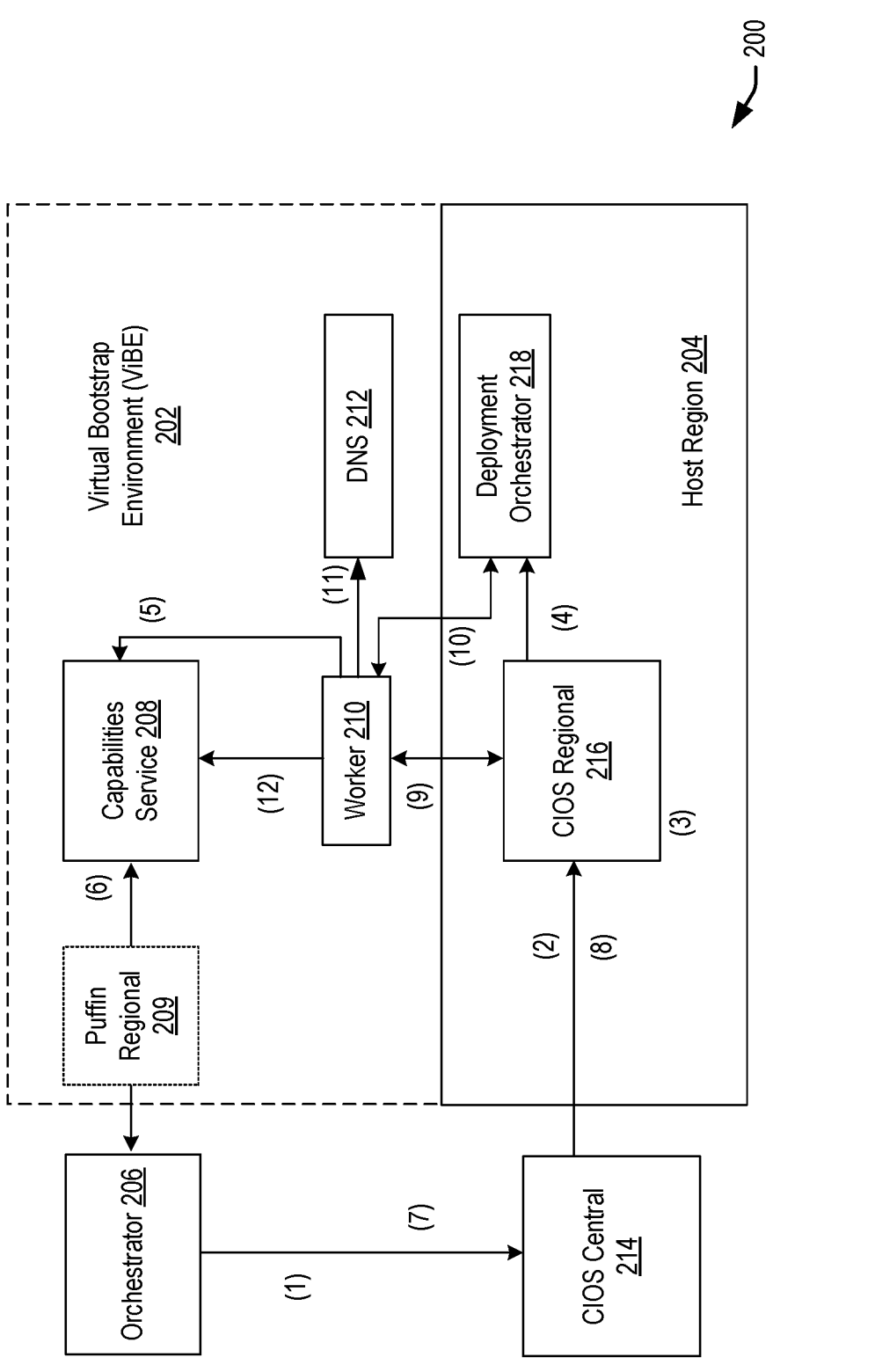
FIG. 2 is a block diagram for illustrating an environment and method for building a virtual bootstrap environment (ViBE), in accordance with at least one embodiment.

FIG. 2 is a block diagram for illustrating an environment 200 and method for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a core set of services may be bootstrapped. While those core set of services exist in the host region 204, they do not yet exist in the ViBE (nor the target region). These essential core services provide the functionality needed to provision devices, establish a chain of trust to the new region, and deploy remaining services (e.g., flocks) into a region. The VIBE 202 may be a tenancy that is deployed in a host region 204. It can be thought of as a virtual region.

When the target region is available to provide bootstrapping operations, the VIBE 202 can be connected to the target region so that services in the ViBE can interact with the services and/or infrastructure components of the target region. This will enable deployment of production level services, instead of self-contained seed services as in previous systems, and will require connectivity over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the ViBE 202 and connected to the service enclave of a region (e.g., host region 204) in order to provision hardware and deploy services until the target region is self-sufficient and can be communicated with directly. Utilizing the VIBE 202 allows for standing up the dependencies and services needed to be able to provision/prepare infrastructure and deploy software while making use of the host region's resources in order to break circular dependencies of core services.

Orchestrator 206 may be configured to perform operations to build (e.g., configure) ViBE 202. Orchestrator 206 can obtain applicable flock configs and/or SPAMs corresponding to various resources to be bootstrapped to the new region (in this case, a ViBE region, ViBE 202). By way of example, Orchestrator 206 may obtain a flock config (e.g., a "ViBE flock config") that identifies aspects of bootstrapping Capabilities Service 208 (e.g., an example of Capabilities Service 112) and Worker 210. In some embodiments, Orchestrator 206 may additionally obtain a flock configuration identifying aspects of bootstrapping any suitable portion of Skills Service 209 (e.g., Puffin Regional 120 of FIG. 1). In some embodiments, one or more service plan and manifests (SPAMs) may be used to identify these aspects (e.g., one or more flock configuration files and/or resources/artifacts needed to bootstrap a service from start to finish) for bootstrapping any suitable combination of Capabilities Service 208, Worker 210, and/or Skills Service 209. As another example, Orchestrator 206 may obtain another flock config and/or SPAM corresponding to bootstrapping Domain Name Service (DNS) 212 to ViBE 202.

At step 1, Orchestrator 206 may instruct CIOS Central 214 (e.g., an example of CIOS Central 108 and CIOS Central 214 of FIGS. 1 and 2, respectively). For example, Orchestrator 206 may transmit a request (e.g., including the ViBE flock config) to request bootstrapping of the Capabilities Service 208 and Worker 210 (and in some embodiments, Skills Service 209) that, at this time do not yet exist in the VIBE 202. In some embodiments, CIOS Central 214 may have access to all flock configs and/or SPAMs. Therefore, in some examples, Orchestrator 206 may transmit an identifier for the ViBE flock config or SPAM rather than the file itself, and CIOS Central 214 may independently obtain it from storage (e.g., from database (DB) 308 or DB 312 of FIG. 3).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Capabilities Service 208 and Worker 210 to be bootstrapped within ViBE 202.

At step 5, a capability may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 are available for processing.

At step 6, Orchestrator 206 may identify that the capability and/or skill indicating that Capabilities Service 208 and Worker 210 are available based on receiving or obtaining data (an identifier corresponding to the capability) from the Capabilities Service 208 and/or Puffin Regional 209.

In some embodiments, published capabilities may be processed by Puffin Regional 209 (e.g., Puffin Regional 120 of FIG. 1) prior to processing by Orchestrator 206. In some embodiments, Puffin Regional 209 may be configured to provide forward and backward compatibility between skills and capabilities. By way of example, in some embodiments, if a capability is published to Puffin Regional 209, Puffin Regional 209 may query known skills (e.g., via a skills database table) to check if any skill is associated with the capability. If no Skill is associated with the capability, Puffin Regional 209 may be configured to create a skill (referred to as a "shadow skill) for the capability. When orchestrator 209 publishes skills during the process of performing a build, Puffin Regional 209 may intercept the skill and identify one or more capabilities that are associated with the skill. Puffin Regional 209 may publish any capabilities associated with the skill that have not yet been published. In this manner, Puffin Regional 209 may support full compatibility between capabilities and skills such that a mix of the two may be utilized to progress a region build.

At step 7, as a result of receiving/obtaining the data at step 6, the Orchestrator 206 may instruct CIOS Central 214 to bootstrap a DNS service (e.g., DNS 212) to the VIBE 202. The instructions may identify or include a particular flock config corresponding to the DNS service.

At step 8, the CIOS Central 214 may instruct the CIOS Regional 216 to deploy DNS 212 to the ViBE 202. In some embodiments, the DNS flock config for the DNS 212 is provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify (e.g., from comparing the flock config (the desired state) to a current state of the (currently non-existing) resources associated with the flock) a set of operations that need to be executed to deploy DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 may notify Capabilities Service 208 or Puffin Regional 209 (directly, or via Capabilities Service 208) that DNS 212 is available in ViBE 202. Orchestrator 206 may subsequently identify that the resources associated with the ViBE flock config and the DNS flock config are available any may proceed to bootstrap any suitable number of additional resources to the VIBE.

Figure 20:
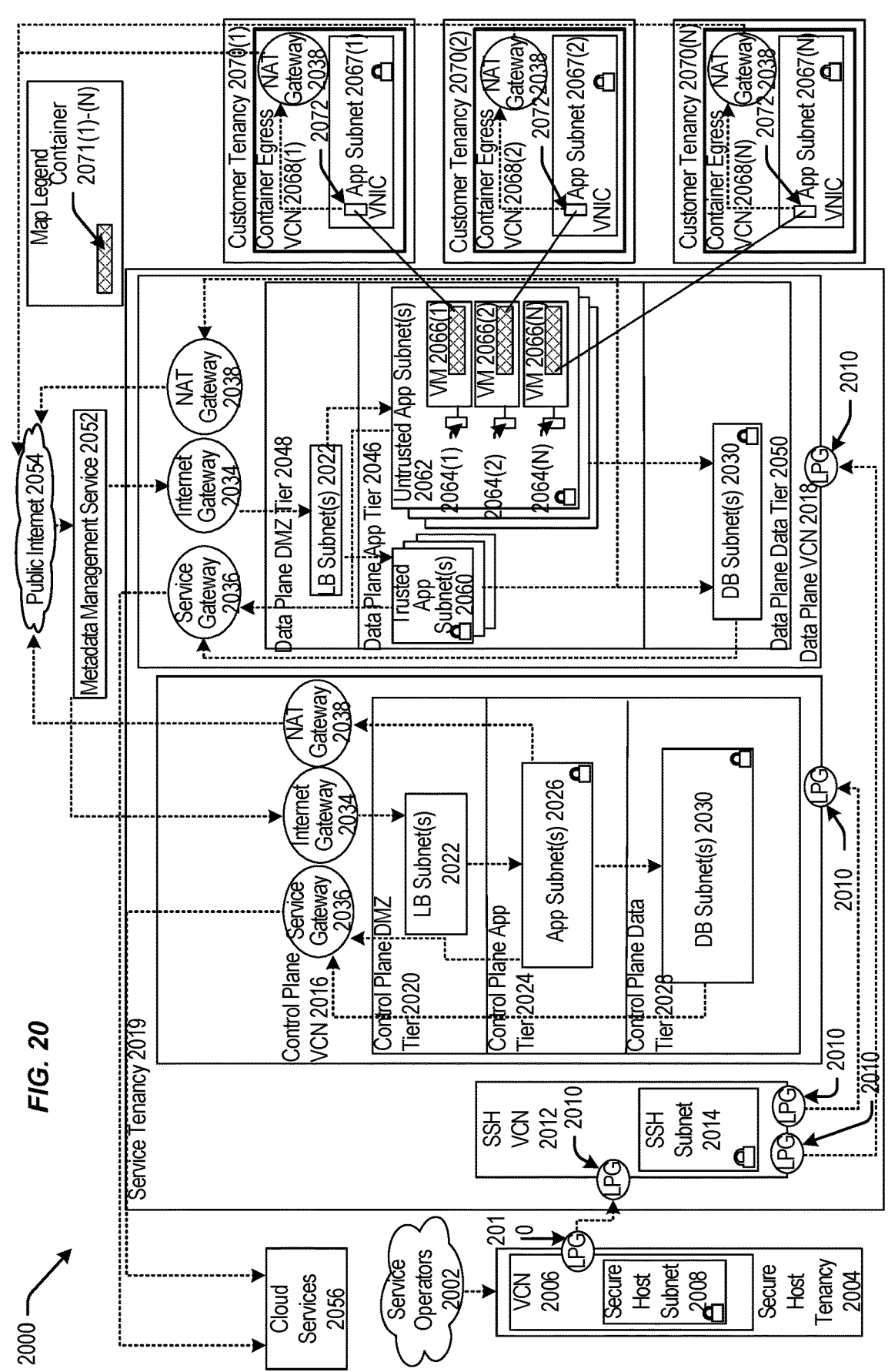
FIG. 20 is a block diagram illustrating another pattern for implementing a cloud infrastructure as a service system, according to at least one embodiment.

After steps 1-12 are concluded, the process for building the ViBE 202 can be considered complete and the ViBE 202 can be considered built and ready for additional bootstrapping (e.g., the bootstrapping of various cloud services such as cloud services 2056 of FIG. 20.

Figure 3:
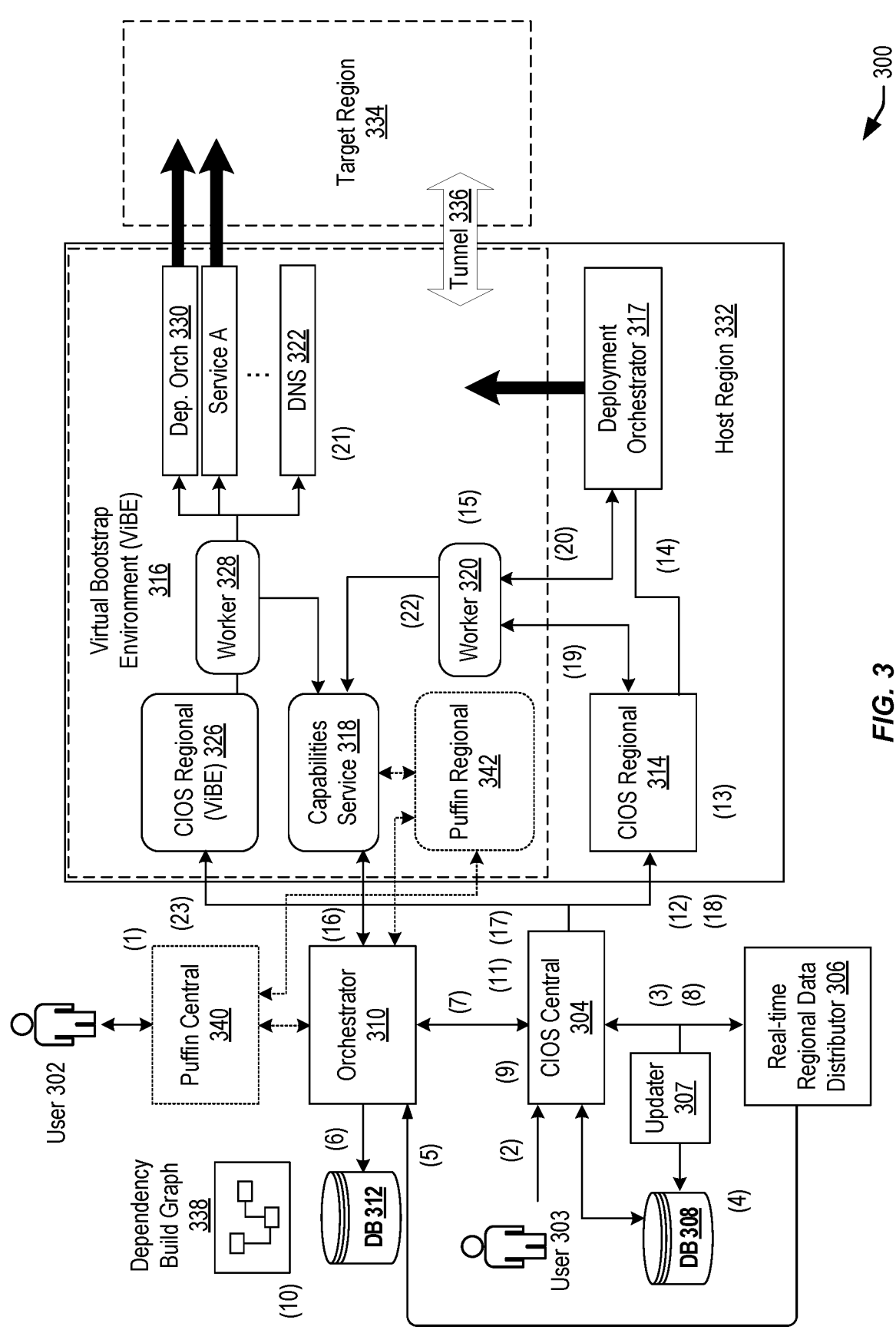
FIG. 3 is a block diagram for illustrating an environment and method for bootstrapping services to a target region utilizing the ViBE, in accordance with at least one embodiment.

FIG. 3 is a block diagram for illustrating an environment 300 and method for bootstrapping services to a target region utilizing the ViBE, according to at least one embodiment.

At step 1, user 302 (e.g., a service team member) may interact with any suitable number of user interfaces hosted by Puffin Central 340 (e.g., Puffin Central 118 of FIG. 1). Some examples of these user interfaces are discussed below with respect to FIGS. 4-19. Puffin Central 340 may be configured to read service and/or skill metadata from predefined files or the user 302 may enter service and/or skill metadata at one or more of the provided user interfaces. Puffin Central 340 may store all service and skill metadata and serve as a centralized authority for the same. At any suitable time, any suitable user may view the service and/or skill metadata such as prior to and/or during performance of the region build.

At step 2, user 303 may utilize any suitable user interface provided by CIOS Central 304 (an example of CIOS Central 108 and CIOS Central 214 of FIGS. 1 and 2, respectively) to modify region data. By way of example, user 303 may create a new region to which a number of services are to be bootstrapped.

At step 3, CIOS Central 304 may execute operations to send the change to RRDD 306 (e.g., an example of RRDD 104 of FIG. 1). At step 4, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 5, Orchestrator 310 (an example of the Orchestrator 106 and 206 of FIGS. 1 and 2, respectively) may detect the change in region data. In some embodiments, Orchestrator 310 may be configured to poll RRDD 306 for changes in region data. In some embodiments, RRDD 306 may be configured to publish or otherwise notify Orchestrator 310 of region data changes.

At step 6, detecting the change in region data may trigger Orchestrator 310 to obtain a version set (e.g., a version set associated with a particular identifier such as a "golden version set" identifier). identifying a particular version for each flock (e.g., service) that is to be bootstrapped to the new region and a particular version for each artifact corresponding to that flock. The version set may be obtained from DB 312. As flocks evolve and change, the versions for their corresponding configs and artifacts used for region build may change. These changes may be persisted in DB 312 such that Orchestrator 310 may identify which versions of flock configs and artifacts to use for building a region (e.g., a ViBE region, a Target Region/non-ViBE Region, etc. The flock configs (e.g., all versions of the flock configs) and/or artifacts (e.g., all versions of the artifacts) may be stored in DB 308, DB 312, or any suitable data store accessible to the CIOS Central 304 and/or Orchestrator 310.

At step 7, Orchestrator 310 may request CIOS Central 304 to recompile of each of the flock configs associated with the version set with the current region data. In some embodiments, the request may indicate a version for each flock config and/or artifact corresponding to those flock configs.

At step 8, CIOS Central 304 may obtain current region data from the DB 308 (e.g., directly, or via Real-time Regional Data Distributor 306) and retrieve any suitable flock config and artifact in accordance with the versions requested by Orchestrator 310.

At step 9, CIOS Central 304 may recompile the flock configs with the region data obtained at step 8 to inject the flock configs with current region data. CIOS Central 304 may return the compiled flock configs to Orchestrator 310. In some embodiments, CIOS Central 304 may simply indicate compilation is done, and Orchestrator 310 may access the recompiled flock configs via RRDD 306.

In some embodiments, at step 10, Orchestrator 310 may perform a static analysis of the recompiled flock configs. As part of the static analysis, Orchestrator 310 may parse the flock configs (e.g., using a library associated with a declarative infrastructure provisioner (e.g., Terraform, or the like)) to identify dependencies between flocks. From the analysis and the dependencies identified, Orchestrator 310 can generate Build Dependency Graph 338. Build Dependency Graph 338 may be an acyclic directed graph that identifies an order by which flocks are to be bootstrapped (and/or changes indicated in flock configs are to be applied) to the new region. Each node in the graph may correspond to bootstrapping any suitable portion of a particular flock. The specific bootstrapping order may be identified based at least in part on the dependencies. In some embodiments, the dependencies may be expressed as an attribute of the node and/or indicated via edges of the graph that connect the nodes. Orchestrator 310 may traverse the graph (e.g., beginning at a starting node) to drive the operations of the region build.

In some embodiments, Orchestrator 310 may utilize a cycle detection algorithm to detect the presence of a cycle (e.g., service A depends on service B and vice versa). Orchestrator 310 can identify orphaned capabilities dependencies. For example, Orchestrator 310 can identify orphaned nodes of the Build Dependency Graph 338 that do not connect to any other nodes. Orchestrator 310 may identify falsely published capabilities (e.g., when a capability was prematurely published, and the corresponding functionality is not actually yet available). Orchestrator 310 can detect from the graph that one or more instances of publishing the same capability exist. In some embodiments, any suitable number of these errors may be detected and Orchestrator 310 (or another suitable component such as CIOS Central 304) may be configured to notify or otherwise present this information to users (e.g., via an electronic notification, a user interface, or the like). In some embodiments, Orchestrator 310 may be configured to force delete/recreate resources to break circular dependencies and may once again provide instructions to CIOS Central 304 to perform bootstrapping operations for those resources and/or corresponding flock configs.

In some embodiments, the Orchestrator 310 may generate dependency build graph 338 from a set of one or more service plans and manifests (SPAMs) (also referred to as a "SPAM set"). Each of the SPAMs in the SPAM set may identify a deterministic process for building a single service, including upstream and downstream dependencies on one or more other resources, services, or features being available, or based on an event (each of which may be expressed through publishing a skill). Accordingly, in some embodiments, the dependency build graph 338 is generated through a static flock analysis of one or more flock configs to infer at least some dependencies while, in other embodiments, the dependency build graph 338 is generated in accordance with the build process explicitly defined within a SPAM set.

A starting node may correspond to bootstrapping the ViBE flock, a second node may correspond to bootstrapping DNS. The steps 11-16 may correspond to deploying (via deployment orchestrator 317, an example of the deployment orchestrator 218 of FIG. 2) a ViBE flock (e.g., the resources and/or artifacts identified in the corresponding VIBE flock config) to ViBE 316 (e.g., an example of ViBE 116 and 202 of FIGS. 1, and 2, respectively). That is, steps 11-16 of FIG. 3 generally correspond to steps 1-6 of FIG. 2. Once notified that capabilities exist corresponding to the ViBE flock being deployed (e.g., indicating that Capabilities Service 318 and Worker 320, corresponding to Capabilities Service 208 and Worker 210 of FIG. 2, are available) the Orchestrator 310 recommence traversal of the Build Dependency Graph 338 to identify next operations to be executed. In some embodiments, as discussed in connection with FIG. 2, bootstrapping the Vibe 316 may include deploying Puffin Regional 342 (e.g., Puffin Regional 120 and 209 of FIGS. 1 and 2, respectively).

By way of example, Orchestrator 310 may continue traversing the Build Dependency Graph 338 to identify that a DNS flock is to be deployed. Steps 17-22 may be executed to deploy DNS 322 (an example of the DNS 212 of FIG. 2). These operations may generally correspond to steps 7-12 of FIG. 2.

At step 22, a capability may be stored indicating that DNS 322 is available. Upon detecting this capability (e.g., via data provided by Capabilities Service 318 and/or Puffin Regional 342), Orchestrator 310 may recommence traversal of the Build Dependency Graph 338. On this traversal, the Orchestrator 310 may identify that any suitable portion of an instance of CIOS Regional (e.g., an example of CIOS Regional 314) is to be deployed to the VIBE 316. In some embodiments, steps 17-22 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available.

Upon detecting the CIOS Regional (ViBE) 326 is available, Orchestrator 310 may recommence traversal of the Build Dependency Graph 338. On this traversal, the Orchestrator 310 may identify that a deployment orchestrator (e.g., Deployment Orchestrator 330, an example of the Deployment Orchestrator 317) is to be deployed to the ViBE 316. In some embodiments, steps 16-21 may be substantially repeated with respect to deploying Deployment Orchestrator 330. Information that identifies a capability may be transmitted to the Capabilities Service 318, indicating that Deployment Orchestrator 330 is available.

After Deployment Orchestrator 330 is deployed, ViBE 316 may be considered available for processing subsequent requests. Upon detecting Deployment Orchestrator 330 is available, Orchestrator 310 may instruct subsequent bootstrapping requests to be routed to ViBE components rather than utilizing host region components (components of host region 332). Thus, Orchestrator 310 can continue traversing the Build Dependency Graph 338, at each node instructing flock deployment to the VIBE 316 via CIOS Central 304. CIOS Central 304 may request CIOS Regional (ViBE) 326 to deploy resources according to the flock config.

At some point during this process, Target Region 334 may become available. Indication that the Target Region is available may be identifiable from region data for the Target Region 334 being provided by the user 303 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the VIBE 316 to Target Region 334. As used herein, "IPSec" refers to a protocol suite for authenticating and encrypting network traffic over a network that uses Internet Protocol (IP) and can include one or more available implementations of the protocol suite (e.g., Openswan, Libreswan, strong-Swan, etc.). The network may connect the ViBE 316 to service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's 334 network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the ViBE 316. Once services (e.g., Deployment Orchestrator 330, Service A, etc.) in the VIBE 316 can establish an IPSec connection with the VPN hosts in the Target Region 334, bootstrapping operations from the VIBE 316 to the Target Region 334 may begin.

In some embodiments, the bootstrapping operations may begin with services in the ViBE 316 provisioning resources in the Target Region 334 to support hosting instances of core services as they are deployed from the ViBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to capabilities service 318, CIOS Regional (ViBE) 326 can orchestrate the deployment of instances of core services from the VIBE 316 to the Target Region 334. This deployment may be similar to the processes described above for building the VIBE 316, but using components of the ViBE (e.g., CIOS Regional (ViBE) 326, Worker 328, Deployment Orchestrator 330) instead of components of the Host Region 332 service enclave. The deployment operations may generally correspond to steps 17-22 described above.

As a service is deployed from the VIBE 316 to the Target Region 334, the DNS record associated with that service may correspond to the instance of the service in the VIBE 316. The DNS record associated with the service may be updated at a later time to complete deployment of the service to the Target Region 334. Said another way, the instance of the service in the ViBE 316 may continue to receive traffic (e.g., requests) to the service until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the VIBE 316 may no longer receive traffic for the service.

Service and Skill Management

Figure 4:
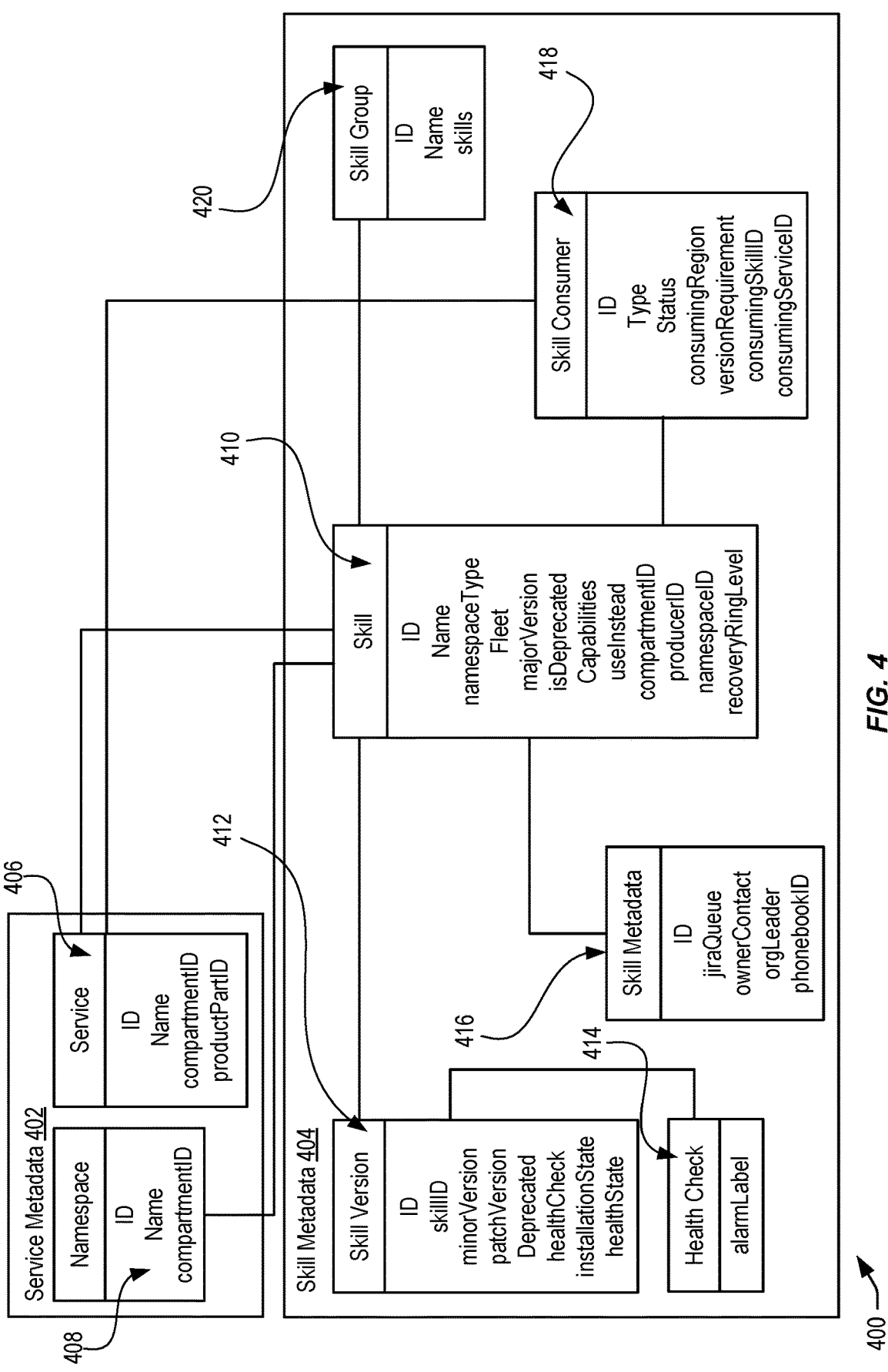
FIG. 4 is a block diagram depicting a data model representing various metadata related to a skill, in accordance with at least one embodiment.

FIG. 4 is a block diagram depicting a data model 400 representing various metadata related to a skill, in accordance with at least one embodiment. In some embodiments, service metadata 402 may include any suitable data corresponding to a service. Service metadata 402 may include any suitable attribute and corresponding value of a service, while skill metadata 404 may similarly include any suitable attribute and corresponding value of a skill. An association between service metadata 402 and skill metadata 404 may indicate a relationship between a service and a skill (e.g., that the service is expected to publish the skill during build or run time). As depicted in FIG. 4, service metadata 402 may be stored in multiple data structures (e.g., namespace data structure 406 and service data structure 408), although any suitable number or type of data structures may be utilized. The service metadata may include, but is not limited to, and suitable combination of a service identifier (ID), a service name, a compartment ID (corresponding to an identifier for a compartment to which the service is to be deployed), a product part ID, a namespace ID, a namespace name, and/or a compartment ID corresponding to the namespace. In some embodiments, service metadata 402 may be curated (read from memory, uploaded to Puffin Central 120 of FIG. 1, or the like). In some embodiments, service metadata 402 may be obtained by Puffin Central 120 from another system or, generally, using a process that does not include user input of that information through any of the user interfaces provided by Puffin Central.

Skill metadata 404 may include any suitable number of data structures (e.g., data structures 410-420). In some embodiments, skill data structure 410 may include attributes and values corresponding to any suitable combination of a skill ID, a skill name, a skill fleet, a major version, an isDeprecated indicator, a set of capabilities (e.g., a set of capability identifiers), a useInstead indicator, a compartment ID, a producer ID, a namespace ID, and a recovery ring level. In some embodiments, the values stored for compartment ID, producer ID, and/or namespace ID in the skill data structure 410 may match the compartment ID, service name, or namespace name of service metadata 402, respectively. A match between one or more of the values of these attributes may be used as an association between skill metadata 404 and service metadata 402 (indicating that the corresponding service is expected to publish the skill at some point).

Skill version data structure 412 may be associated with skill data structure 410 based at least in part on matching values of skill ID of skill version data structure 412 and ID of skill data structure 410. Skill version data structure 412 may include attributes and values corresponding to any suitable combination of an ID (for a skill version), a skill ID, a minor version, a patch version, a deprecated indicator, a health check indicator, an installation state, and a health state. Skill version data structure 412 may be associated with health check data structure 414 which may be configured to maintain any suitable number of alarm labels that is/are associated with the skill.

Skill data structure 410 may be associated with skill metadata data structure 416. Skill metadata data structure 416 may include attributes and values for any suitable combination of an ID (for an instance of the skill metadata data structure 416), a jira queue, an owner contact, an org leader, and a phonebook ID. A phonebook ID may be an identifier corresponding to a separate system that is configured to store contact data. Skill metadata data structure 416 may be used to store any suitable contact data (e.g., name, email, address, phone number, etc.) for an entity (e.g., a service team member) that is associated with the skill and the service with which the skill is associated.

Skill data structure 410 may be associated with skill consumer data structure 418. Skill consumer data structure 418 may include attributes and values for any suitable combination of an ID (for the skill consumer), a type, a status, a consuming region, a version requirement, a consuming skill ID, a consuming service ID. Skill consumer data structure 418 may be configured to store any suitable information on services and/or skills which depend on the skill defined by skill metadata 404.

Skill data structure 410 may be associated with skill group data structure 420. Skill group data structure may include attributes and values for any suitable combination of an ID (for the skill group), a skill group name, and a set of one or more skill IDs associated with the skill group.

Each of the data structures 406-420 may be stored in one or more data stores and a data structure may be identified and obtained (e.g., via a lookup and/or query operation) based at least in part on a value stored in another data structure through the associations discussed above. By way of example, all skills associated with a service may be identified through a query of the data store(s) for all skill data structures that are associated with a producer ID matching the ID from service data structure 406 of service metadata 402.

Although a number and particular combination of data structures are presented in FIG. 4, any suitable number or type of attributes and/or values and/or data structures may be utilized. The associations indicated between those data structures may be similar to those shown in FIG. 4, or the associations may differ. As a non-limiting example, the data depicted with data structures 410-420 may be similarly store in more or fewer data structures. By way of example, the data depicted within data structures 410-420 may be provided in a single data structure in some embodiments. Any suitable number of instances of skill metadata 404 (corresponding to individual skills) may be associated with a single instance of service metadata 402. The collection of instances of skill metadata 404 may be used to represent a process of deploying the service in which the order of deployment tasks is represented via the instances of skill metadata 404. Each skill corresponding to an instance of skill metadata 404 for a service may be tracked, updated, or otherwise analyzed to present information regarding the deployment process for the service, to drive deployment of the service, to validate a build plan or the build dependency graph 338 of FIG. 3, or the like.

Figure 5:
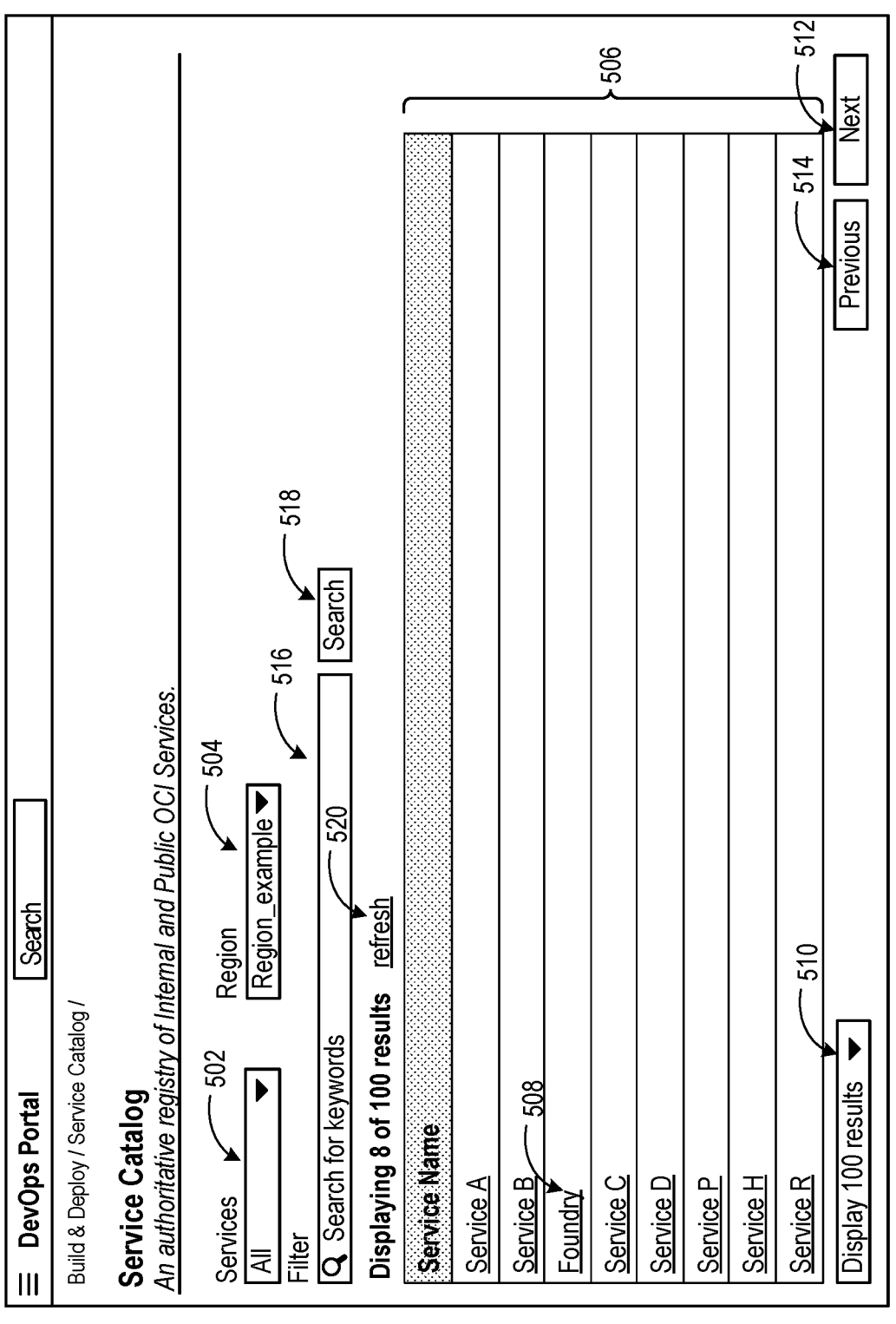
FIG. 5 is a block diagram depicting an example user interface that is configured to present a service catalog, in accordance with at least one embodiment.

FIG. 5 is a block diagram depicting an example user interface 500 configured to present a service catalog, in accordance with at least one embodiment. The term "service catalog" is intended to refer to a registry/collection of service metadata corresponding to all previously defined services. In some embodiments, the data presented via user interface 500 may be obtained (e.g., by Puffin Central 120 of FIG. 1, which may host user interface 500) from storage, from another service, or the like. In some embodiments, the data presented is curated from another system or through a process that does not include service metadata being provided via user input using the user interfaces hosted by Puffin Central 120. In some embodiments, a board of software architects (or another suitable decision-making authority) may receive requests (e.g., from one or more service teams) to define a service. The board of software architects may approve or reject such requests. If approved, service metadata data (e.g., service metadata 402 of FIG. 4) may be generated (e.g., by a process or service other than Puffin Central 120) and stored at a storage location that is accessible to Puffin Central 120. In some embodiments, service metadata (e.g., any suitable part of service metadata 402 of FIG. 4) may be provided via a user interface hosted by Puffin Central 120.

As depicted, user interface 500 may include user interface element 502 (e.g., depicted as a drop-down menu, however, other user interface elements are contemplated). User interface element 502 may be prepopulated with any suitable number of service names obtained from any suitable number of predefined instances of service metadata 402. Each entry selectable from user interface element 502 may correspond to a different instance of service metadata 402. By default, user interface element 502 may present a selection of "all" indicating an option to present service names (or any suitable portion of service metadata 402) corresponding to every unique instance of service metadata 402. Each instance of service metadata 402 may correspond to every known service that has been preregistered (e.g., every service for which an instance of service metadata 402 has been previously created and stored). In some embodiments, the particular services selectable from user interface element 502 may depend on a selection of a region indicated in user interface element 504.

In some embodiments, user interface element 504 may be populated with identifiers (e.g., a name, an alphanumeric identifier, etc.) of all known regions. In some embodiments, the particular entries selectable from user interface element 504 may be based at least in part on region data maintained by the Real-time Regional Data Distributor 104 of FIG. 1). Once selected via user interface element 504, the corresponding region identifier may be used to populate the entries selectable from user interface element 502 (e.g., with services that are associated with the selected region). In some embodiments, user interface element 504 may include an option for selecting "all" known regions.

Depending on the selections identified via user interface elements 502 and 504, area 506 may present any suitable service metadata associated with the instances of service metadata 402 corresponding to the services associated with the selected region. Updates to the selections made with user interface elements 502 and 504 may cause the area 506 to be updated with entries corresponding to the selected values of user interface elements 502 and 504. As depicted area 506 includes service names corresponding to all services associated with the region "Region_example." Although service name values are depicted in FIG. 5, it should be appreciated that any suitable combination of service metadata 402 for each applicable service may be presented via area 506. In some embodiments, each entry of area 506 may include a navigational link corresponding to a particular service. By way of example, selection of navigational link 508 may cause the user to be navigated to the user interface depicted in FIG. 6, discussed below. Any suitable number of entries may be presented in area 506. Area 506 may be scrollable and/or the user interface 500 may include presentation options (e.g., presentation option 510) for configuring paging options in which a particular number (e.g., up to 100 entries) may be initially presented within area 506. Navigational options 512 and 514 may be provided to navigate to a next or previous page, respectively.

User interface 500 may include any suitable filtering options for filtering the entries within area 506. By way of example, one or more keywords may be provided via search box 516. Upon selecting search button 518, the entries within area 506 may be updated to include entries that relate, match, or otherwise correspond to the keywords provided via search box 516.

As service metadata may be added or changed over time, user interface 500 may include refresh option 520. Upon selecting refresh option 520, Puffin Central 118 may be configured to read, parse, or otherwise update service metadata presented via user interface 500. Any suitable previous selections provided via user interface elements 502 and 504, presentation option 510, or search box 516 may be applied to the updated service metadata and corresponding entries may be provided anew via area 506.

Figure 6:
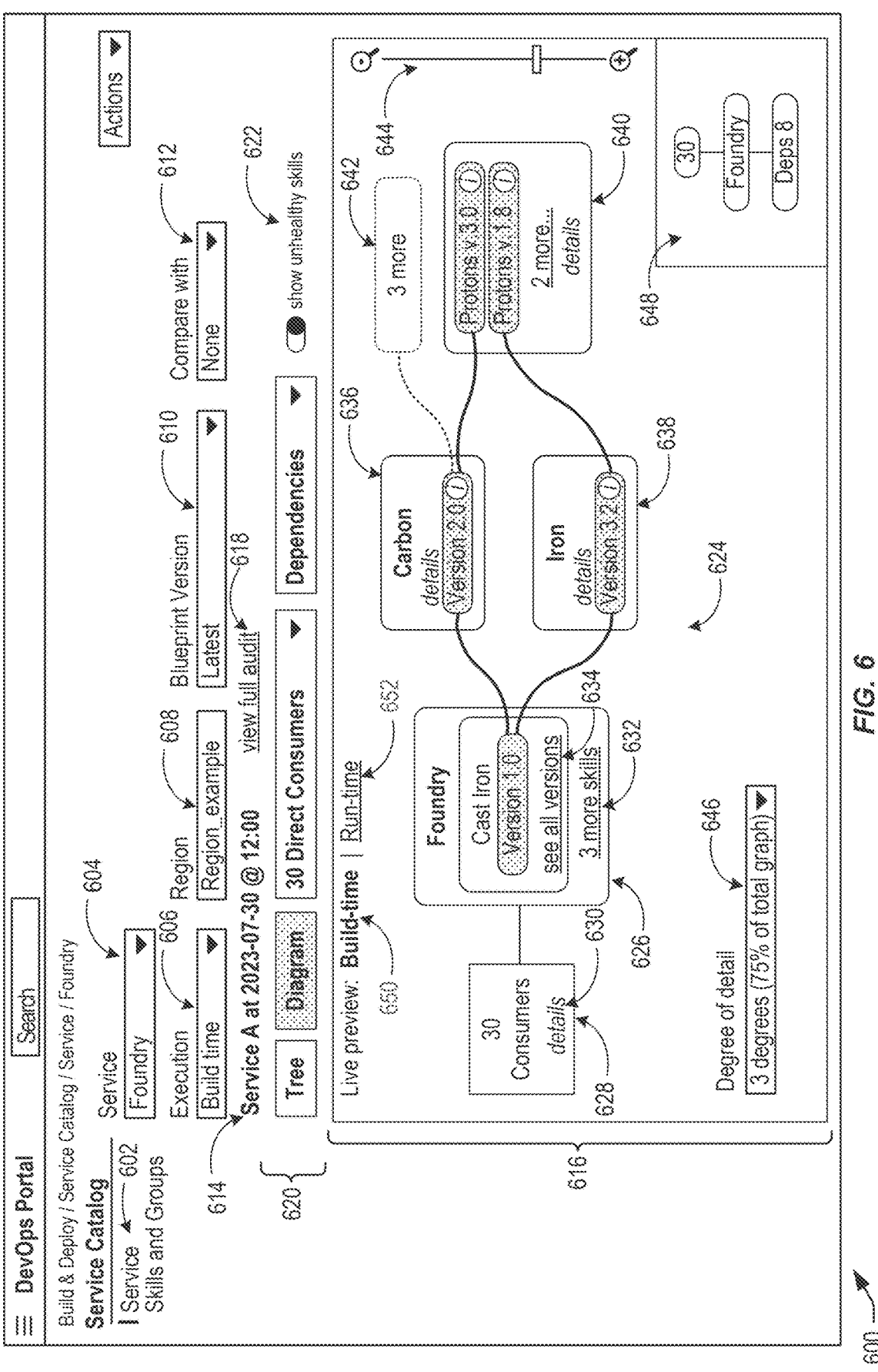
FIG. 6 is a block diagram depicting an example user interface that is configured to present metadata that is associated with a single service, in accordance with at least one embodiment.

FIG. 6 is a block diagram depicting an example user interface 600 that is configured to present metadata that is associated with a single service, in accordance with at least one embodiment. User interface 600 may be accessible via selection of navigational link 508 of FIG. 5, although other means for navigating to user interface 600 are contemplated. User interface 600 may be configured to present multiple tabs. As depicted, user interface 600 may be configured to present a service tab (indicated at 602) and a skills and group tab (not depicted). In some embodiments, the service tab may be presented by default.

The data depicted in FIG. 6 may be correspond to any suitable portion of service metadata 402 and/or skill metadata 404 of FIG. 4. According to the ongoing example, selection of the navigational link 508 of FIG. 5 may cause the data presented via user interface 600 to include data associated with the "Foundry" service. By way of example, a service name may be depicted via user interface element 604. The value (e.g., "Foundry") may be populated within user interface element 604 due to the selection of navigational link 508. In some embodiments, user interface element 604 (depicted here as a drop-down menu) may be used to select any suitable known/registered service. Selection of another known service may cause the user interface 600 to be updated with service and/or skill metadata corresponding to the service selected via user interface element 604.

User interface 600 may present any suitable combination of user interface elements 606-612. User interface element 606 may correspond to an execution type (e.g., build-time, run-time, etc.) that indicates the data presented via user interface 600 corresponds to a particular execution type. User interface element 608 may be used to select a region (e.g., "Region_example"). The data presented within user interface 600 may be updated with the service and/or skill metadata corresponding to the selected service and the selected region (as services may be associated with differing service and/or skill metadata depending on the region). User interface 600 may include user interface element 610, corresponding to a particular version of the service and/or skill metadata. In some embodiments, the options presented via user interface element 610 may include a latest version (chronologically the most recent version of service and/or skills metadata) or a particular version may be selectable via user interface element 610 based on the version(s) associated with the selected service. User interface element 612 may be used to select another skill version with which the version of the skill metadata selected via user interface element 610 may be compared. A selection via user interface element 612 may cause the user interface 600 to be updated to present both skill metadata corresponding to the version selected via user interface element 610 as well as skill metadata corresponding to the version selected via user interface element 612.

User interface 600 may include time data 614. Time data 614 may indicate a date and/or time for which the data presented with area 616 was identified. In some embodiments, option 618 may be presented via user interface 600. Selection of option 618 may cause user interface 600 to present audit data indicating dates and/or times at which service and/or skill metadata corresponding to the selections made via user interface elements 604-610 were created and/or updated.

User interface 600 may include a variety of options with area 620 such as a tree tab, a diagram tab, a consumer drop-down menu, a dependencies drop-down menu, and a toggle (e.g., toggle 620) for filtering or presenting within area unhealthy skills.

As depicted in FIG. 6, area 616 presents diagram 624 based at least in part on the selection of the diagram tab of area 620. Diagram 624 may be generated (e.g., by Puffin Central 118 of FIG. 1) based at least in part on the skills metadata of various services associated with the region. Specifically, the diagram 624 may depict dependency relationships between various skills associated with a single service. Due to the selection of the Foundry service via user interface element 604, the diagram may present a directed graph (e.g., a directed acyclic graph) and may include all or some subset of the skills associated with the Foundry service represented by element 626 (e.g., representing a node of the graph). In some embodiments, diagram 624 may be a sub-portion of a larger diagram generated by Puffin Central 118. The selections made with user interface elements 604-610 may therefore limit the data presented within area to skills metadata associated with the Foundry service (and indications of a number or particular skills which depend on one or more of the skills associated with the Foundry service), or the area 616 may be capable of presented additional skills data associated with one or more other services, but is initially focused on the skills metadata associated with the Foundry service. In some embodiments, the larger diagram may include elements/nodes corresponding to every skill associated with each service to be deployed within the selected region.

The data generated and/or selected for presentation with respect to the selections made via user interface elements 604-610 may be focused in the sense that the data includes skills information and dependencies corresponding to one or more skills of the selected service (e.g., the Foundry service), an indication or skills metadata corresponding to one or more skills on which at least one skill associated with the Foundry service depends (referred to as "upstream dependencies"), and/or indications or skills metadata corresponding to skills of other services which ultimately depend on the one or more skills associated with the foundry service (referred to as "downstream dependencies"). Element 628 may indicate there are 30 downstream dependencies or, in other words, thirty other skills consume/depend on the "Cast Iron" skill associated with the Foundry service. In some embodiments, elements may include an option (e.g., option 630 corresponding to element 628) that, if selected, cause the area 616 (or a separate window) to present additional details associated with the selected element. By way of example, selecting option 630 may cause the area 616 (or a separate window) to present identifiers corresponding to the thirty skills that depend on the "Cast Iron" skill associated with the Foundry service.

Element 626 may present any suitable combination of skills metadata corresponding to any suitable number of skills that are associated with the Foundry service. In the example depicted, the Foundry service is associated with four skills (although a service may be associated with any suitable number of skills). In some embodiments, skill metadata corresponding to a single skill (e.g., "Cast Iron") may be initially presented within element 626 an option (e.g., option 632) may be used to display data corresponding to the remaining skills initially not depicted. Similarly, a single version identifier (e.g., "Version 1.0") associated with the skills metadata corresponding to the "Cast Iron" skill may be initially presented and option 634 may be provided. Selecting option 634 may cause the area 616 (and the element 626) to be updated to present skill metadata corresponding to any suitable number of versions of the skill "Cast Iron." Elements 636 and 638 may represent a "Carbon" skill and an "Iron" skill, respectively, on which the "Cast Iron" skill depends. As depicted, both the "Carbon" and "Iron" skill may be associated with skill metadata indicating a dependency on a "Protons" skill. As depicted, the "Carbon" and "Iron" skills may depend on different versions of the "Protons" skill represented by element 640.

Some embodiments, one or more skills may be indicated (e.g., via element 642) but initially hidden from view depending on a default or selected viewing scope. By way of example, element 640 indicates that the "Carbon" skill depends on 3 additional upstream skills. In some embodiments, user interface element 644 may be used to modify the viewing scope of area 616. For example, the slider of user interface element 644 may be shifted upward to increase the scope of the viewing area (e.g., to zoom out to present a larger portion of the diagram/graph) or shifted downward to decrease the scope of the viewing area (e.g., to zoom in to present fewer elements corresponding to a fewer number of skills). In some embodiments, zooming outward may cause less information to be presented via a presented element, while zooming inward may cause an element to present additional information. As a non-limiting example, zooming inward may case the three additional skills associated with the Foundry service to be presented in a similar manner as depicted in FIG. 6 for the "Cast Iron" skill. As another example, zooming outward may cause individual elements corresponding to element 642 (e.g., the three skills on which the "Carbon" skill depends) to be presented. Similar user interface elements for zooming inward or outward or otherwise modifying the focus of a presentation area (e.g., area 616) may be utilized in the following figures. These user interface elements may be utilized and operate in a similar manner as described in connection with user interface element 644 to modify the corresponding presentation area to which they relate and will not be repeatedly discussed in further detail, for brevity.

User interface 600 may include user interface element 646 which may provide an alternative mechanism for modifying the scope of the skills data presented within area 616. As depicted, user interface element 646 may indicate three degrees of the graph (in this example, the graph associated with the Foundry service and/or the portion of the graph indicating skill relationships between skills of any suitable number of services) are to be presented. Based on the value selected with the user interface element 646, the area 616 may present three levels of the graph associated with the Foundry service. As depicted, the element 626 represents a first level, the elements 636 and 638 represent a second level, and the element 640 represents a third level of the graph. Different selections made via user interface element 646 may modify the number of levels of the graph that are presented within area 616. Area 648 may be configured to present a high-level view of the service that indicates a number of dependencies of the service (e.g., eight skills on which the service depends) and a number of dependencies on the service (e.g., thirty consumers which depend on one or more skills associated with the service "Foundry").

In some embodiments, options 650 and 652 may be used to filter the data presented within area 616. Skills may be associated with consumption during build-time and/or run-time. Each of options 650 and 652 may be used to filter the data within area 616 to present build-time associated information of the skills when option 650 is selected, and run-time associated information of the skills when option 652 is selected.

Figure 7:
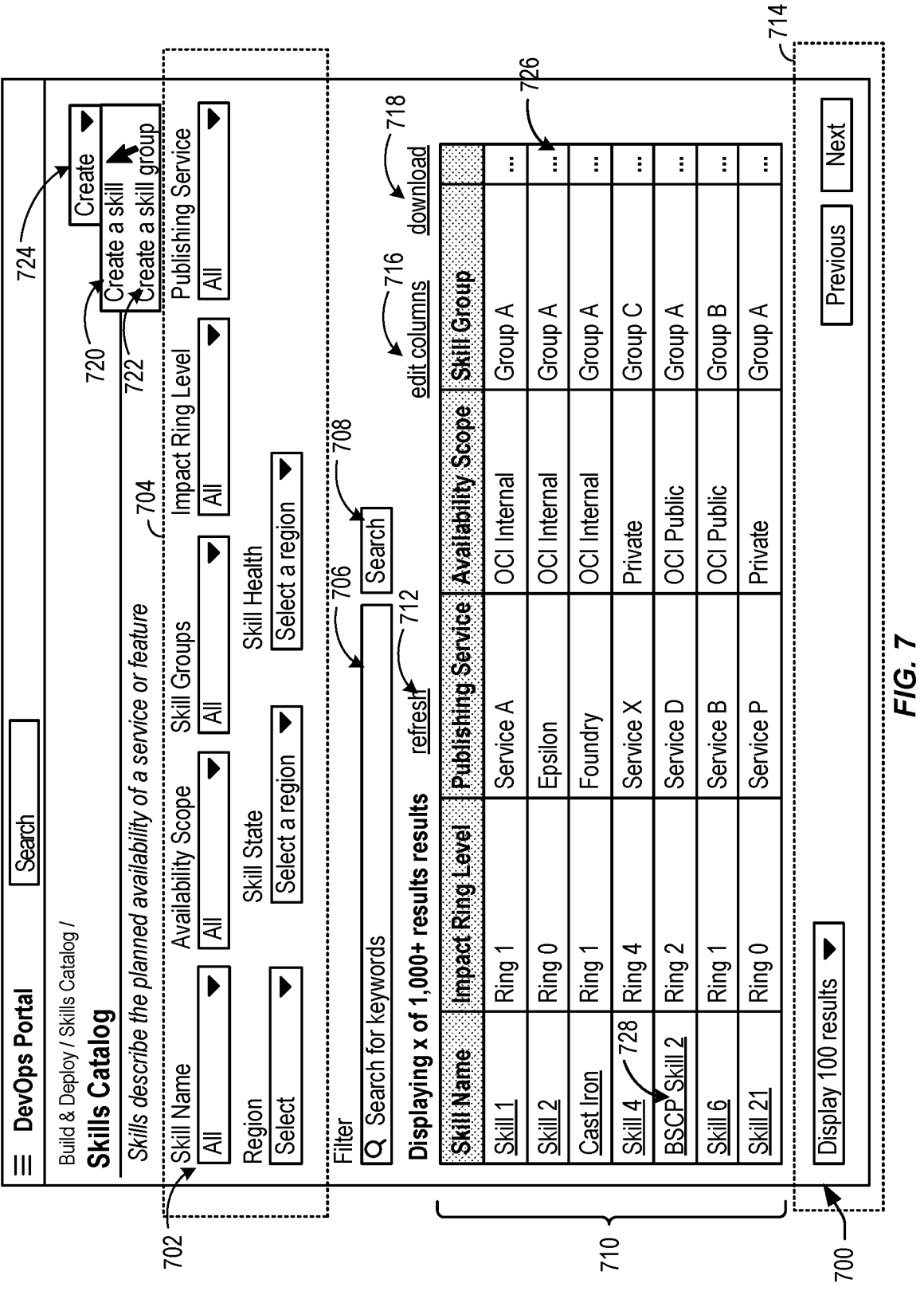
FIG. 7 is a block diagram depicting an example user interface related to a skills catalog, in accordance with at least one embodiment.

FIG. 7 is a block diagram depicting an example user interface 700 related to a skills catalog, in accordance with at least one embodiment. User interface 700 may be configured to present a skills catalog. The term "skills catalog" is intended to refer to a registry/collection of skills metadata corresponding to all previously defined skills. In some embodiments, instances of skills metadata (e.g., any suitable part of skills metadata 404 of FIG. 4) may be provided via a user interface hosted by Puffin Central 120 (e.g., via the user interfaces of FIGS. 8-12 discussed below).

As depicted, user interface 700 may include user interface element 702 (e.g., depicted as a drop-down menu, however, other user interface elements are contemplated). User interface element 702 may be prepopulated with any suitable number of skills names obtained from any suitable number of predefined instances of skills metadata 404. Each entry selectable from user interface element 702 may correspond to a different instance of skill metadata 404. By default, user interface element 502 may present a selection of "all" indicating an option to present service names (or any suitable portion of skill metadata 404) corresponding to every unique instance of skill metadata 404. Each instance of skill metadata 404 may correspond to every previously defined skill. User interface element 702 may be one of a set of user interface elements (e.g., user interface elements 704, which include user interface elements corresponding to availability scope, skill groups, impact region level, publishing service, region, skill state, and skill health). It should be appreciated that selections available via one user interface element of the user interface elements 704 may depend on values selected via one or more other user interface element(s) of the user interface elements 704. In some embodiments, some user interface elements may be disabled or enabled depending on values selected via one or more other user interface elements. As a non-limiting example, values for skill state and skill health may not be entered via the corresponding user interface elements depicted unless a value has been selected via the user interface element corresponding to the region. User interface elements 706 and 708 may be configured to filter the data presented within area 710. These elements may operate and perform similar functions as discussed in further detail above with respect to search box 516 and search button 518 of FIG. 5, and therefore will not be discussed in further detail, for brevity.

As skill metadata may be added or changed over time, user interface 700 may include refresh option 712. Upon selecting refresh option 712, Puffin Central 118 may be configured to read, parse, or otherwise update skill metadata presented via user interface 700. Any suitable previous selections provided via user interface elements 704, 706, and/or 708 may be applied to the updated skill metadata and corresponding entries may be provided anew via area 710. User interface elements 714 correspond, operate, and perform similar functions as discussed in further detail above with respect to presentation option 510 and navigational options 512 and 514, and therefore will not be discussed in further detail, for brevity.

The particular data presented via area 710 may be customizable via user interface element 716. Selection of user interface element 716 may cause a window or pop up to be presented with which columns corresponding to particular skills metadata attributes may be selected or deselected for display. In some embodiment, user interface 700 may include user interface option 718. Upon selecting user interface option 718, the data presented via area 710 may be formatted according to a predefined format and saved to a file. In some embodiments, the data may be downloaded (e.g., saved locally at the user's device) in any suitable format. The user may be presented an additional window or interface for selecting a storage location and/or format for the downloaded data.

In some embodiments, options 720 and 722 may be selectable from user interface element 724. Selecting option 720 may navigate the user-to-user interface 800 of FIG. 8, while selecting option 722 may navigate the user interface 1300 of FIG. 13.

FIGS. 8-12 include respective block diagrams depicting a number of example user interfaces related to creating a skill, in accordance with at least one embodiment. The data obtained with the user interfaces of FIGS. 8-12 may be used to generate an instance of skills metadata 404 of FIG. 4.

Figure 8:
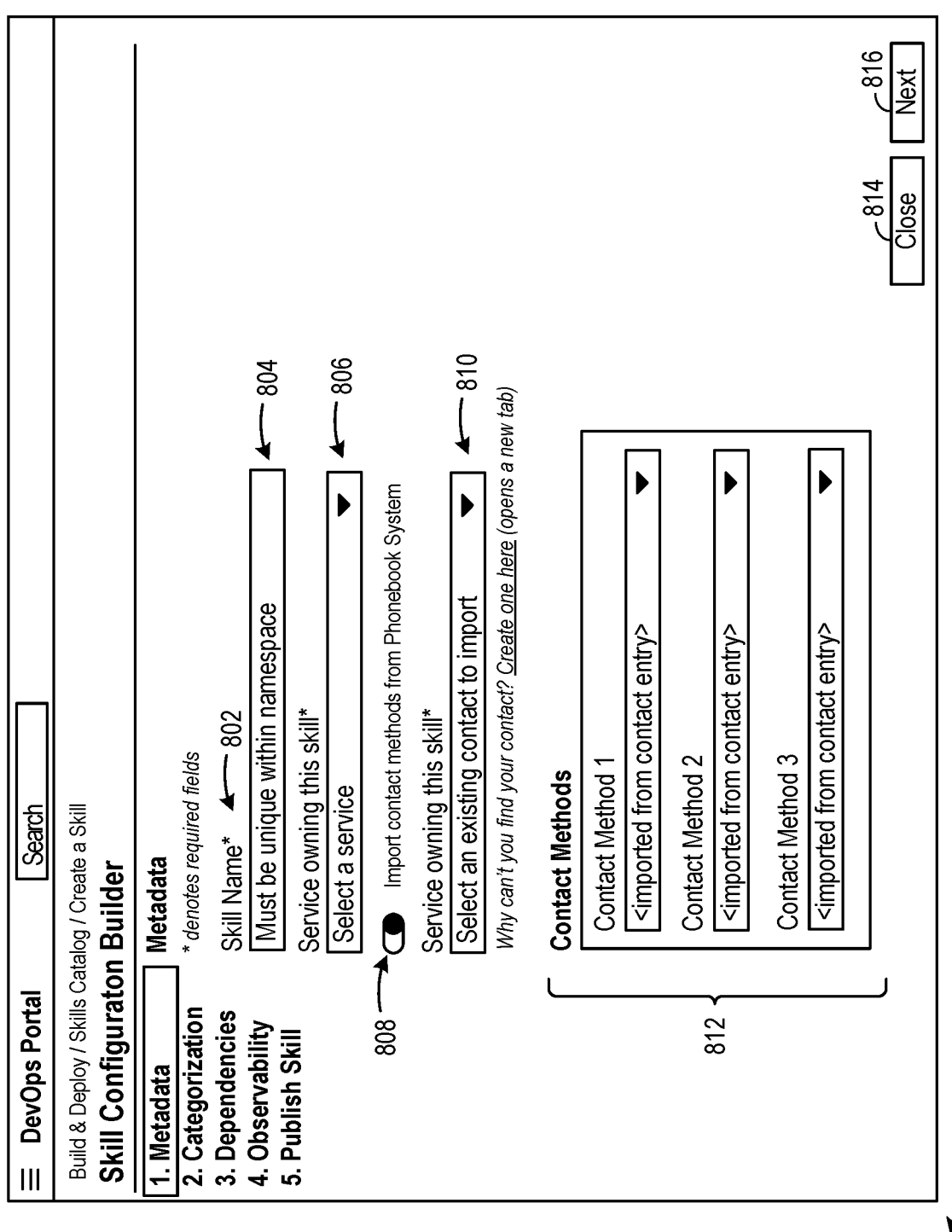

FIG. 8 is a block diagram depicting an example user interface 800 for obtaining metadata for creating a skill, in accordance with at least one embodiment. In some embodiments, the user interface 800 may be configured to obtain any suitable skill metadata such as the data associated with skill metadata data structure 416 of FIG. 4. User interface 800 may be presented (via a same or different window as user interface 700) based at least in part on selecting option 720 of FIG. 7.

User interface 800 may include any suitable combination of user interface elements for obtaining values for any suitable number of attributes corresponding to skill metadata 404. By way of example, user interface 800 may include label 802 and corresponding user interface element 804. Label 802 may correspond to an attribute of skills metadata (e.g., "Name") and, in some embodiments, when the attribute is a required field, the label 802 may include an indicator (in this example, a "*"). A value for the attribute may be provided via user interface element 804, depicted as an edit box in this example, although other elements for providing an attribute value are contemplated.

As another example, user interface 800 may include user interface element (e.g., a drop-down menu) to selecting a service that owns the skill identified in user interface element 804. In some embodiments, the values selectable via the user interface element 806 may be populated based at least in part on all known service names (e.g., names from all known instances of service metadata 402 of FIG. 4).

User interface 800 may include toggle 808. In some embodiments, selecting toggle 808 may cause the user interface elements depicted below toggle 808 to be configured to import data from a system separate from the Puffin Service. By way of example, selecting toggle 808 may cause user interface element 810 to be populated with known contact initially obtained and/or managed by a phonebook system that is configured to maintain such information. Alternatively, selecting the toggle 808 may cause Puffin Central 118 to populate the user interface element 810 with data initially obtained from the phonebook system, but stored at a location accessible to the Puffin Service 118. Selecting a value via user interface element 810 may cause the user interface 800 to be updated to include data 812. Data 812 may include any suitable contact information maintained and/or provided by the phonebook system and associated with the service selected via user interface element 810. If toggle 808 is left unselected (not depicted) additional user interface elements may be provided to manually enter value for a service owner and one or more contact methods.

The user interface 800 may include navigation options 814 and 816. Selection navigation option 814 may close the user interface 800 or otherwise cause the user to be navigated back to user interface 700. Selection of navigation option 816 may cause the user to be navigated to a later occurring series of user interfaces to which user interface 800 belongs. By way of example, selecting option 816 may cause the user to be navigated to user interface 900 of FIG. 9. Similar navigation options are presented with respect to user interfaces 900-1200 of FIG. 12 and those options may provide similar navigational functionality. Those options will not be discussed again in detail, for brevity. User interfaces 900-1200 may include an additional navigation option corresponding to navigating to a previous user interface in the series. By way of example, selecting navigation option 902 of FIG. 9 may cause the user to be navigated away from user interface 900 and presented with user interface 800 (e.g., the previous user interface in the series of user interfaces 800-1200). This option, too, will not be discussed again in detail, for brevity.

Figure 9:
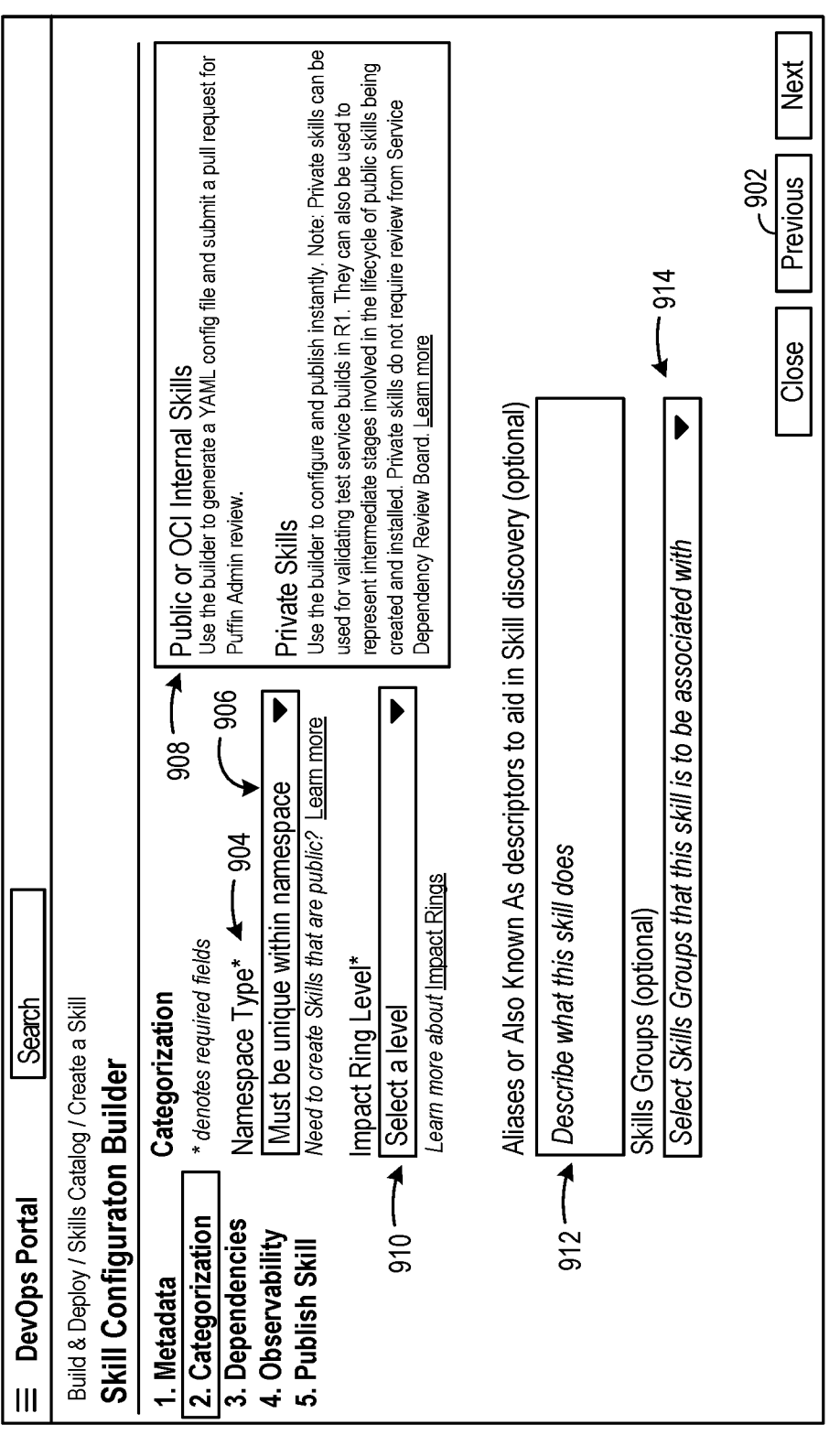

FIG. 9 is a block diagram depicting an example user interface 900 for obtaining categorization data for creating a skill, in accordance with at least one embodiment. User interface 900 may include any suitable combination of user interface elements for obtaining values for any suitable number of attributes corresponding to skill metadata 404. By way of example, user interface 900 may include label 904 and corresponding user interface element 906. Label 904 may correspond to an attribute of skills metadata 404 of FIG. 4 (e.g., "namespaceType" of skills data structure 410 if FIG. 4) and, in some embodiments, when the attribute is a required field, the label 904 may include an indicator (in this example, a "*"). A value for the attribute may be provided via user interface element 906, depicted as a drop-down menu in this example, although other elements for providing an attribute value are contemplated. Values that are selectable from user interface element 906 may include a set of predefined values (e.g., public, OCI Internal, private, etc.). In some embodiments, user interface 900 may present information related to value selection. By way of example, information regarding particular namespace types is presented at 908.

As depicted, user interface 900 may include user interface element 910 for selecting a value corresponding to the attribute impact ring level (e.g., corresponding to the recoveryRingLevel attribute of skill data structure 410 of FIG. 4. User interface element 912 (here, an edit box) may be used to provide one or more aliases and/or descriptors to aid in skill discovery. In some embodiments, this input is optional and indicated as such in the user interface 900. If entered, the values may be associated with a set of names corresponding to the name attribute of skill data structure 410.

User interface element 914, depicted in user interface 900 as a drop-down menu, may be used to select one or more skill groups with which the skill, if created, is to be associated with. A skill group may be a logical group of skills that are associated with a common skill group identifier (e.g., name). In some embodiments, the values selectable within user interface element 914 may be populated with a list of previously defined skill group names. In some embodiments, input for user interface element 914 is optional and indicated as such in the user interface 900.

Figure 10:
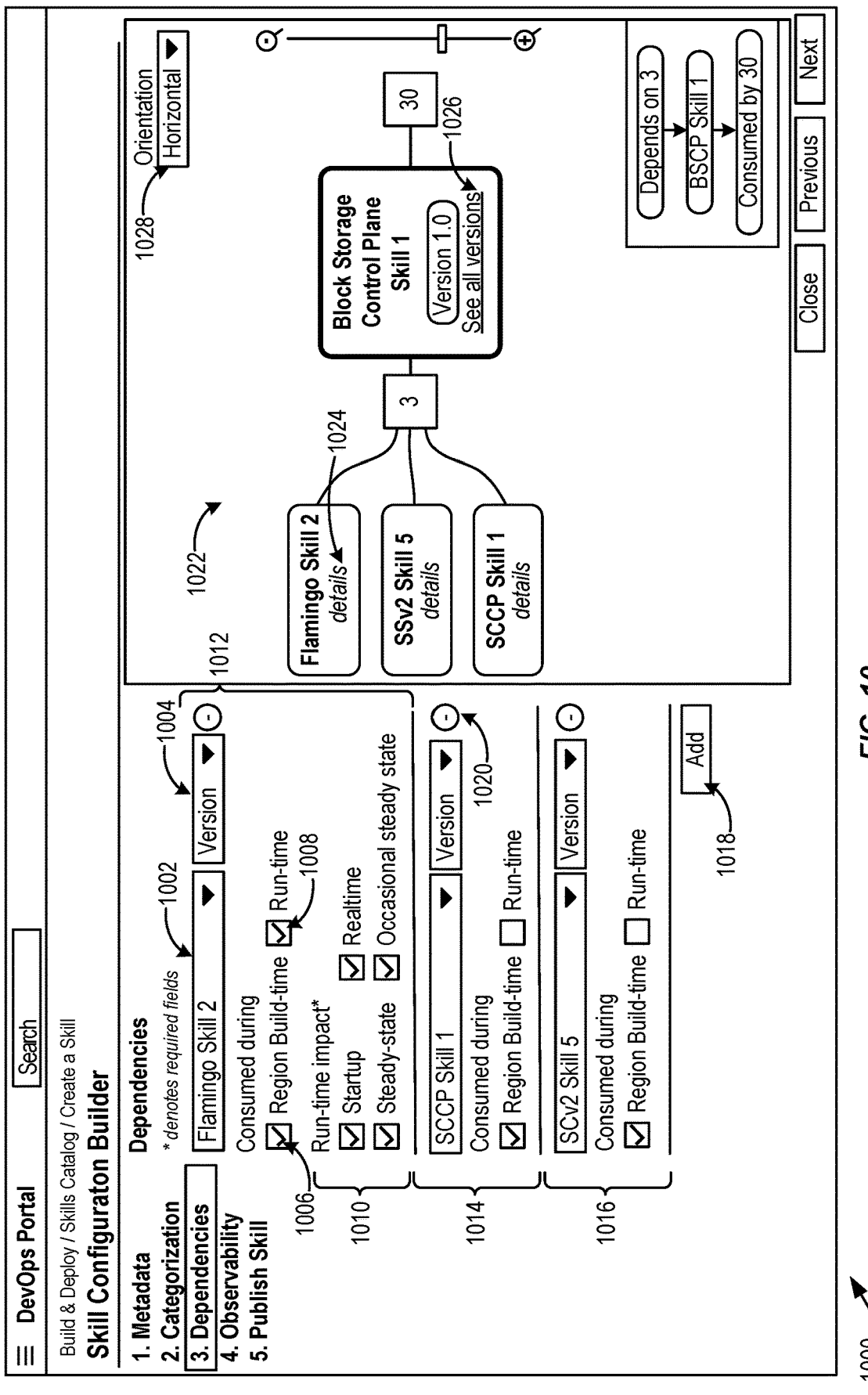

FIG. 10 is a block diagram depicting an example user interface 1000 for obtaining dependency data for creating a skill, in accordance with at least one embodiment. User interface 1000 may include any suitable combination of user interface elements for obtaining values for any suitable number of attributes corresponding to skill metadata 404 of FIG. 4. By way of example, user interface 1000 may include user interface element 1002 from which another skill is selectable. In some embodiments, the values which are selectable via user interface element 1002 may include any suitable previously known skill (e.g., skills associated with a selected namespace and/or region). In some embodiments, user interface 1000 may include user interface element 1004 for selecting known versions of the skill selected via user interface element 1002.

User interface element 1006 may be selected to indicate that the skill being created/defined applied during region build time, while the user interface element 1008 may be selected to indicate that the skill is to be applied at run-time. Selection of user interface element 1008 may cause the user interface 1000 to be updated with additional options (e.g., additional options 1010) related to defining aspects/attributes of the skill with respect to run time impacts. One or more values that represent the selections of user interface elements 1006 and 1008, and any suitable selections made with respect to the additional options 1010 may be stored (e.g., via skill consumer data structure 418 of FIG. 4).

User interface 1000 may initially include area 1012, but additional areas (e.g., area 1014, area 1016, etc.) may be added by selecting option 1018. Previously added areas may be deleted based at least in part on selecting a removal option. By way of example, area 1014 may be removed by selecting corresponding removal option 1020.

Areas 1012, 1014, and 1016 individually represent a dependency associated with the current skill (e.g., Block Storage Control Plane Skill 1) and provide information relating to the skill on which the current skill depends, situations in which the dependency applies (e.g., during build time, during run time), and potentially one or more run time impacts when the dependency applies at run time. In some embodiments, area 1022 may be used to present a graphical representation of the dependencies defined within areas 1012, 1014, and 1016 with respect to the current skill being created (e.g., Block Storage Control Plane Skill 1). Each of the elements pictured in area 1022 may include options for displaying additional data associated with that skill. By way of example, selecting the option 1024 may cause the user to be navigated to a user interface similar to 1600 of FIG. 16, but directed to skill associated with the name "Flamingo Skill 2." Like the options discussed in connection with FIG. 5, user interface 1000 may include option 1026 which, if selected, may cause the element 1028 to be updated to display all versions associated with the Block Storage Control Plane Skill 1 (versions of a skill of the same name as the current skill being created).

In some embodiments, user interface 1000 includes orientation option 1028. As depicted, the value currently selected via orientations option 1028 indicates a horizontal orientation. However, the option 1028 may provide a mechanism for the user to adjust to a vertical orientation.

Figure 11:
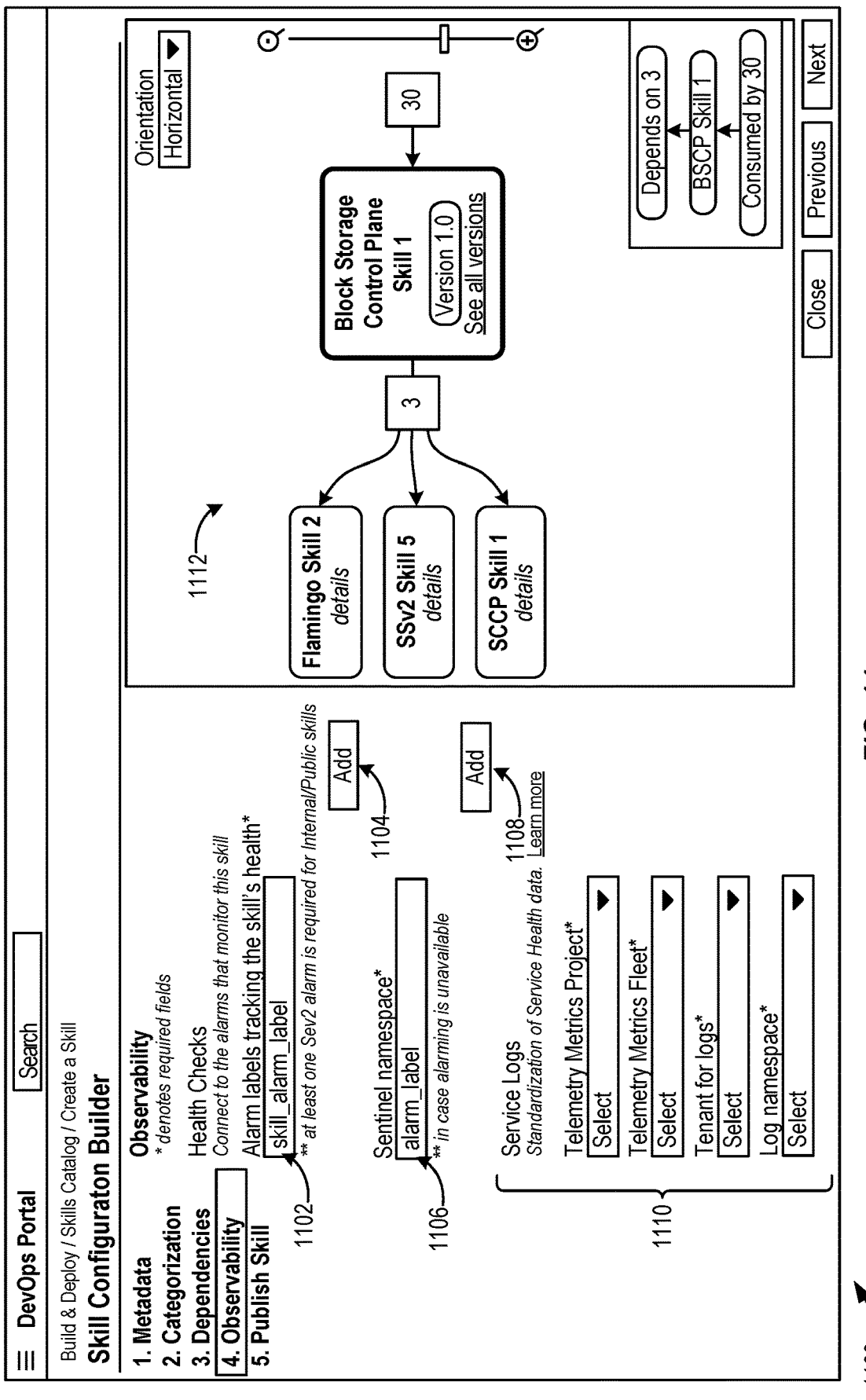

FIG. 11 is a block diagram depicting an example user interface 1100 for obtaining observability data for creating a skill, in accordance with at least one embodiment. User interface 1100 may include any suitable combination of user interface elements for obtaining values for any suitable number of attributes corresponding to skill metadata 404 of FIG. 4. By way of example, user interface 1100 may include user interface element 1102 with which an alarm label (e.g., a name, identifier, etc.) may be enter. In some embodiments, the value provided via user interface element 1102 may correspond to the attribute values stored within health check data structure 414 of FIG. 4. Any suitable number of alarm labels may be added via selection of option 1104. In some embodiments, a backup alarming system (referred to as "sentinel") may be utilized when the typical alarming service is unavailable/down. In some embodiments, user interface element 1106 may be used to provide values corresponding to alarm labels for this additional alarming service. Option 1108 may be selected any suitable number of times to insert additional user interface elements with which any suitable number of alarm labels may be provided for the additional alarming service.

In some embodiments, area 1110 may provide any suitable number of user interface elements which a number of attribute values corresponding to service health data logs may be specified. Area 1112 may present similar data as the data presented within area 1022 of FIG. 10.

FIG. 12 is a block diagram depicting an example user interface 1200 for publishing/creating a skill, in accordance with at least one embodiment. User interface 1200 may present with area 1202 attributes (keys) and attribute values (values) corresponding to the user input provided via user interface 800-1100. In some embodiments, user interface 1200 may include option 1204. Selection of option 1204 may cause the data to be formatted according to a predetermined data serialization language or markup language (e.g., YAML, XML, etc.) and stored at a predefined or user-defined storage location. In some embodiments, user interface 1200 may include option 1206. Selection of option 1206 may cause the skill to be published or otherwise made available. When the namespace type provided for the skill is "private," selection of option 1206 may publish the skill immediately. In some embodiments, private skills will not be subject to a review board. However, if the namespace type provided for the skill is "public" or "OCI internal," a similar option may be provided which, if selected, will provide the skill metadata provided via user interfaces 800-1100 to a review board for review. Providing this data to a review board may include transmitting and/or storing the data according to a predefined protocol such that the data is accessible to the review board via one or more documents and/or one or more user interfaces provided hosted by the CIOS 102 or a separate system entirely.

Figure 13:
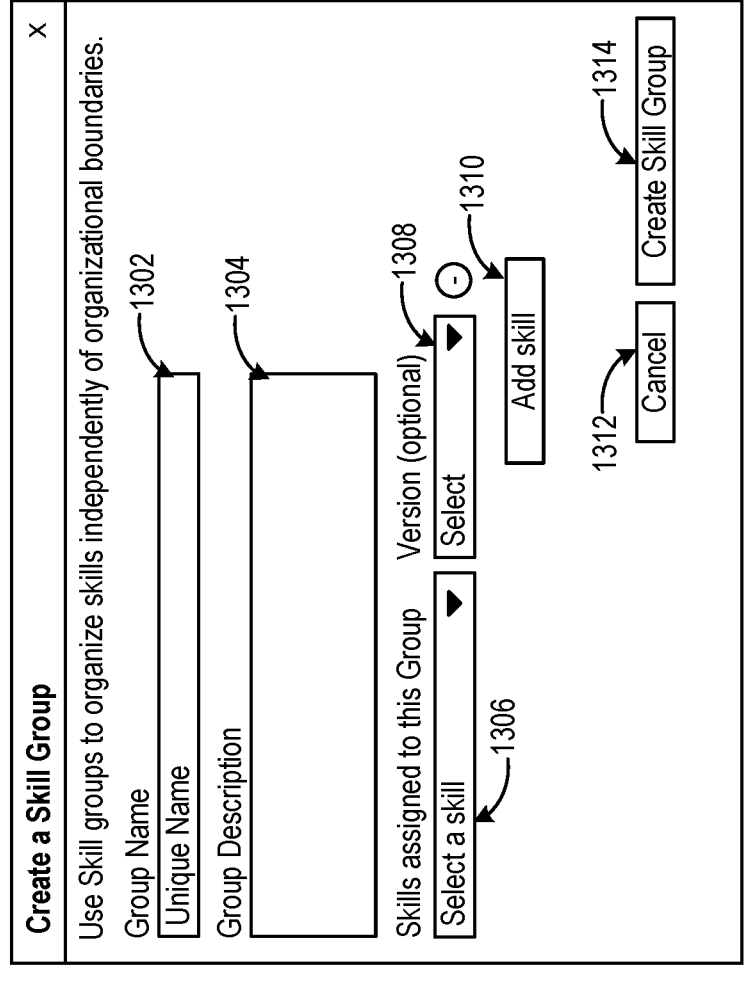
FIG. 13 is a block diagram depicting an example user interface for creating a skill group, in accordance with at least one embodiment.

FIG. 13 is a block diagram depicting an example user interface 1300 for creating a skill group, in accordance with at least one embodiment. A user may be presented with user interface 1300 in response to selecting option 722 of FIG. 7. User interface 1300 may include user interface element 1302 with which a skill group name may be provided as input. Similarly, user interface element 1304 may be utilized to provide user input corresponding to a group skill description.

In some embodiments, one or more skills may be assigned to the skill group being defined. In some embodiments, skills may be assigned to the group using user interface element 1306. The values presented via user interface element 1306 may include any previously defined skill. In some embodiments, the user interface element 1306 may be configured to enable a single skill to be selected. User interface element 1308 may be utilized to specify a particular version for the selected skill. The values which are selectable from user interface element 1308 may be determined from the previously identified versions associated with the selected skill. User interface element 1310 may be selected to add additional user interface elements (e.g., additional user interface elements similar to user interface elements 1302-1308) which may be used to identify an additional skill to be associated with the skill group being defined. Any suitable number of skills may be associated with a single skill group.

User interface 1300 may include option 1312, the selection of which may cancel the operations associated with creating the skill group and the user interface 1300 may be removed from display. User interface element 1314 may be provided as an option to proceed to skill group creation. Selection of user interface element 1314 may cause Puffin Central 118 to perform any suitable operations for creating a skill group (e.g., represented by an instance of skill group data structure 420 of FIG. 4). By way of example, Puffin Central 118 may generate a new instance of skill group data structure 420 and store the attribute values provided via user interface 1300 within the newly generated data structure for later use.

Figure 14:
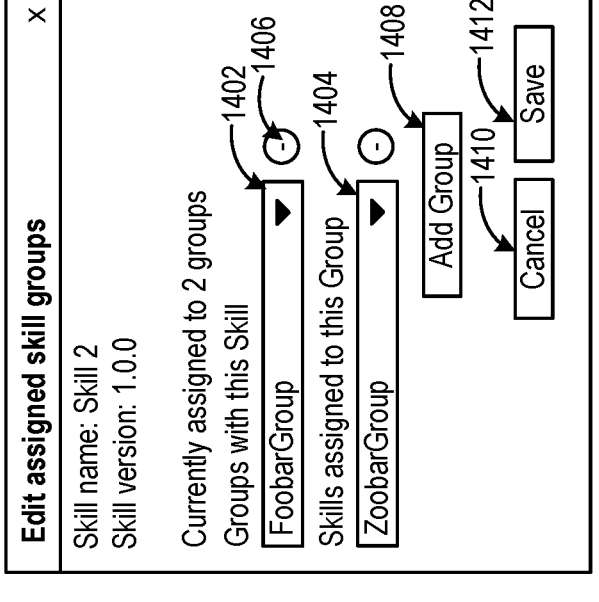
FIG. 14 is a block diagram depicting an example user interface for editing a skill group, in accordance with at least one embodiment.

FIG. 14 is a block diagram depicting an example user interface 1400 for editing skill groups to which a skill is associated, in accordance with at least one embodiment. User interface 1400 may be presented in response to selecting option 726, for example (e.g., an option corresponding to the skill entitled "Skill 2." Options 1402 and 1404 (or any suitable number of options) may be utilized to present corresponding group to which "Skill 2" is associated. Selecting a removal option (e.g., removal option 1406) may cause the corresponding user interface element (e.g., user interface element 1402) to be removed from user interface 1400. The skill may be associated with any suitable number of additional skill groups based at least in part on selecting option 1408. Selecting option 1408 may cause user interface 1400 to be updated with an additional user interface element similar to the user interface element 1402 with which an additional association with a skill group may be specified. Selecting option 1410 may cancel cause the user interface 1400 to be removed from display with no changes made to the skill group associations corresponding to the skill. Selection of option 1412 may cause any changes via the user interface elements of user interface 1400 to be applied to update the skill group associations corresponding to the skill (e.g., to update associations between one or more skill group data structure instances and an instance of skill data structure 410 corresponding to the "Skill 2" skill).

Figure 15:
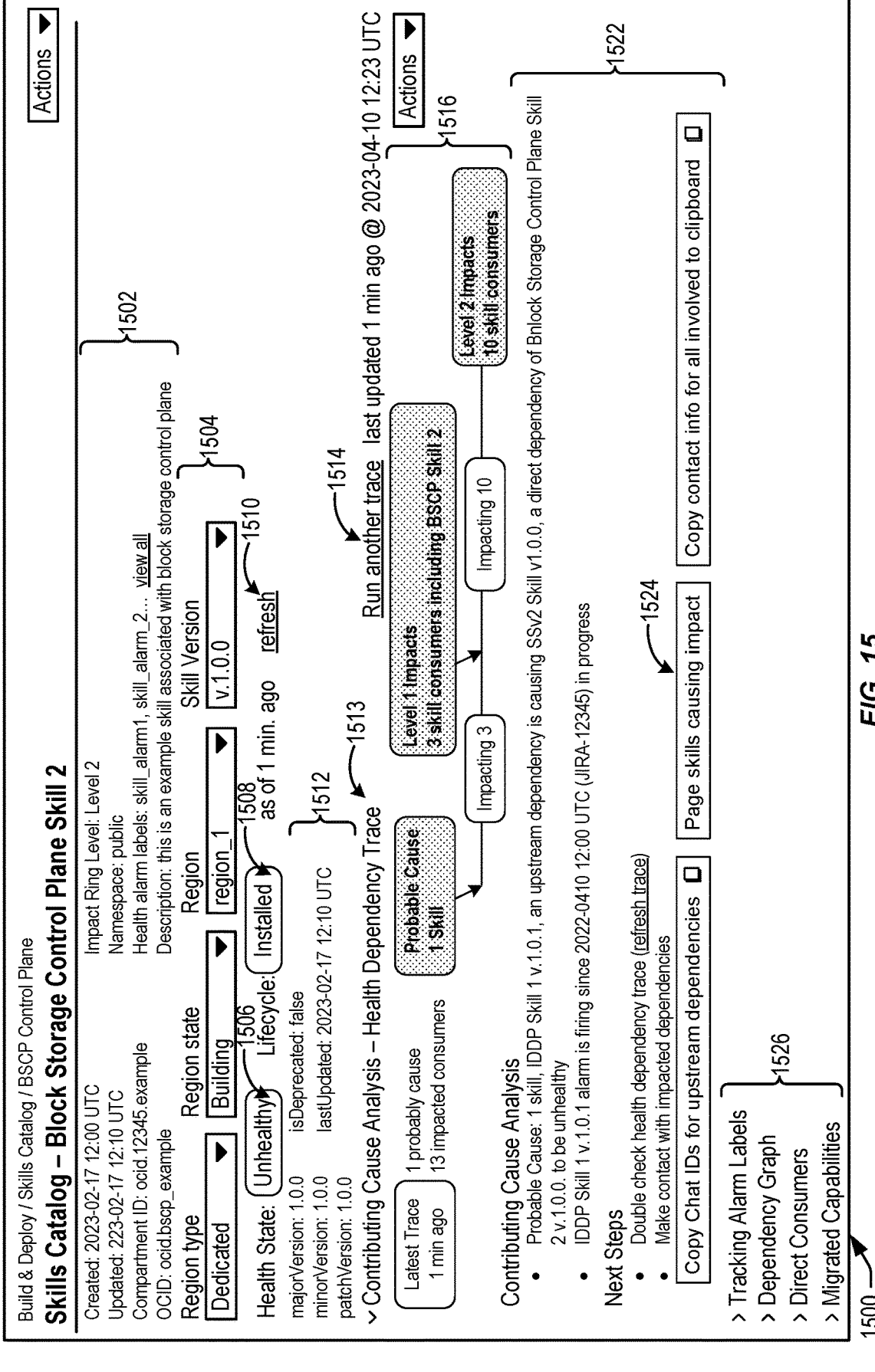
FIG. 15 is a block diagram depicting an example user interface presenting information associated with a selected skill, in accordance with at least one embodiment.

FIG. 15 is a block diagram depicting an example user interface 1500 presenting information associated with a selected skill, in accordance with at least one embodiment. In some embodiments, user interface 1500 may be presented based at least in part on selecting option 728 of FIG. 7 from a skills catalog hosted by Puffin Central 118 of FIG. 1. Generally, user interface 1500 may be configured to present any suitable skill metadata 404 of FIG. 4 corresponding to a selected skill (e.g., Block Storage Control Plane Skill 2, in this example). The data presented via user interface 1500 may be differently presented or formatted that the example depicted in FIG. 15.

Area 1502 may present any suitable combination of attributes and corresponding values according to a predefined format. As a non-limiting example, area 1502 includes a created date, an updated data, a compartment identifier, a unique system identifier (e.g., OCID), an impact ring level, a namespace type, one or more health alarm labels associated with the selected skill, and a description.

Area 1504 may provide one or more user interface elements corresponding to selecting filtering options. Values selected via the user interface elements of area 1504 may be used to update or modify user interface 1500 to include the attribute and values associated with the version and/or region associated with the selected skill. User interface 1500 may include user interface element 1506, which may be configured to display an indication of the health state associated with the skill (e.g., a health state stored in skill version data structure 412 of FIG. 4. Similarly, user interface element 1508 may be utilized to present an indication of the lifecycle state (e.g., "Installed") associated with the skill (e.g., the installation state stored in skill version data structure 412 and associated with the selected skill). The lifecycle state presented may correspond to one of the lifecycle states discussed in connection with FIG. 16 below.

User interface 1500 may include refresh option 1510. Selection of this option may cause Puffin Central 118 to obtain and present anew values corresponding to the attributes depicted in FIG. 15.

User interface 1500 may include area 1512 which may be configured to present any suitable combination of attributes and corresponding values from skill version data structure 412. Option 1513 may be select to expand an area of user interface 1500 to present the data of areas 1516 and 1522. Area 1516 may present a health dependency tree generated with respect to the selected skill. In some embodiments, the health dependency tree may be generated by the Puffin Service in response to receiving indication (e.g., from an alarm service) that one or more alarms associated with the selected skill has been triggered. As a non-limiting example, BSCP Skill 2 may be identified by the Puffin Service as being unhealthy (e.g., due to receiving an indication that a particular alarm has been triggered). The health dependency tree presented in area 1516 may be generated based at least in part on traversing upwards or downwards in a dependency graph generated based on all of the service metadata 402 instances and skill metadata 404 instances corresponding to every service and skill associated with the same build, run, or region associated with BSCP Skill 2.

Through traversing upward and downwards in the dependency graph and determining the corresponding health state of nodes of the graph corresponding to other skills, one or more skills may be identified as being the probable cause of the health state of BSCP Skill 2. By way of example, the Puffin Service may traverse the dependency graph upwards to identify IDDP Skill 1, v. 1.0.0.1 is also unhealthy, but a skill higher up the graph and consumed by IDDP Skill 1 (meaning a skill on which IDDP Skill 1 depends) is healthy. Based at least in part on determining that IDDP Skill 1 is unhealthy and the highest skill in the dependency graph starting from a node corresponding to BSCP Skill 2, IDDP Skill 1 may be identified as the probable cause for the current health state associated with BSCP Skill 2. Similarly, additional affected skills may be determined lower in the dependency graph (e.g., based on health states that consume (depend on) one or more of the skills (e.g., BSCP Skill 2) which depend on the skill identified as being the probable cause of the health state indicated at user interface element 1506. Area 1516 may identify a number of skill consumers (skills which depend on probable cause skill, IDDP Skill 1, v. 1.0.0.1) as "level 1 Impacts" indicating skills which directly depend on the probable cause skill. Area 1516 may further identify a number of skill consumers (e.g., skills which ultimately and indirectly depend on the probable cause skill). These skills which are further downstream than the of the level 1 impacted skills may be referred to as "level 2 Impacts" within area 1516.

Figure 16:
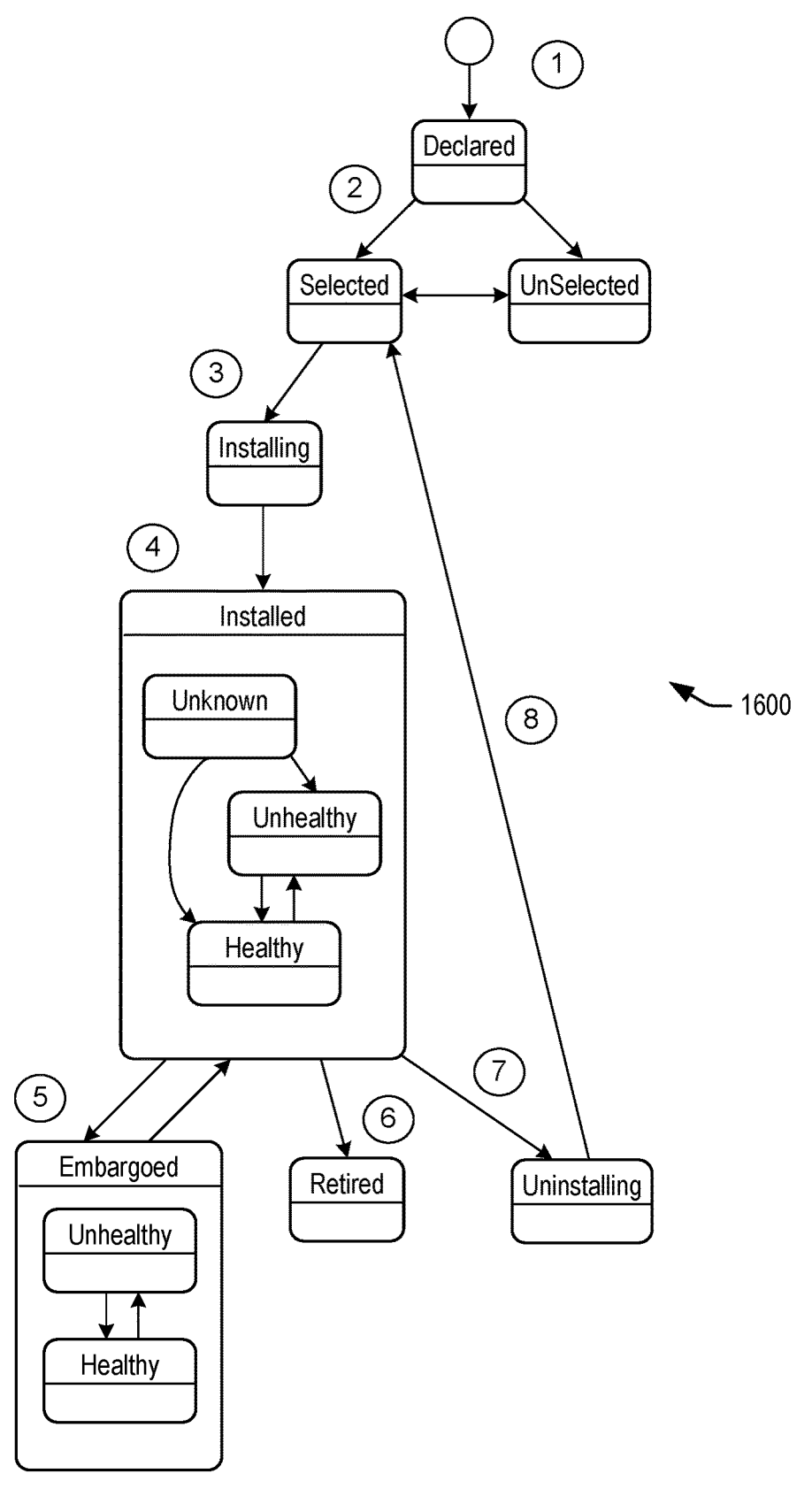
FIG. 16 is a block diagram depicting an example lifecycle for a skill, in accordance with at least one embodiment.

In some embodiments, area 1522 may include any suitable additional data related to contributing cause analysis (e.g., identifying a probable cause or probable causes) for the unhealthy state of the currently selected skill. In some selected, unselected, installing, installed, embargoed, retired, and uninstalling, although other combinations of lifecycle states are contemplated. In some embodiments, a lifecycle state may be associated with a number of substates. By way of example and as depicted in FIG. 16, a skill that is associated with a lifecycle state of "installed" may be associated with one of three substates (e.g., "unknown," "unhealthy," and "healthy"). Likewise, a skill associated with an "embargoed" state may be associated with a "healthy" or and "unhealthy" substate. Descriptions for the conditions indicated by each state are provided below.

| State | Health Monitored | Description |
|---|---|---|
| Declared | | A skill version resource (e.g., skill version data structure 412 of FIG. 4) has been created by the Puffin Service and is known to the system |
| Selected | | The skill version resource is selected (e.g., by orchestrator 106 of FIG. 1) for installation into the target region |
| Unselected | | The skill version resource is unselected (e.g., by orchestrator 106 of FIG. 1) to ensure the skill version is not (or never) installed in the target region |
| Installing | | Installation of the Service producing the associated Skill is currently underway in the target region. |
| Installed | Y | Installation of the Service producing the associated Skill has completed successfully. Puffin begins/continues periodic health monitoring of the Skill. |
| Uninstalling | | Uninstallation of the Service producing the associated Skill is currently underway in the target region |
| Retired | | The skill version is installed in the target region but no longer provides any meaningful value to any consumers. This state may be utilized by ephemeral Skills in the context and utility of region build. |
| Embargoed | Y | Installation of the Service producing the associated Skill has completed successfully. Puffin begins/continues periodic health monitoring of the skill but the skill version should be treated as Installed only by Skill dependencies of the same producing Service. | embodiments, the user may select option 1514 to rerun the trace (e.g., the operations performed by the Puffin Service for traversing the dependency graph and checking each nodes health status to determine one or more skills which are likely a contributing cause of the current health state of the selected skill). In some embodiments, area 1522 may enable any suitable portion of contact information (e.g., data identified previously via user interface 800 of FIG. 8. Selecting one of the options provided within area 1522 may cause contact information to be copied and/or utilized for communicating the unhealthy status and/or any suitable portion of the contributing cause analysis data. By way of example, selecting option 1524 may cause previously specified contact information to be utilized to request a service team associated with IDDP Skill 1, v. 1.0.0.1 to report to a designated location for troubleshooting the current state of their corresponding skill.

In some embodiments, additional options are provided within area 1526. These additional options may correspond to tracking alarm labels, viewing a dependency graph (e.g., a graph similar to the one generated and presented within areas 616 of FIG. 6), presenting skill metadata corresponding to direct consumers (e.g., skills that directly depend on the selected skill), and migrated capabilities associated with the selected skill.

FIG. 16 is a block diagram depicting an example lifecycle 1600 for a skill, in accordance with at least one embodiment. Lifecycle 1600 may include any suitable number of states. As depicted, lifecycle 1600 includes states such as declared, In some embodiments, at step 1, upon selecting the option 1204 to publish a skill (e.g., a private skill) the instance of skill version data structure 412 corresponding to the skill may be created and updated to indicate an installation state of "declared." At step 2, if and when the orchestrator 106 selects the skill for installation within the target region (e.g., target region 103), the skill version data structure 412 may be updated to "selected." At step 3, if and when the orchestrator begins deploying a resource of the Service producing the associated skill, the installation state of the skill may be updated to "installing." At step 4, the installation state of the skill may be updated to "installed" when the installation of the Service producing the associated skill has been successfully completed. While the skill is associated with an "installed" state, the Puffin Service may monitor the health of the skill. In some embodiments, monitoring the health of a skill may include monitoring for indications that one or more alarms associated with the skill have been triggered. In some embodiments, if an alarm service configured to provide these alarms is unavailable, a substate corresponding to the "healthState" attribute of skill version data structure 412 may be updated to indicate an "unknown" health state of an installed skill. If no alarm has been triggered for at least a threshold period of time, the healthState attribute of the skill version may be updated to indicate a "healthy" state of the installed skill. Receipt of an indication that an alarm that is associated with the skill has been triggered may cause the Puffin Service to update the health State attribute of the skill version to an "unhealthy state" for the installed skill.

At step 5, the installation state may be updated to an "embargoed" state (e.g., by the orchestrator and/or based on user input) to indicate that health monitoring should continue but that only skills of the same producing service should treat the embargoed skill as being installed. In some embodiments, the installation state of the skill may revert to "installed."

In some embodiments, a skill version may be retired (e.g., via user input) at step 6. While in the retired state, the skill version may not (or cannot) be utilized by other skills and/or in any build or run. In some embodiments, the skill version's installation state may not be changed once retired.

In some embodiments, a skill version's installation state may transition from an "installed" state" to an "uninstalling" state based at least in part on operations performed by the orchestrator and/or by user input. In some embodiments, the orchestrator 106 may determine service deployments are to be reversed. In these situations, the orchestrator 106 may "unwind" installation of one or more services. During these operations, when the service is being uninstalled at step 7, the skill version associated may be updated to indicate a state of "uninstalling." When the service associated with the skill version has been successfully uninstalled, the skill version's installation state may be updated to "selected" at step 8.

A number of transitions between the various states and substates are contemplated. The lifecycle states and transitions depicted in FIG. 16 are illustrative and are not intended to limit the scope of the disclosure.

FIG. 17 is a flow diagram illustrating an example method 1700 of generating a dependency graph of skills utilizing the components of a skills service (e.g., any suitable combination of Puffin Central 118 and Puffin Regional 120 of FIG. 1), in accordance with at least one embodiment. In some embodiments, the dependent graph may be used to validate a build dependency graph (e.g., build dependency graph 338 of FIG. 3). In some embodiments, the dependency graph may be utilized in lieu of build dependency graph 338. The operations of method 1700 may be performed in any suitable order. It is contemplated that method 1700 may include more or fewer operations than the number shown in FIG. 17.

The method 1700 may begin at 1702, where a cloud-computing service (e.g., the Puffin Service) prepares a user interface configured to receive respective skill metadata defining a plurality of skills corresponding to a plurality of services to be bootstrapped during a region build corresponding to building a data center. FIGS. 8-11 individually provide an example of user interface with which any suitable portion of skill metadata 404 of FIG. 4 may be obtained.

At 1704, a first skill of the plurality of skills and a second skill of the plurality of skills is maintained. In some embodiments, the first skill corresponds to first service functionality and the second skill corresponding to a second service functionality. In some embodiments, the first skill indicates a dependency on the second skill. In some embodiments, the first skill indicates a dependency on the second skill. By way of example, the first skill may be associated with a skill consumer data structure (e.g., the skill consumer data structure 418 of FIG. 4) which may be utilized to indicate a dependency on another skill (e.g., via the consumingSkillID or any suitable attribute of the skill consumer data structure).

At 1706, the cloud-computing service may generate a dependency graph based at least in part on the plurality of skills corresponding to the plurality of services. In some embodiments, the dependency graph indicates the dependency between the first skill and the second skill. An example of a portion of this graph may be depicted in area 616 of FIG. 6.

At 1706, the cloud-computing service may provide, to a user device, at least a portion of the dependency graph for presentation at the user interface (e.g., user interface 600 of FIG. 6). In some embodiments, the user interface providing navigation options (e.g., 644 and 646 of FIG. 6) associated with navigating within the dependency graph. In some embodiments, the dependency graph represents a build dependency graph (e.g., build dependency graph 338) utilized by an orchestrator (e.g., the orchestrator 106 of FIG. 1) to bootstrap the plurality of services during the region build.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 18:
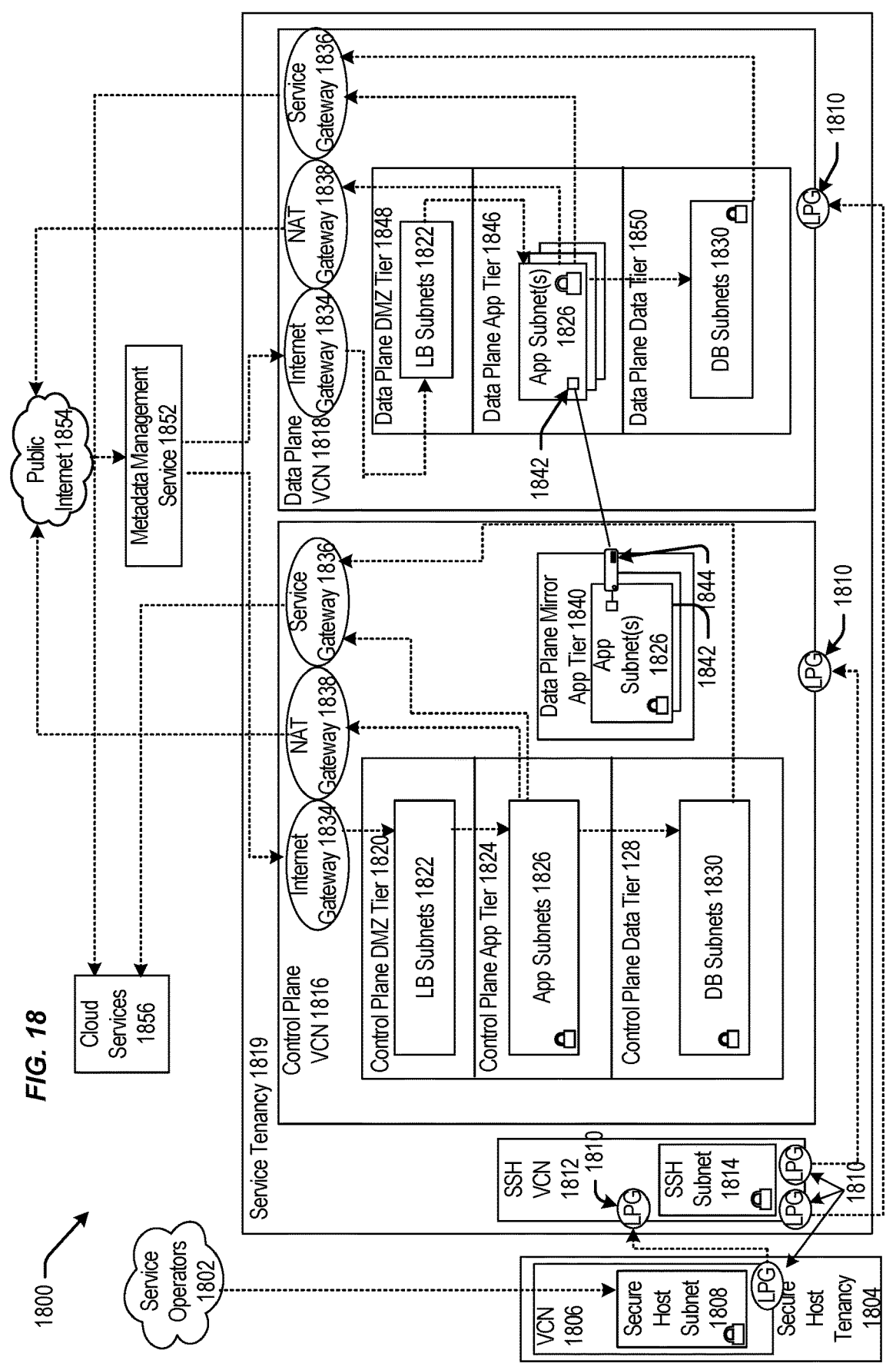
FIG. 18 is a block diagram illustrating one pattern for implementing a cloud infrastructure as a service system, according to at least one embodiment.

FIG. 18 is a block diagram 1800 illustrating an example pattern of an IaaS architecture, according to at least one embodiment. Service operators 1802 can be communicatively coupled to a secure host tenancy 1804 that can include a virtual cloud network (VCN) 1806 and a secure host subnet 1808. In some examples, the service operators 1802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1806 and/or the Internet.

The VCN 1806 can include a local peering gateway (LPG) 1810 that can be communicatively coupled to a secure shell (SSH) VCN 1812 via an LPG 1810 contained in the SSH VCN 1812. The SSH VCN 1812 can include an SSH subnet 1814, and the SSH VCN 1812 can be communicatively coupled to a control plane VCN 1816 via the LPG 1810 contained in the control plane VCN 1816. Also, the SSH VCN 1812 can be communicatively coupled to a data plane VCN 1818 via an LPG 1810. The control plane VCN 1816 and the data plane VCN 1818 can be contained in a service tenancy 1819 that can be owned and/or operated by the IaaS provider.

The control plane VCN 1816 can include a control plane demilitarized zone (DMZ) tier 1820 that acts as a perimeter network (e.g., portions of a corporate network between the corporate intranet and external networks). The DMZ-based servers may have restricted responsibilities and help keep breaches contained. Additionally, the DMZ tier 1820 can include one or more load balancer (LB) subnet(s) 1822, a control plane app tier 1824 that can include app subnet(s) 1826, a control plane data tier 1828 that can include database (DB) subnet(s) 1830 (e.g., frontend DB subnet(s) and/or backend DB subnet(s)). The LB subnet(s) 1822 contained in the control plane DMZ tier 1820 can be communicatively coupled to the app subnet(s) 1826 contained in the control plane app tier 1824 and an Internet gateway 1834 that can be contained in the control plane VCN 1816, and the app subnet(s) 1826 can be communicatively coupled to the DB subnet(s) 1830 contained in the control plane data tier 1828 and a service gateway 1836 and a network address translation (NAT) gateway 1838. The control plane VCN 1816 can include the service gateway 1836 and the NAT gateway 1838.

The control plane VCN 1816 can include a data plane mirror app tier 1840 that can include app subnet(s) 1826. The app subnet(s) 1826 contained in the data plane mirror app tier 1840 can include a virtual network interface controller (VNIC) 1842 that can execute a compute instance 1844. The compute instance 1844 can communicatively couple the app subnet(s) 1826 of the data plane mirror app tier 1840 to app subnet(s) 1826 that can be contained in a data plane app tier 1846.

The data plane VCN 1818 can include the data plane app tier 1846, a data plane DMZ tier 1848, and a data plane data tier 1850. The data plane DMZ tier 1848 can include LB subnet(s) 1822 that can be communicatively coupled to the app subnet(s) 1826 of the data plane app tier 1846 and the Internet gateway 1834 of the data plane VCN 1818. The app subnet(s) 1826 can be communicatively coupled to the service gateway 1836 of the data plane VCN 1818 and the NAT gateway 1838 of the data plane VCN 1818. The data plane data tier 1850 can also include the DB subnet(s) 1830 that can be communicatively coupled to the app subnet(s) 1826 of the data plane app tier 1846.

The Internet gateway 1834 of the control plane VCN 1816 and of the data plane VCN 1818 can be communicatively coupled to a metadata management service 1852 that can be communicatively coupled to public Internet 1854. Public Internet 1854 can be communicatively coupled to the NAT gateway 1838 of the control plane VCN 1816 and of the data plane VCN 1818. The service gateway 1836 of the control plane VCN 1816 and of the data plane VCN 1818 can be communicatively coupled to cloud services 1856.

In some examples, the service gateway 1836 of the control plane VCN 1816 or of the data plane VCN 1818 can make application programming interface (API) calls to cloud services 1856 without going through public Internet 1854. The API calls to cloud services 1856 from the service gateway 1836 can be one-way: the service gateway 1836 can make API calls to cloud services 1856, and cloud services 1856 can send requested data to the service gateway 1836. But cloud services 1856 may not initiate API calls to the service gateway 1836.

In some examples, the secure host tenancy 1804 can be directly connected to the service tenancy 1819, which may be otherwise isolated. The secure host subnet 1808 can communicate with the SSH subnet 1814 through an LPG 1810 that may enable two-way communication over an otherwise isolated system. Connecting the secure host subnet 1808 to the SSH subnet 1814 may give the secure host subnet 1808 access to other entities within the service tenancy 1819.

The control plane VCN 1816 may allow users of the service tenancy 1819 to set up or otherwise provision desired resources. Desired resources provisioned in the control plane VCN 1816 may be deployed or otherwise used in the data plane VCN 1818. In some examples, the control plane VCN 1816 can be isolated from the data plane VCN 1818, and the data plane mirror app tier 1840 of the control plane VCN 1816 can communicate with the data plane app tier 1846 of the data plane VCN 1818 via VNICs 1842 that can be contained in the data plane mirror app tier 1840 and the data plane app tier 1846.

In some examples, users of the system, or customers, can make requests, for example create, read, update, or delete (CRUD) operations, through public Internet 1854 that can communicate the requests to the metadata management service 1852. The metadata management service 1852 can communicate the request to the control plane VCN 1816 through the Internet gateway 1834. The request can be received by the LB subnet(s) 1822 contained in the control plane DMZ tier 1820. The LB subnet(s) 1822 may determine that the request is valid, and in response to this determination, the LB subnet(s) 1822 can transmit the request to app subnet(s) 1826 contained in the control plane app tier 1824. If the request is validated and requires a call to public Internet 1854, the call to public Internet 1854 may be transmitted to the NAT gateway 1838 that can make the call to public Internet 1854. Metadata that may be desired to be stored by the request can be stored in the DB subnet(s) 1830.

In some examples, the data plane mirror app tier 1840 can facilitate direct communication between the control plane VCN 1816 and the data plane VCN 1818. For example, changes, updates, or other suitable modifications to configuration may be desired to be applied to the resources contained in the data plane VCN 1818. Via a VNIC 1842, the control plane VCN 1816 can directly communicate with, and can thereby execute the changes, updates, or other suitable modifications to configuration to, resources contained in the data plane VCN 1818.

In some embodiments, the control plane VCN 1816 and the data plane VCN 1818 can be contained in the service tenancy 1819. In this case, the user, or the customer, of the system may not own or operate either the control plane VCN 1816 or the data plane VCN 1818. Instead, the IaaS provider may own or operate the control plane VCN 1816 and the data plane VCN 1818, both of which may be contained in the service tenancy 1819. This embodiment can enable isolation of networks that may prevent users or customers from interacting with other users', or other customers', resources. Also, this embodiment may allow users or customers of the system to store databases privately without needing to rely on public Internet 1854, which may not have a desired level of threat prevention, for storage.

In other embodiments, the LB subnet(s) 1822 contained in the control plane VCN 1816 can be configured to receive a signal from the service gateway 1836. In this embodiment, the control plane VCN 1816 and the data plane VCN 1818 may be configured to be called by a customer of the IaaS provider without calling public Internet 1854. Customers of the IaaS provider may desire this embodiment since database(s) that the customers use may be controlled by the IaaS provider and may be stored on the service tenancy 1819, which may be isolated from public Internet 1854.

Figure 19:
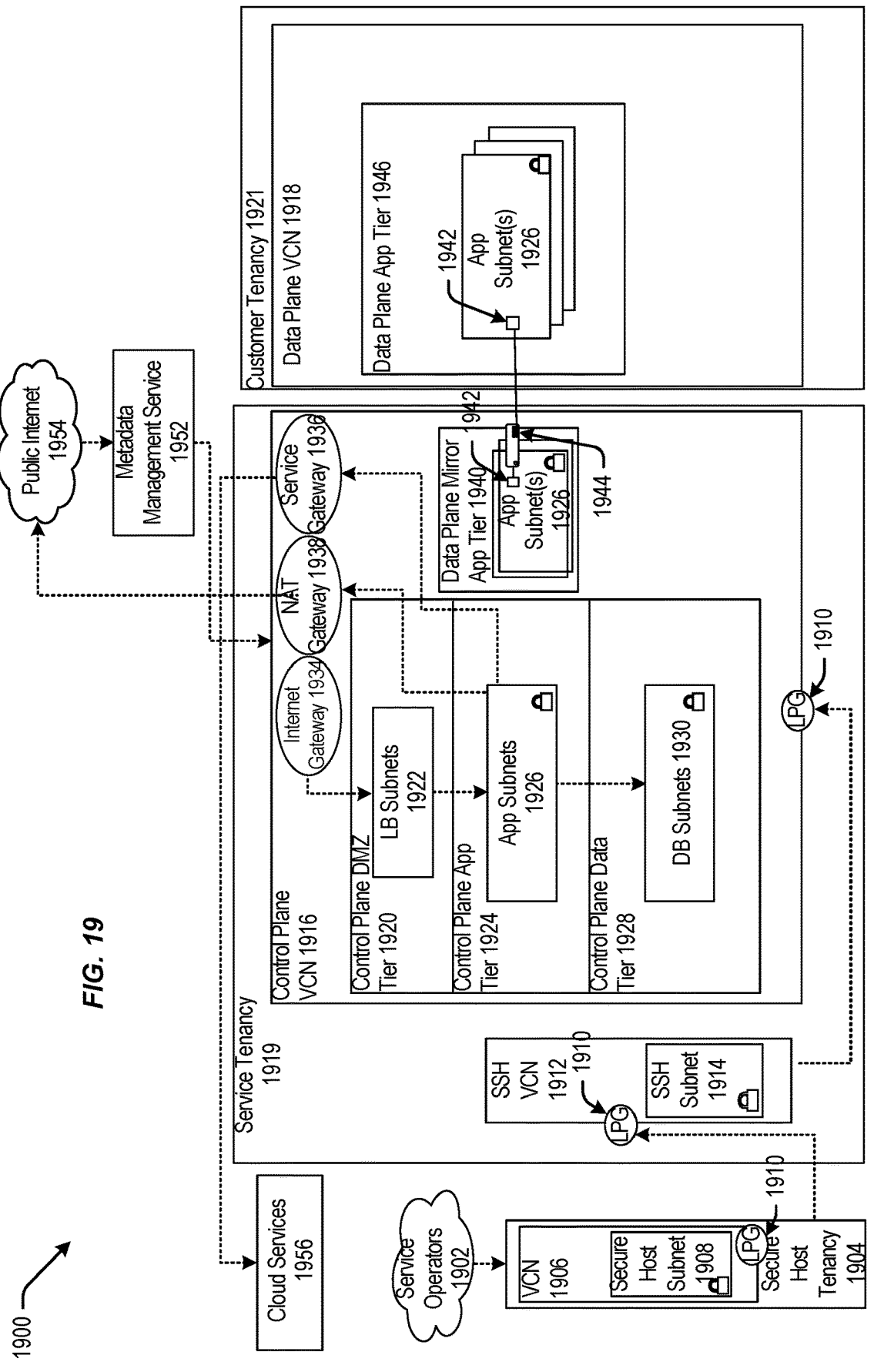
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1802 of FIG. 18) can be communicatively coupled to a secure host tenancy 1904 (e.g., the secure host tenancy 1804 of FIG. 18) that can include a virtual cloud network (VCN) 1906 (e.g., the VCN 1806 of FIG. 18) and a secure host subnet 1908 (e.g., the secure host subnet 1808 of FIG. 18). The VCN 1906 can include a local peering gateway (LPG) 1910 (e.g., the LPG 1810 of FIG. 18) that can be communicatively coupled to a secure shell (SSH) VCN 1912 (e.g., the SSH VCN 1812 of FIG. 18) via an LPG 1810 contained in the SSH VCN 1912. The SSH VCN 1912 can include an SSH subnet 1914 (e.g., the SSH subnet 1814 of FIG. 18), and the SSH VCN 1912 can be communicatively coupled to a control plane VCN 1916 (e.g., the control plane VCN 1816 of FIG. 18) via an LPG 1910 contained in the control plane VCN 1916. The control plane VCN 1916 can be contained in a service tenancy 1919 (e.g., the service tenancy 1819 of FIG. 18), and the data plane VCN 1918 (e.g., the data plane VCN 1818 of FIG. 18) can be contained in a customer tenancy 1921 that may be owned or operated by users, or customers, of the system.

The control plane VCN 1916 can include a control plane DMZ tier 1920 (e.g., the control plane DMZ tier 1820 of FIG. 18) that can include LB subnet(s) 1922 (e.g., LB subnet(s) 1822 of FIG. 18), a control plane app tier 1924 (e.g., the control plane app tier 1824 of FIG. 18) that can include app subnet(s) 1926 (e.g., app subnet(s) 1826 of FIG. 18), a control plane data tier 1928 (e.g., the control plane data tier 1828 of FIG. 18) that can include database (DB) subnet(s) 1930 (e.g., similar to DB subnet(s) 1830 of FIG. 18). The LB subnet(s) 1922 contained in the control plane DMZ tier 1920 can be communicatively coupled to the app subnet(s) 1926 contained in the control plane app tier 1924 and an Internet gateway 1934 (e.g., the Internet gateway 1834 of FIG. 18) that can be contained in the control plane VCN 1916, and the app subnet(s) 1926 can be communicatively coupled to the DB subnet(s) 1930 contained in the control plane data tier 1928 and a service gateway 1936 (e.g., the service gateway 1836 of FIG. 18) and a network address translation (NAT) gateway 1938 (e.g., the NAT gateway 1838 of FIG. 18). The control plane VCN 1916 can include the service gateway 1936 and the NAT gateway 1938.

The control plane VCN 1916 can include a data plane mirror app tier 1940 (e.g., the data plane mirror app tier 1840 of FIG. 18) that can include app subnet(s) 1926. The app subnet(s) 1926 contained in the data plane mirror app tier 1940 can include a virtual network interface controller (VNIC) 1942 (e.g., the VNIC of 1842) that can execute a compute instance 1944 (e.g., similar to the compute instance 1844 of FIG. 18). The compute instance 1944 can facilitate communication between the app subnet(s) 1926 of the data plane mirror app tier 1940 and the app subnet(s) 1926 that can be contained in a data plane app tier 1946 (e.g., the data plane app tier 1846 of FIG. 18) via the VNIC 1942 contained in the data plane mirror app tier 1940 and the VNIC 1942 contained in the data plane app tier 1946.

The Internet gateway 1934 contained in the control plane VCN 1916 can be communicatively coupled to a metadata management service 1952 (e.g., the metadata management service 1852 of FIG. 18) that can be communicatively coupled to public Internet 1954 (e.g., public Internet 1854 of FIG. 18). Public Internet 1954 can be communicatively coupled to the NAT gateway 1938 contained in the control plane VCN 1916. The service gateway 1936 contained in the control plane VCN 1916 can be communicatively coupled to cloud services 1956 (e.g., cloud services 1856 of FIG. 18).

In some examples, the data plane VCN 1918 can be contained in the customer tenancy 1921. In this case, the IaaS provider may provide the control plane VCN 1916 for each customer, and the IaaS provider may, for each customer, set up a unique compute instance 1944 that is contained in the service tenancy 1919. Each compute instance 1944 may allow communication between the control plane VCN 1916, contained in the service tenancy 1919, and the data plane VCN 1918 that is contained in the customer tenancy 1921. The compute instance 1944 may allow resources, that are provisioned in the control plane VCN 1916 that is contained in the service tenancy 1919, to be deployed or otherwise used in the data plane VCN 1918 that is contained in the customer tenancy 1921.

In other examples, the customer of the IaaS provider may have databases that live in the customer tenancy 1921. In this example, the control plane VCN 1916 can include the data plane mirror app tier 1940 that can include app subnet(s) 1926. The data plane mirror app tier 1940 can reside in the data plane VCN 1918, but the data plane mirror app tier 1940 may not live in the data plane VCN 1918. That is, the data plane mirror app tier 1940 may have access to the customer tenancy 1921, but the data plane mirror app tier 1940 may not exist in the data plane VCN 1918 or be owned or operated by the customer of the IaaS provider. The data plane mirror app tier 1940 may be configured to make calls to the data plane VCN 1918 but may not be configured to make calls to any entity contained in the control plane VCN 1916. The customer may desire to deploy or otherwise use resources in the data plane VCN 1918 that are provisioned in the control plane VCN 1916, and the data plane mirror app tier 1940 can facilitate the desired deployment, or other usage of resources, of the customer.

In some embodiments, the customer of the IaaS provider can apply filters to the data plane VCN 1918. In this embodiment, the customer can determine what the data plane VCN 1918 can access, and the customer may restrict access to public Internet 1954 from the data plane VCN 1918. The IaaS provider may not be able to apply filters or otherwise control access of the data plane VCN 1918 to any outside networks or databases. Applying filters and controls by the customer onto the data plane VCN 1918, contained in the customer tenancy 1921, can help isolate the data plane VCN 1918 from other customers and from public Internet 1954.

In some embodiments, cloud services 1956 can be called by the service gateway 1936 to access services that may not exist on public Internet 1954, on the control plane VCN

1916, or on the data plane VCN 1918. The connection between cloud services 1956 and the control plane VCN 1916 or the data plane VCN 1918 may not be live or continuous. Cloud services 1956 may exist on a different network owned or operated by the IaaS provider. Cloud services 1956 may be configured to receive calls from the service gateway 1936 and may be configured to not receive calls from public Internet 1954. Some cloud services 1956 may be isolated from other cloud services 1956, and the control plane VCN 1916 may be isolated from cloud services 1956 that may not be in the same region as the control plane VCN 1916. For example, the control plane VCN 1916 may be located in "Region 1," and cloud service "Deployment 18," may be located in Region 1 and in "Region 2." If a call to Deployment 18 is made by the service gateway 1936 contained in the control plane VCN 1916 located in Region 1, the call may be transmitted to Deployment 18 in Region 1. In this example, the control plane VCN 1916, or Deployment 18 in Region 1, may not be communicatively coupled to, or otherwise in communication with, Deployment 18 in Region 2.

FIG. 20 is a block diagram 2000 illustrating another example pattern of an IaaS architecture, according to at least one embodiment. Service operators 2002 (e.g., service operators 1802 of FIG. 18) can be communicatively coupled to a secure host tenancy 2004 (e.g., the secure host tenancy 1804 of FIG. 18) that can include a virtual cloud network (VCN) 2006 (e.g., the VCN 1806 of FIG. 18) and a secure host subnet 2008 (e.g., the secure host subnet 1808 of FIG. 18). The VCN 2006 can include an LPG 2010 (e.g., the LPG 1810 of FIG. 18) that can be communicatively coupled to an SSH VCN 2012 (e.g., the SSH VCN 1812 of FIG. 18) via an LPG 2010 contained in the SSH VCN 2012. The SSH VCN 2012 can include an SSH subnet 2014 (e.g., the SSH subnet 1814 of FIG. 18), and the SSH VCN 2012 can be communicatively coupled to a control plane VCN 2016 (e.g., the control plane VCN 1816 of FIG. 18) via an LPG 2010 contained in the control plane VCN 2016 and to a data plane VCN 2018 (e.g., the data plane 1818 of FIG. 18) via an LPG 2010 contained in the data plane VCN 2018. The control plane VCN 2016 and the data plane VCN 2018 can be contained in a service tenancy 2019 (e.g., the service tenancy 1819 of FIG. 18).

The control plane VCN 2016 can include a control plane DMZ tier 2020 (e.g., the control plane DMZ tier 1820 of FIG. 18) that can include load balancer (LB) subnet(s) 2022 (e.g., LB subnet(s) 1822 of FIG. 18), a control plane app tier 2024 (e.g., the control plane app tier 1824 of FIG. 18) that can include app subnet(s) 2026 (e.g., similar to app subnet(s) 1826 of FIG. 18), a control plane data tier 2028 (e.g., the control plane data tier 1828 of FIG. 18) that can include DB subnet(s) 2030. The LB subnet(s) 2022 contained in the control plane DMZ tier 2020 can be communicatively coupled to the app subnet(s) 2026 contained in the control plane app tier 2024 and to an Internet gateway 2034 (e.g., the Internet gateway 1834 of FIG. 18) that can be contained in the control plane VCN 2016, and the app subnet(s) 2026 can be communicatively coupled to the DB subnet(s) 2030 contained in the control plane data tier 2028 and to a service gateway 2036 (e.g., the service gateway of FIG. 18) and a network address translation (NAT) gateway 2038 (e.g., the NAT gateway 1838 of FIG. 18). The control plane VCN 2016 can include the service gateway 2036 and the NAT gateway 2038.

The data plane VCN 2018 can include a data plane app tier 2046 (e.g., the data plane app tier 1846 of FIG. 18), a data plane DMZ tier 2048 (e.g., the data plane DMZ tier 1848 of FIG. 18), and a data plane data tier 2050 (e.g., the data plane data tier 1850 of FIG. 18). The data plane DMZ tier 2048 can include LB subnet(s) 2022 that can be communicatively coupled to trusted app subnet(s) 2060 and untrusted app subnet(s) 2062 of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include one or more primary VNICs 2064(1)-(N) that can be communicatively coupled to tenant virtual machines (VMs) 2066(1)-(N). Each tenant VM 2066(1)-(N) can be communicatively coupled to a respective app subnet 2067(1)-(N) that can be contained in respective container egress VCNs 2068(1)-(N) that can be contained in respective customer tenancies 2070(1)-(N). Respective secondary VNICs 2072(1)-(N) can facilitate communication between the untrusted app subnet(s) 2062 contained in the data plane VCN 2018 and the app subnet contained in the container egress VCNs 2068(1)-(N). Each container egress VCNs 2068(1)-(N) can include a NAT gateway 2038 that can be communicatively coupled to public Internet 2054 (e.g., public Internet 1854 of FIG. 18).

The Internet gateway 2034 contained in the control plane VCN 2016 and contained in the data plane VCN 2018 can be communicatively coupled to a metadata management service 2052 (e.g., the metadata management system 1852 of FIG. 18) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively coupled to cloud services 2056.

In some embodiments, the data plane VCN 2018 can be integrated with customer tenancies 2070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2046. Code to run the function may be executed in the VMs 2066(1)-(N), and the code may not be configured to run anywhere else on the data plane VCN 2018. Each VM 2066(1)-(N) may be connected to one customer tenancy 2070. Respective containers 2071(1)-(N) contained in the VMs 2066(1)-(N) may be configured to run the code. In this case, there can be a dual isolation (e.g., the containers 2071(1)-(N) running code, where the containers 2071(1)-(N) may be contained in at least the VM 2066(1)-(N) that are contained in the untrusted app subnet(s) 2062), which may help prevent incorrect or otherwise undesirable code from damaging the network of the IaaS provider or from damaging a network of a different customer. The containers 2071

(1)-(N) may be communicatively coupled to the customer tenancy 2070 and may be configured to transmit or receive data from the customer tenancy 2070. The containers 2071 (1)-(N) may not be configured to transmit or receive data from any other entity in the data plane VCN 2018. Upon completion of running the code, the IaaS provider may kill or otherwise dispose of the containers 2071(1)-(N).

In some embodiments, the trusted app subnet(s) 2060 may run code that may be owned or operated by the IaaS provider. In this embodiment, the trusted app subnet(s) 2060 may be communicatively coupled to the DB subnet(s) 2030 and be configured to execute CRUD operations in the DB subnet(s) 2030. The untrusted app subnet(s) 2062 may be communicatively coupled to the DB subnet(s) 2030, but in this embodiment, the untrusted app subnet(s) may be configured to execute read operations in the DB subnet(s) 2030. The containers 2071(1)-(N) that can be contained in the VM 2066(1)-(N) of each customer and that may run code from the customer may not be communicatively coupled with the DB subnet(s) 2030.

In other embodiments, the control plane VCN 2016 and the data plane VCN 2018 may not be directly communicatively coupled. In this embodiment, there may be no direct communication between the control plane VCN 2016 and the data plane VCN 2018. However, communication can occur indirectly through at least one method. An LPG 2010 may be established by the IaaS provider that can facilitate communication between the control plane VCN 2016 and the data plane VCN 2018. In another example, the control plane VCN 2016 or the data plane VCN 2018 can make a call to cloud services 2056 via the service gateway 2036. For example, a call to cloud services 2056 from the control plane VCN 2016 can include a request for a service that can communicate with the data plane VCN 2018.

Figure 21:
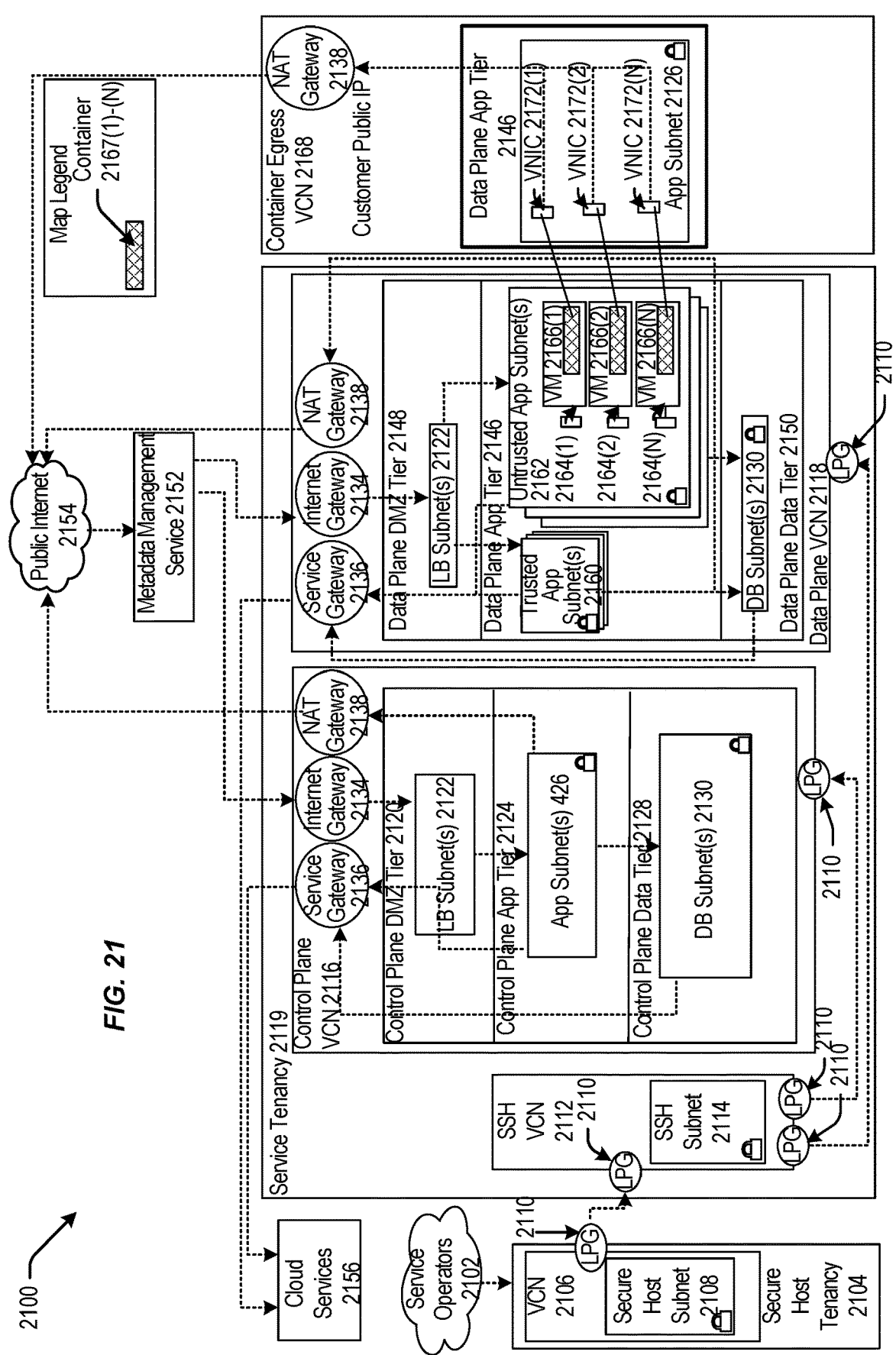
FIG. 21 is a block diagram illustrating another pattern for implementing a cloud infrastructure as a service system, according to at least one embodiment.

FIG. 21 is a block diagram 2100 illustrating another example pattern of an IaaS architecture, according to at least one embodiment. Service operators 2102 (e.g., service operators 1802 of FIG. 18) can be communicatively coupled to a secure host tenancy 2104 (e.g., the secure host tenancy 1804 of FIG. 18) that can include a virtual cloud network (VCN) 2106 (e.g., the VCN 1806 of FIG. 18) and a secure host subnet 2108 (e.g., the secure host subnet 1808 of FIG. 18). The VCN 2106 can include an LPG 2110 (e.g., the LPG 1810 of FIG. 18) that can be communicatively coupled to an SSH VCN 2112 (e.g., the SSH VCN 1812 of FIG. 18) via an LPG 2110 contained in the SSH VCN 2112. The SSH VCN 2112 can include an SSH subnet 2114 (e.g., the SSH subnet 1814 of FIG. 18), and the SSH VCN 2112 can be communicatively coupled to a control plane VCN 2116 (e.g., the control plane VCN 1816 of FIG. 18) via an LPG 2110 contained in the control plane VCN 2116 and to a data plane VCN 2118 (e.g., the data plane 1818 of FIG. 18) via an LPG 2110 contained in the data plane VCN 2118. The control plane VCN 2116 and the data plane VCN 2118 can be contained in a service tenancy 2119 (e.g., the service tenancy 1819 of FIG. 18).

The control plane VCN 2116 can include a control plane DMZ tier 2120 (e.g., the control plane DMZ tier 1820 of FIG. 18) that can include LB subnet(s) 2122 (e.g., LB subnet(s) 1822 of FIG. 18), a control plane app tier 2124 (e.g., the control plane app tier 1824 of FIG. 18) that can include app subnet(s) 2126 (e.g., app subnet(s) 1826 of FIG. 18), a control plane data tier 2128 (e.g., the control plane data tier 1828 of FIG. 18) that can include DB subnet(s) 2130 (e.g., DB subnet(s) 2030 of FIG. 20). The LB subnet(s) 2122 contained in the control plane DMZ tier 2120 can be communicatively coupled to the app subnet(s) 2126 contained in the control plane app tier 2124 and to an Internet gateway 2134 (e.g., the Internet gateway 1834 of FIG. 18) that can be contained in the control plane VCN 2116, and the app subnet(s) 2126 can be communicatively coupled to the DB subnet(s) 2130 contained in the control plane data tier 2128 and to a service gateway 2136 (e.g., the service gateway of FIG. 18) and a network address translation (NAT) gateway 2138 (e.g., the NAT gateway 1838 of FIG. 18). The control plane VCN 2116 can include the service gateway 2136 and the NAT gateway 2138.

The data plane VCN 2118 can include a data plane app tier 2146 (e.g., the data plane app tier 1846 of FIG. 18), a data plane DMZ tier 2148 (e.g., the data plane DMZ tier 1848 of FIG. 18), and a data plane data tier 2150 (e.g., the data plane data tier 1850 of FIG. 18). The data plane DMZ tier 2148 can include LB subnet(s) 2122 that can be communicatively coupled to trusted app subnet(s) 2160 (e.g., trusted app subnet(s) 2060 of FIG. 20) and untrusted app subnet(s) 2162 (e.g., untrusted app subnet(s) 2062 of FIG. 20) of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include primary VNICs 2164(1)-(N) that can be communicatively coupled to tenant virtual machines (VMs) 2166(1)-(N) residing within the untrusted app subnet(s) 2162. Each tenant VM 2166(1)-(N) can run code in a respective container 2167(1)-(N), and be communicatively coupled to an app subnet 2126 that can be contained in a data plane app tier 2146 that can be contained in a container egress VCN 2168. Respective secondary VNICs 2172(1)-(N) can facilitate communication between the untrusted app subnet(s) 2162 contained in the data plane VCN 2118 and the app subnet contained in the container egress VCN 2168. The container egress VCN can include a NAT gateway 2138 that can be communicatively coupled to public Internet 2154 (e.g., public Internet 1854 of FIG. 18).

The Internet gateway 2134 contained in the control plane VCN 2116 and contained in the data plane VCN 2118 can be communicatively coupled to a metadata management service 2152 (e.g., the metadata management system 1852 of FIG. 18) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively coupled to cloud services 2156.

In some examples, the pattern illustrated by the architecture of block diagram 2100 of FIG. 21 may be considered an exception to the pattern illustrated by the architecture of block diagram 2000 of FIG. 20 and may be desirable for a customer of the IaaS provider if the IaaS provider cannot directly communicate with the customer (e.g., a disconnected region). The respective containers 2167(1)-(N) that are contained in the VMs 2166(1)-(N) for each customer can be accessed in real-time by the customer. The containers

2167(1)-(N) may be configured to make calls to respective secondary VNICs 2172(1)-(N) contained in app subnet(s) 2126 of the data plane app tier 2146 that can be contained in the container egress VCN 2168. The secondary VNICs 2172(1)-(N) can transmit the calls to the NAT gateway 2138 that may transmit the calls to public Internet 2154. In this example, the containers 2167(1)-(N) that can be accessed in real-time by the customer can be isolated from the control plane VCN 2116 and can be isolated from other entities contained in the data plane VCN 2118. The containers 2167(1)-(N) may also be isolated from resources from other customers.

In other examples, the customer can use the containers 2167(1)-(N) to call cloud services 2156. In this example, the customer may run code in the containers 2167(1)-(N) that requests a service from cloud services 2156. The containers 2167(1)-(N) can transmit this request to the secondary VNICs 2172(1)-(N) that can transmit the request to the NAT gateway that can transmit the request to public Internet 2154. Public Internet 2154 can transmit the request to LB subnet(s) 2122 contained in the control plane VCN 2116 via the Internet gateway 2134. In response to determining the request is valid, the LB subnet(s) can transmit the request to app subnet(s) 2126 that can transmit the request to cloud services 2156 via the service gateway 2136.

It should be appreciated that IaaS architectures 1800, 1900, 2000, 2100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 22:
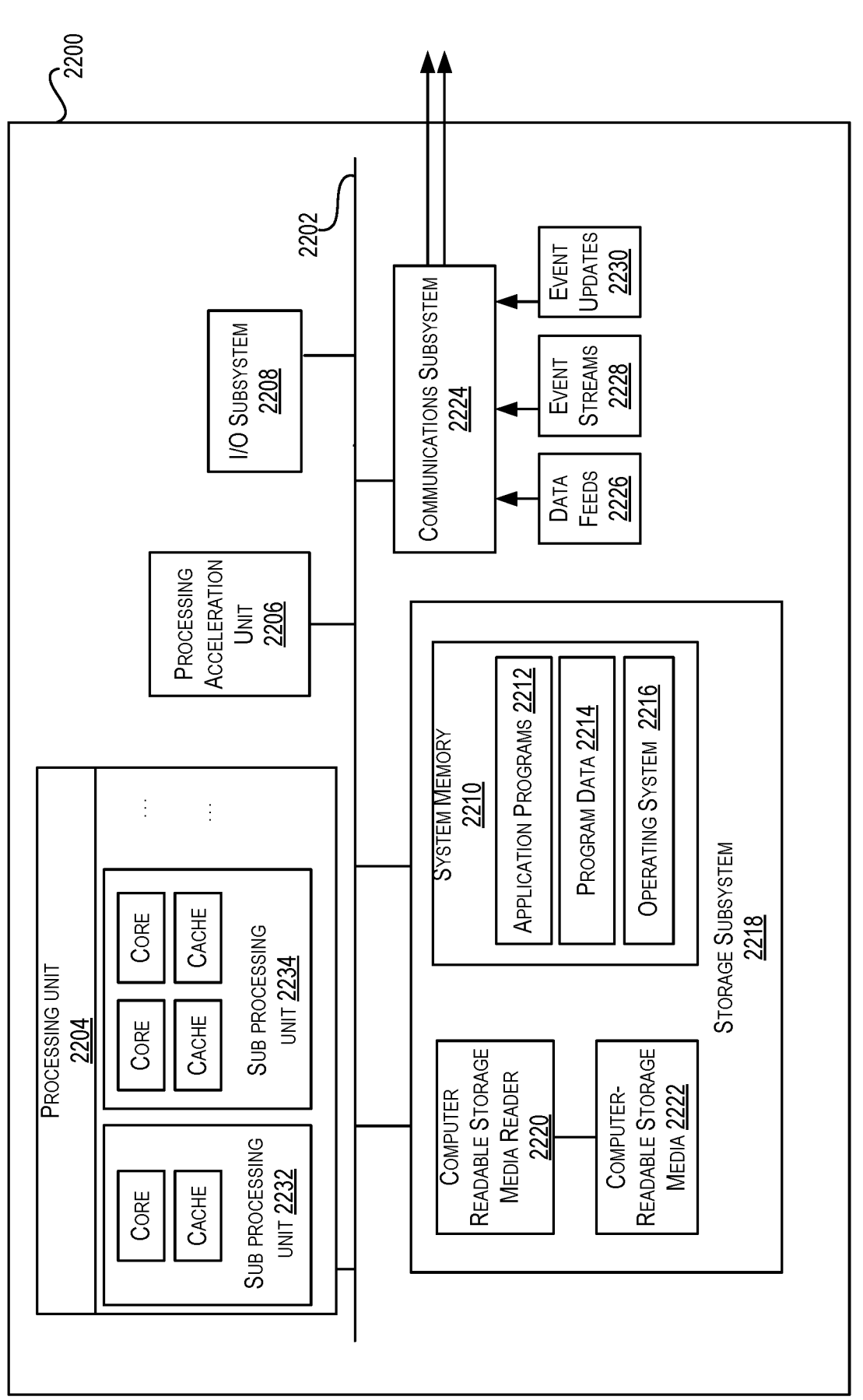
FIG. 22 is a block diagram illustrating an example computer system, according to at least one embodiment.

FIG. 22 illustrates an example computer system 2200, in which various embodiments may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2204 provide the functionality described above. Storage subsystem 2218 may also provide a repository for storing data used in accordance with the present disclosure.

As depicted in the example in FIG. 22, storage subsystem 2218 can include various components including a system memory 2210, computer-readable storage media 2222, and a computer readable storage media reader 2220. System memory 2210 may store program instructions that are loadable and executable by processing unit 2204. System memory 2210 may also store data that is used during the execution of the instructions and/or data that is generated during the execution of the program instructions. Various different kinds of programs may be loaded into system memory 2210 including but not limited to client applications, Web browsers, mid-tier applications, relational database management systems (RDBMS), virtual machines, containers, etc.

System memory 2210 may also store an operating system 2216. Examples of operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2200 executes one or more virtual machines, the virtual machines along with their guest operating systems (GOSs) may be loaded into system memory 2210 and executed by one or more processors or cores of processing unit 2204.

System memory 2210 can come in different configurations depending upon the type of computer system 2200. For example, system memory 2210 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 2210 may include a basic input/output system (BIOS) containing basic routines that help to transfer information between elements within computer system 2200, such as during start-up.

Computer-readable storage media 2222 may represent remote, local, fixed, and/or removable storage devices plus storage media for temporarily and/or more permanently containing, storing, computer-readable information for use by computer system 2200 including instructions executable by processing unit 2204 of computer system 2200.

Computer-readable storage media 2222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 2200.

Machine-readable instructions executable by one or more processors or cores of processing unit 2204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:

preparing, by a cloud-computing service, a user interface configured to receive respective skill metadata defining a plurality of skills corresponding to a plurality of services to be bootstrapped by an orchestrator while building a data center, the respective skill metadata being associated with a respective health state corresponding to a skill;

maintaining, by the cloud-computing service, a first skill of the plurality of skills and a second skill of the plurality of skills, the first skill corresponding to first service functionality and the second skill corresponding to second service functionality, the first skill indicating a dependency on the second skill;

tracking, by the cloud-computing service, progress by the orchestrator of bootstrapping the plurality of services based at least in part on 1) monitoring for publications of the first skill and the second skill and 2) determining the respective skill health state for each of the plurality of skills;

generating, by the cloud-computing service, a dependency graph based at least in part on the plurality of skills corresponding to the plurality of services, the dependency graph indicating the dependency between the first skill and the second skill, the dependency graph representing a build dependency graph utilized by the orchestrator to bootstrap the plurality of services while building the data center;

determining, by the cloud-computing service, a blockage to bootstrapping the plurality of services, the blockage being identified based at least in part on the tracking and the dependency graph generated by the cloud-computing service; and providing, by the cloud-computing service at the user interface, an indication of the blockage based at least in part on presenting, at the user interface, at least a portion of the dependency graph and one or more health states of one or more skills that correspond to the portion of the dependency graph, the user interface providing navigation options associated with navigating within the dependency graph.

2. The computer-implemented method of claim 1, wherein each skill of the plurality of skills is associated with a lifecycle state selected from a plurality of lifecycle states, and wherein the computer-implemented method further comprises monitoring the respective health state corresponding to the skill based at least in part on determining that the skill is associated with a particular lifecycle state.

3. The computer-implemented method of claim 1, further comprising validating, by the cloud-computing service, the build dependency graph generated by the orchestrator based at least in part on the dependency graph generated by the cloud-computing service.

4. The computer-implemented method of claim 1, wherein the cloud-computing service manages a service catalog that is presentable at one or more user interfaces hosted by the cloud-computing service.

5. The computer-implemented method of claim 1, wherein the cloud-computing service manages a skills catalog that is presentable at one or more user interfaces hosted by the cloud-computing service.

6. The computer-implemented method of claim 1, further comprising:

identifying that the blockage related to the first skill;

identifying based at least in part on reverse traversing the dependency graph, that the second skill is a probable contributor to the blockage; and presenting, by the cloud-computing service at the user interface, an additional indication indicating that the second skill is the probable contributor to the blockage.

7. The computer-implemented method of claim 1, further comprising:

monitoring, by the cloud-computing service, for one or more indications that a particular health state corresponding to an individual skill of the plurality of skills has changed; and updating, by the cloud-computing service, one or more attributes associated with the individual skill to reflect a change in the particular health state, wherein the orchestrator initiates, based at least in part on changes in the particular health state corresponding to the individual skill, bootstrapping operations associated with bootstrapping the plurality of services while building the data center.

8. The computer-implemented method of claim 1, further comprising:

maintaining a mapping between a particular skill of the plurality of skills and one or more corresponding capabilities; and publishing the particular skill in response to determining that the one or more corresponding capabilities have been published, wherein maintaining the mapping and publishing the skill in response to determining that the one or more corresponding capabilities have been published enables the progress of the building of the data center to be determinable based on one or both of the plurality of skills and a plurality of capabilities.

9. A cloud-computing service, comprising:

one or more processors; and one or more memories storing computer-executable instructions that, when executed by the one or more processors, cause the one or more processors to:

prepare a user interface configured to receive respective skill metadata defining a plurality of skills corresponding to a plurality of services to be bootstrapped by an orchestrator while building a data center, the respective skill metadata being associated with a respective health state corresponding to a skill;

maintain a first skill of the plurality of skills and a second skill of the plurality of skills, the first skill corresponding to a first service functionality and the second skill corresponding to a second service functionality, the first skill indicating a dependency on the second skill;

track progress by the orchestrator of bootstrapping the plurality of services based at least in part on 1) monitoring for publications of the first skill and the second skill and 2) determining the respective skill health state for each of the plurality of skills;

generate a dependency graph based at least in part on the plurality of skills corresponding to the plurality of services, the dependency graph indicating the dependency between the first skill and the second skill, the dependency graph representing a build dependency graph utilized by the orchestrator to bootstrap the plurality of services while building the data center;

determine a blockage to bootstrapping the plurality of services based at least in part on the tracking and the dependency graph generated by the cloud-computing service; and provide, at the user interface, an indication of the blockage based at least in part on presenting, at the user interface, at least a portion of the dependency graph and one or more health states of one or more skills that correspond to the portion of the dependency graph, the user interface providing navigation options associated with navigating within the dependency graph.

10. The cloud-computing service of claim 9, wherein each skill of the plurality of skills is associated with a lifecycle state selected from a plurality of lifecycle states, and wherein executing the computer-executable instructions further causes the one or more processors to monitor the respective health state corresponding to the skill based at least in part on determining that the skill is associated with a particular lifecycle state.

11. The cloud-computing service of claim 9, wherein executing the computer-executable instructions further causes the one or more processors to validate a second build dependency graph generated by the orchestrator based at least in part on the dependency graph generated by the cloud-computing service.

12. The cloud-computing service of claim 9, wherein executing the computer-executable instructions further causes the one or more processors to manage a service catalog that is presentable at one or more user interfaces hosted by the cloud-computing service.

13. The cloud-computing service of claim 9, wherein executing the computer-executable instructions further causes the one or more processors to manage a skills catalog that is presentable at one or more user interfaces hosted by the cloud-computing service.

14. The cloud-computing service of claim 9, wherein executing the computer-executable instructions further causes the one or more processors to:

identify that the blockage relates to the first skill;

identify, based at least in part on reverse traversing the dependency graph, that the second skill is a probable contributor to the blockage; and present, at the user interface, an additional indication indicating that the second skill is the probable contributor to the blockage.

15. The cloud-computing service of claim 9, wherein executing the computer-executable instructions further causes one or more processors to:

monitor for one or more indications that a particular health state corresponding to an individual skill of the plurality of skills has changed; and update one or more attributes associated with the individual skill to reflect a change in the particular health state, wherein the orchestrator initiates, based at least in part on changes in the particular health state corresponding to the individual skill, bootstrapping operations associated with bootstrapping the plurality of services while building the data center.

16. A non-transitory computer-readable medium storing computer-executable instructions that, when executed by one or more processors cause the one or more processors to:

prepare a user interface configured to receive respective skill metadata defining a plurality of skills corresponding to a plurality of services to be bootstrapped by an orchestrator while building a data center, the respective skill metadata being associated with a respective health state corresponding to a skill;

maintain a first skill of the plurality of skills and a second skill of the plurality of skills, the first skill corresponding to a first service functionality and the second skill corresponding to a second service functionality, the first skill indicating a dependency on the second skill;

track progress by the orchestrator of bootstrapping the plurality of services based at least in part on 1) monitoring for publications of the first skill and the second skill and 2) determining the respective skill health state for each of the plurality of skills;

generate a dependency graph based at least in part on the plurality of skills corresponding to the plurality of services, the dependency graph indicating the dependency between the first skill and the second skill, the dependency graph representing a build dependency graph utilized by the orchestrator to bootstrap the plurality of services while building the data center;

determine a blockage to bootstrapping the plurality of services based at least in part on the tracking and the dependency graph; and provide, at the user interface, an indication of the blockage based at least in part on presenting, at the user interface, at least a portion of the dependency graph and one or more health states of one or more skills that correspond to the portion of the dependency graph, the user interface providing navigation options associated with navigating within the dependency graph.

17. The non-transitory computer-readable medium of claim 16, wherein each skill of the plurality of skills is associated with a lifecycle state selected from a plurality of lifecycle states, and wherein executing the computer-executable instructions further causes the one or more processors to monitor the respective health state corresponding to the skill based at least in part on determining that the skill is associated with a particular lifecycle state.

18. The non-transitory computer-readable medium of claim 16, wherein executing the computer-executable instructions further causes the one or more processors to validate a second build dependency graph generated by the orchestrator based at least in part on the dependency graph.

19. The non-transitory computer-readable medium of claim 16, wherein executing the computer-executable instructions further causes the one or more processors to manage a skills catalog that is presentable at one or more user interfaces.

20. The non-transitory computer-readable medium of claim 16, wherein executing the computer-executable instructions further causes the one or more processors to:

identify that the blockage relates to the first skill;

identify, based at least in part on reverse traversing the dependency graph, that the second skill is a probable contributor to the blockage; and present, at the user interface, an additional indication indicating that the second skill is the probable contributor to the blockage.

\* \* \* \* \*